US009247525B2

(12) United States Patent
Jacobs et al.

(10) Patent No.: US 9,247,525 B2
(45) Date of Patent: Jan. 26, 2016

(54) SYSTEMS AND METHODS FOR PROVIDING NOTIFICATIONS

(71) Applicant: QUALCOMM Incorporated, San Diego, CA (US)

(72) Inventors: Paul E. Jacobs, La Jolla, CA (US); Nikhil Jain, San Diego, CA (US); Jose R. Menendez, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 13/794,773

(22) Filed: Mar. 11, 2013

(65) Prior Publication Data

US 2013/0244633 A1    Sep. 19, 2013

Related U.S. Application Data

(60) Provisional application No. 61/612,089, filed on Mar. 16, 2012.

(51) Int. Cl.
*H04W 68/00* (2009.01)
*H04M 1/725* (2006.01)
(Continued)

(52) U.S. Cl.
CPC ............ *H04W 68/00* (2013.01); *H04M 1/7253* (2013.01); *H04M 1/72533* (2013.01); *H04M 19/04* (2013.01); *H04W 88/02* (2013.01)

(58) Field of Classification Search
CPC ....... H04W 4/22; H04W 68/00; H04W 88/02; H04W 68/005; H04W 68/02; H04W 76/007; H04W 88/04; H04M 1/57; H04M 1/72572; H04M 19/04; H04M 1/72566; H04M 1/72569; H04M 1/663; H04M 1/72533; H04M 1/7253; H04M 3/42051; H04M 3/42059; H04M 7/003; H04M 7/00; H04M 1/72552; H04M 3/02; H04M 3/42017; H04M 3/42025
USPC ............ 455/41.2, 66.1, 410–411, 412.2, 418, 455/415, 417, 458, 466, 517, 550.1, 455/556.1–556.2, 557–558, 566, 567, 569.1
See application file for complete search history.

(56) References Cited

U.S. PATENT DOCUMENTS 5,960,367 A *  9/1999  Kita ............................... 455/567
6,112,103 A *  8/2000  Puthuff ........................ 455/557
(Continued)

FOREIGN PATENT DOCUMENTS

DE        19749730 A1     5/1999
EP         1441282 A2     7/2004
(Continued)

OTHER PUBLICATIONS

International Search Report and Written Opinion—PCT/US2013/030534—ISA/EPO—Jun. 26, 2013.
(Continued)

*Primary Examiner* — Meless Zewdu

(57) ABSTRACT

A personal hub for managing notifications across mobile devices and for separating the notification from the content. By separately managing the manner of notification provided to the user from its associated content, the personal hub may give a user more control over a number of mobile devices by allowing the user to escalate or dismiss different notifications across one or more mobile devices. Notifications may be managed based on device settings, priority settings, privilege settings, urgency flags, and/or other factors. In an embodiment, the user may receive an unobtrusive user-perceptible notification of an incoming communication from a personal hub that is less obtrusive than notifications which may be generated by the mobile device receiving the incoming communication.

73 Claims, 39 Drawing Sheets

(51) Int. Cl.
*H04M 19/04* (2006.01)
*H04W 88/02* (2009.01)

(56) References Cited

U.S. PATENT DOCUMENTS

| | | | | |
|---|---|---|---|---|
| 7,130,664 | B1* | 10/2006 | Williams | H04M 1/7253 |
| | | | | 455/567 |
| 7,996,496 | B2 | 8/2011 | Haartsen et al. | |
| 7,996,571 | B2 | 8/2011 | Salokannel | |
| 8,787,006 | B2* | 7/2014 | Golko | G06F 1/163 |
| | | | | 361/679.03 |
| 8,897,840 | B1* | 11/2014 | Hyde et al. | 455/567 |
| 2002/0068600 | A1 | 6/2002 | Chihara et al. | |
| 2004/0185915 | A1* | 9/2004 | Ihara | H04M 1/6066 |
| | | | | 455/569.1 |
| 2004/0213401 | A1* | 10/2004 | Aupperle et al. | 379/372 |
| 2005/0136839 | A1* | 6/2005 | Seshadri et al. | 455/41.2 |
| 2006/0094474 | A1* | 5/2006 | Zatloukal | H04M 1/6016 |
| | | | | 455/572 |
| 2007/0265038 | A1* | 11/2007 | Kim | 455/567 |
| 2008/0182629 | A1* | 7/2008 | Tanada | H04M 1/6066 |
| | | | | 455/567 |
| 2008/0224883 | A1* | 9/2008 | Mock | G08B 25/08 |
| | | | | 340/6.1 |
| 2009/0021350 | A1* | 1/2009 | Hatta | G08B 13/1418 |
| | | | | 340/10.1 |
| 2009/0082071 | A1* | 3/2009 | Hicks, III | 455/570 |
| 2009/0170486 | A1* | 7/2009 | Culbert et al. | 455/415 |
| 2009/0181726 | A1 | 7/2009 | Vargas et al. | |
| 2010/0105445 | A1* | 4/2010 | Brunton et al. | 455/567 |
| 2010/0167794 | A1* | 7/2010 | Yin | 455/567 |
| 2010/0240345 | A1* | 9/2010 | Karrman et al. | 455/414.1 |
| 2010/0240417 | A1* | 9/2010 | Wickman et al. | 455/566 |
| 2011/0003587 | A1* | 1/2011 | Belz et al. | 455/419 |
| 2011/0059769 | A1* | 3/2011 | Brunolli | 455/456.1 |
| 2011/0207447 | A1* | 8/2011 | Bhow | H04M 1/2535 |
| | | | | 455/417 |
| 2011/0300804 | A1* | 12/2011 | Lu | H04B 10/1141 |
| | | | | 455/41.3 |
| 2011/0316698 | A1* | 12/2011 | Palin | H04M 19/04 |
| | | | | 340/540 |
| 2012/0044062 | A1 | 2/2012 | Jersa et al. | |
| 2012/0108215 | A1* | 5/2012 | Kameli | H04M 1/0256 |
| | | | | 455/412.2 |

FOREIGN PATENT DOCUMENTS

| | | |
|---|---|---|
| EP | 1705883 A1 | 9/2006 |
| EP | 2219360 A1 | 8/2010 |

OTHER PUBLICATIONS

Partial International Search Report—PCT/US2013/030534—ISA/EPO—May 15, 2013.

Husemann, D. et al. "Personl Mobile Hub," IBM Research Division (2004), Proceedings of the Eighth International Symposium on Wearable Computers (ISWC'04), vol. 1, pp. 85-91, Oct. 31-Nov. 3, 2004. Retrieved from the Internet at <http://csis.pace.edu/~ctappert/dps/d861-05/w.mobilehub.pdf>.

* cited by examiner

SYSTEMS AND METHODS FOR PROVIDING NOTIFICATIONS

RELATED APPLICATIONS

This application claims the benefit of priority of U.S. Provisional Application 61/612,089, filed Mar. 16, 2012, the entire contents of which are incorporated herein by reference.

BACKGROUND

Mobile devices, such as mobile phones, smart phones, tablets, or laptops, may have various types of user notifications including audio, visual, and haptic (e.g., vibration) notifications. These devices may also include various modes combining or restricting some of these notifications (e.g., a smart phone set to vibrate may not ring or a laptop allowing a pop up reminder may not sound an alarm when sound is muted). Many mobile devices may allow users to control notification modes (e.g., silencing a ringing phone that may be interrupting a meeting or movie). However, mobile devices lack effective ways of shifting among notification modes and/or escalating notifications for important calls or during an alarm event.

Many mobile devices also lack a way of responding (e.g., silencing) notifications without engaging the mobile device itself. For example, if a phone in a briefcase begins ringing, a user must dig through the briefcase and retrieve the phone to stop the ringing. When a user has several devices ringing simultaneously (e.g., a smart phone, tablet, and laptop all announcing the same event on a shared network calendar), acknowledging and silencing all the notifications may be cumbersome for the user. Additionally, the multiple notifications received from mobile devices may overload and/or confuse a user which may increase a user's propensity to overlook or skip important notifications and communications.

SUMMARY

The systems, methods, and devices of the various embodiments provide a personal hub device for managing notifications across mobile devices and for separating the notification (e.g., an alarm) from the content (e.g., an email or SMS message that was the subject of the alarm). By separately managing the manner of notification provided to the user from its associated content (e.g., managing a vibration or ring announcing a text message separate from the text message itself), the various embodiments may give a user more control over a number of mobile devices by allowing the user to escalate or dismiss different notifications across one or more mobile devices. In the various embodiments notifications may be managed based on device settings, priority settings, urgency flags and/or other factors. In an embodiment, the user may receive an unobtrusive user-perceptible notification of an incoming communication from a personal hub device that is less obtrusive than notifications which may be generated by the mobile device receiving the incoming communication.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
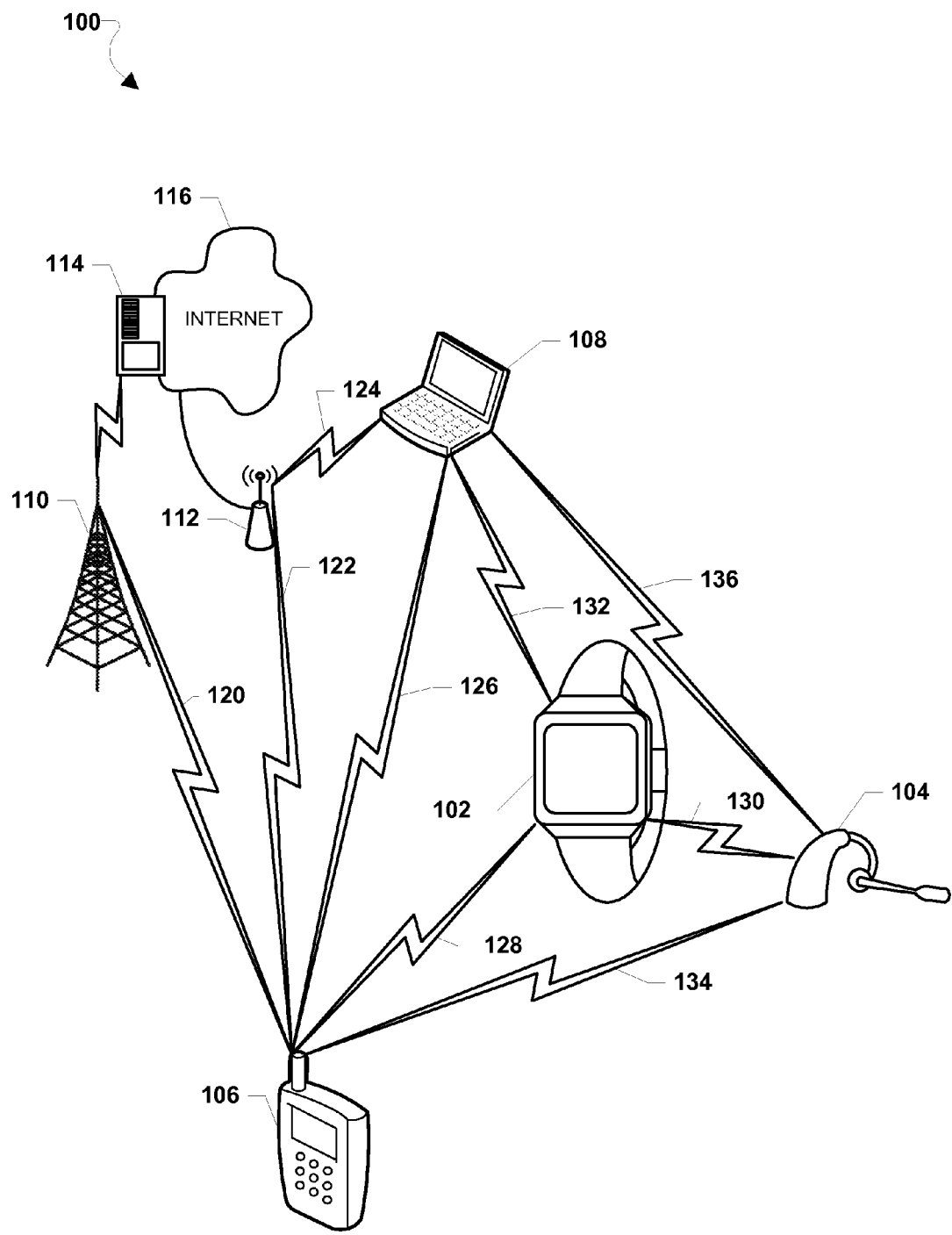
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for sending and/or receiving voice and data calls, sending and/or receiving messages (e.g., short message service (SMS) messages, e-mails, application notifications, such as Facebook® post notifications and/or game high score change notifications, etc.), sending and/or receiving warnings (e.g., low battery warnings, loss of network connectivity warnings, etc.), and/or sending and/or receiving reminders (e.g., calendar reminders, task reminders, etc.).

As used herein, the term "personal hub" is used herein to refer to any device that may be worn or carried by a user and may interact with a variety of mobile devices and/or one or more earpieces. In an embodiment, a personal hub may be configured to be worn by a user around the user's wrist in a manner similar to that of a wrist watch. In alternative embodiments, a personal hub may be a badge, tag, bracelet, patch, belt buckle, medallion, pen, key chain, or any other device worn or carried by a user. In an embodiment, a personal hub may wirelessly communicate with a user's mobile device(s), such as a smart phone, and a wireless earpiece worn by the user. The personal hub may wirelessly communicate with the user's mobile device(s) to enable the user to operate the user's mobile device(s) remotely. In an embodiment, a personal hub system may comprise a personal hub and one or two wireless earpieces worn by the user, together enabling a personal hub system user to utilize a user's mobile device(s) remotely.

The various embodiments provide a personal hub for managing notifications across mobile devices and for separating the notification (e.g., an alarm) from the content (e.g., an email or SMS message that was the subject of the alarm). By managing the manner of notification provided to the user separately from its associated content (e.g., managing a vibration or ring announcing a text message separate from the text message itself), the various embodiments may give a user more control over a number of mobile devices by allowing the user to escalate or dismiss different notifications across one or more mobile devices. In the various embodiments methods, devices, and systems may manage notifications by providing notifications to a user, such as by providing notifications from a mobile device to a user.

In an embodiment, a mobile device may be paired with a personal hub and a wireless earpiece. The mobile device may receive an incoming communication, (e.g., a call, a text message, an e-mail, etc.). In an embodiment, if the communication is a text based communication (e.g., text message or e-mail), the mobile device may generate a speech synthesis of all or part of the text based communication. In response to receiving the incoming communication the mobile device may generate an alert message. In an embodiment, the alert message may include information, such as the communication type (e.g., call, text message, e-mail), the sender/caller identification (ID), an urgency flag, information about the device originating the incoming communication, the text based communication itself or a part of the text based communication, and/or the message speech synthesis. The mobile device may send the alert message to the personal hub. The personal hub may receive the alert message and may determine the alert message type. In an embodiment, the personal hub may determine a user-perceptible notification (e.g., a vibration, series of vibrations, displayed graphic, etc.) based on information in the alert message and/or the alert message type. The personal hub may generate the determined user-perceptible notification. In this manner, the notification of incoming communication may be separated from the incoming communication. In an embodiment, a user-perceptible notification may be relatively unobtrusive, such as a gentle vibration of the personal hub, which may be perceptible to the user, but not perceptible to other individuals in close proximity to the user. In this manner, the user may receive an unobtrusive user-perceptible notification of an incoming communication that is less obtrusive than notifications which may be generated by the mobile device receiving the incoming communication. As an example, in an embodiment in which the personal hub is similar to a wrist watch and the mobile device is a smart phone, the gentle vibration of the personal hub on the user's wrist may be less obtrusive than the audible ring of the smart phone and/or the vibration setting of the smart phone.

In a further embodiment, after generating a user-perceptible notification, the personal hub may receive a user input (e.g., button push indication, a gesture performed with the personal hub indication, a touch screen event indication, a physical movement of the personal hub indication, etc.). The personal hub may determine the type of user input. In an embodiment, different types of user inputs may be associated with different personal hub operations. As an example, a touch screen event indication may serve as an indication that a text based communication should be displayed on a display of the personal hub, while a push button indication may serve as an indication that the speech synthesis of the text communication should be transmitted to the wireless earpiece. In an embodiment, a button push on the personal hub may result in a speech synthesis of a received text based communication being played by the wireless earpiece worn by the user. In this manner, a user may unobtrusively receive their text based communications (e.g., text messages, e-mails, etc.) without having to retrieve or directly engage with their mobile device. Additionally, in this manner, the user may be given the ability to control the escalation of notifications about incoming communications, thereby receiving escalated notifications only if the user desires.

In another embodiment, a mobile device may be paired with a personal hub. When the mobile device receives an incoming communication, the mobile device may send an alert message to the personal hub, and the personal hub may generate a user-perceptible notification. After a delay period, if the mobile device does not receive an indication from the personal hub that the alert message has been acknowledged by the user, the mobile device may generate an audible sound (e.g., in a wireless earpiece) and/or vibration as a further notification to the user that there is an incoming communication. In this manner, notifications may be automatically escalated from less obtrusive notifications to more obtrusive notifications if user acknowledgement is not received, thereby increasing the likelihood that a user is made aware of an incoming communication. In another embodiment, notifications may be automatically escalated based on previous communication frequency and/or urgency flags associated with a given communication.

In another embodiment, notifications provided to the user may be controlled based on privilege settings associated with the originator of the incoming communication and/or the content/context of the incoming communication. Privilege settings associated with the originator of the incoming communication and/or the content/context of the incoming communication may enable the mobile device and/or personal hub to manage incoming communications. In an embodiment, an incoming communication received from an originator designated as a privileged originator in the privilege settings may be directly passed to a user interface in use by the user. As an example, in an embodiment in which a mobile device is paired with a personal hub and a wireless earpiece, when the mobile device receives an incoming voice call from the user's boss the mobile device may generate an alert message identifying the incoming call's caller ID and send the alert message to the personal hub. The personal hub may compare the caller ID in the alert message to a privileged caller list to determine that the user's boss is a privileged caller. Based on the determination that the user's boss is a privileged caller, the personal hub may send an indication to the mobile device to answer the call, and upon receiving the indication the mobile device may establish the call using the wireless earpiece. In this manner, because the user's boss may was designated as a privileged caller, the call from the user's boss may be automatically answered and directly placed through to the user.

In the various embodiments, a personal hub may be a separate device operating in conjunction with other mobile devices. Alternatively, the functionality of a personal hub may be executed as a software program residing on a given mobile device. In this manner, a mobile device running a personal hub application may be able to function as a personal hub and a mobile device to implement the methods and the functions of the various embodiments.

FIG. 1 illustrates a wireless network system 100 suitable for use with the various embodiments. The wireless network system 100 may include multiple devices, such as a personal hub 102, a wireless earpiece 104, and two mobile devices, a smart phone 106 and laptop 108. The personal hub 102 and the wireless earpiece 104 may exchange data via a wireless data link 130. As an example, the wireless data link 130 between the personal hub 102 and the wireless earpiece may be a Bluetooth® connection. The personal hub 102 and the smart phone 106 may exchange data via a wireless data link 128. The personal hub 102 and the laptop 108 may exchange data via a wireless data link 132. As an example, the wireless data links 128 and 132 may be Bluetooth® connections. The smart phone 106 and the wireless earpiece 104 may exchange data via a wireless data link 134. As an example, the wireless data link 134 may be a Bluetooth® connection. The laptop 108 and the wireless earpiece 104 may exchange data via a wireless data link 136. As an example, the wireless data link 136 may be a Bluetooth® connection. The smart phone 106 and the laptop 108 may exchange data directly with each other via a wireless data link 126. As an example, the wireless data link 126 may be a Bluetooth® connection.

Additionally, the smart phone 106 and the laptop 108 may be configured to connect to the Internet 116 via wireless connections 122 and 124, respectively, established with a wireless access point 112, such as a Wi-Fi access point. The wireless access point 112 may connect with the Internet 116. In this manner data may be exchanged between the smart phone 106, the laptop 108, and other Internet 116 connected devices by methods well known in the art. Additionally, the smart phone 106 and a cellular tower or base station 110 may exchange data via a cellular connection 120, including CDMA, TDMA, GSM, PCS, G-3, G-4, LTE, or any other type connection. The cellular tower or base station 110 may be in communication with a router 114 which may connect to the Internet 116. In this manner, data (e.g., voice calls, text messages, e-mails, etc.) may be exchanged between the smart phone 106 and other devices by methods well known in the art.

Figure 2:
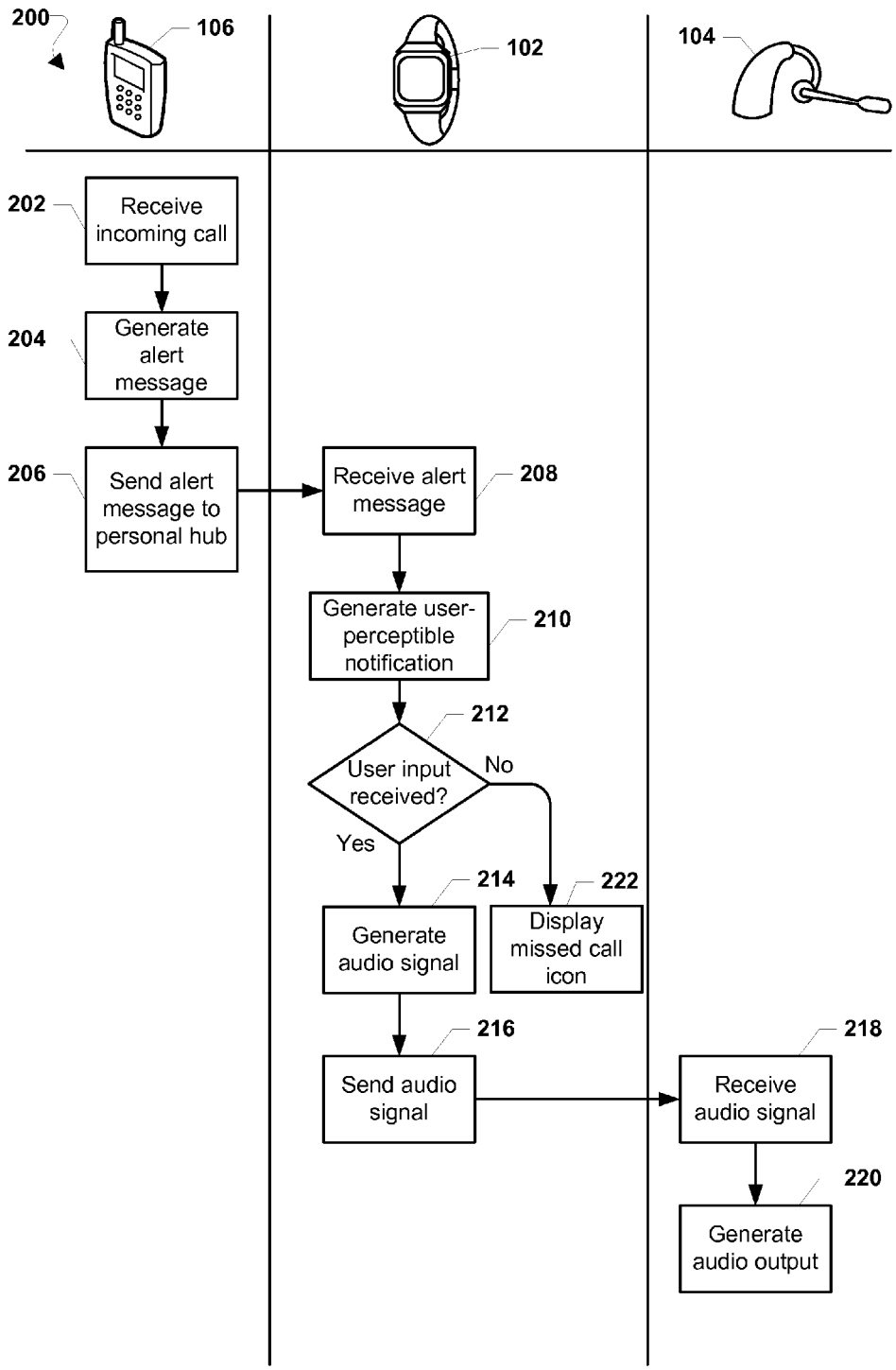
FIG. 2 is a process flow diagram illustrating an embodiment method for providing and escalating notifications.

FIG. 2 illustrates an embodiment method 200 for providing and escalating notifications from a smart phone 106 to a personal hub 102 and a wireless earpiece 104. At block 202 the smart phone 106 may receive an incoming call. As an example, incoming calls may be a voice and/or data call established over a cellular network or a Wi-Fi connection to the Internet 116. Also, for example, incoming calls may be a "whisper" communication, such as an audio communication ordinarily configured to be automatically played upon receipt (e.g., a push-to-talk communication or a voice memo). At block 204 the smart phone 106 may generate an alert message. As discussed further below, an alert message may include information related to the incoming call, such as a caller ID or urgency flag. At block 206 the smart phone 106 may send the alert message to the personal hub 102. As an example, the smart phone 106 may send the alert message to the personal hub 102 via the wireless data link 128.

At block 208 the personal hub 102 may receive the alert message. At block 210 the personal hub 102 may generate a user-perceptible notification in response to receiving the alert message. In an embodiment, the user-perceptible notification may be a minimalist notification selected to be unobtrusive, such as a gentle vibration of the personal hub 102, which may be perceptible to the user of the personal hub 102, but not perceptible to other individuals in close proximity to the user of the personal hub 102. As an example, in an embodiment in which the personal hub 102 is worn in a manner similar to a wrist watch, a vibratory motor in the personal hub 102 may be activated to vibrate a back panel of the personal hub 102 that is in contact with the user's wrist. In this manner, the vibration of the personal hub 102 against the user's wrist may generate a vibration that is only perceptible to the personal hub 102 user.

At determination block 212 the personal hub 102 may determine whether a user input is received in the personal hub 102. A user input may be any type of input received by the personal hub 102. As an example, a user input may be a button press event on the personal hub 102, a gesture performed on a touch screen of the personal hub 102, or movement of the personal hub 102 detected by an accelerometer within the personal hub 102. As an example, in an embodiment in which the personal hub 102 is worn in a manner similar to a wrist watch, an accelerometer may detect a user shaking their wrist by the corresponding movement of the personal hub 102. If a user input is not received (i.e., determination block 212="No"), at block 222 the personal hub 102 may display a missed call icon on a display of the personal hub 102 which may serve as an indication to the user that the incoming call was not answered. If a user input is received in the personal hub 102 (i.e., determination block 212="Yes"), at block 214 the personal hub may generate an audio signal to send to the wireless earpiece 104. As an example, the audio signal may be a single tone which may be associated with an incoming call. As another example, the audio signal may be a ringtone associated with the caller identified by the caller ID contained in the alert message. As yet another example, the audio signal may be a speech synthesis of the caller ID contained in the alert message.

At block 216 the personal hub 102 may send the audio signal to the wireless earpiece 104. As an example, the personal hub 102 may send the audio signal to the wireless earpiece 104 via the wireless data link 130. At block 218 the wireless earpiece 104 may receive the audio signal. At block 220 the wireless earpiece 104 may generate an audio output of the received audio signal. As an example, the wireless earpiece 104 may utilize speakers to generate an audio output audible in an ear of a user of the wireless earpiece 104. As an example, in an embodiment in which the audio signal is a ringtone associated with a specific caller ID contained in the alert message, a user may hear the ringtone played by the wireless earpiece 104. This playing of the ringtone, in addition to the generated user-perceptible notification, may give the user additional information with which to make a decision about answering the incoming call.

Figure 3:
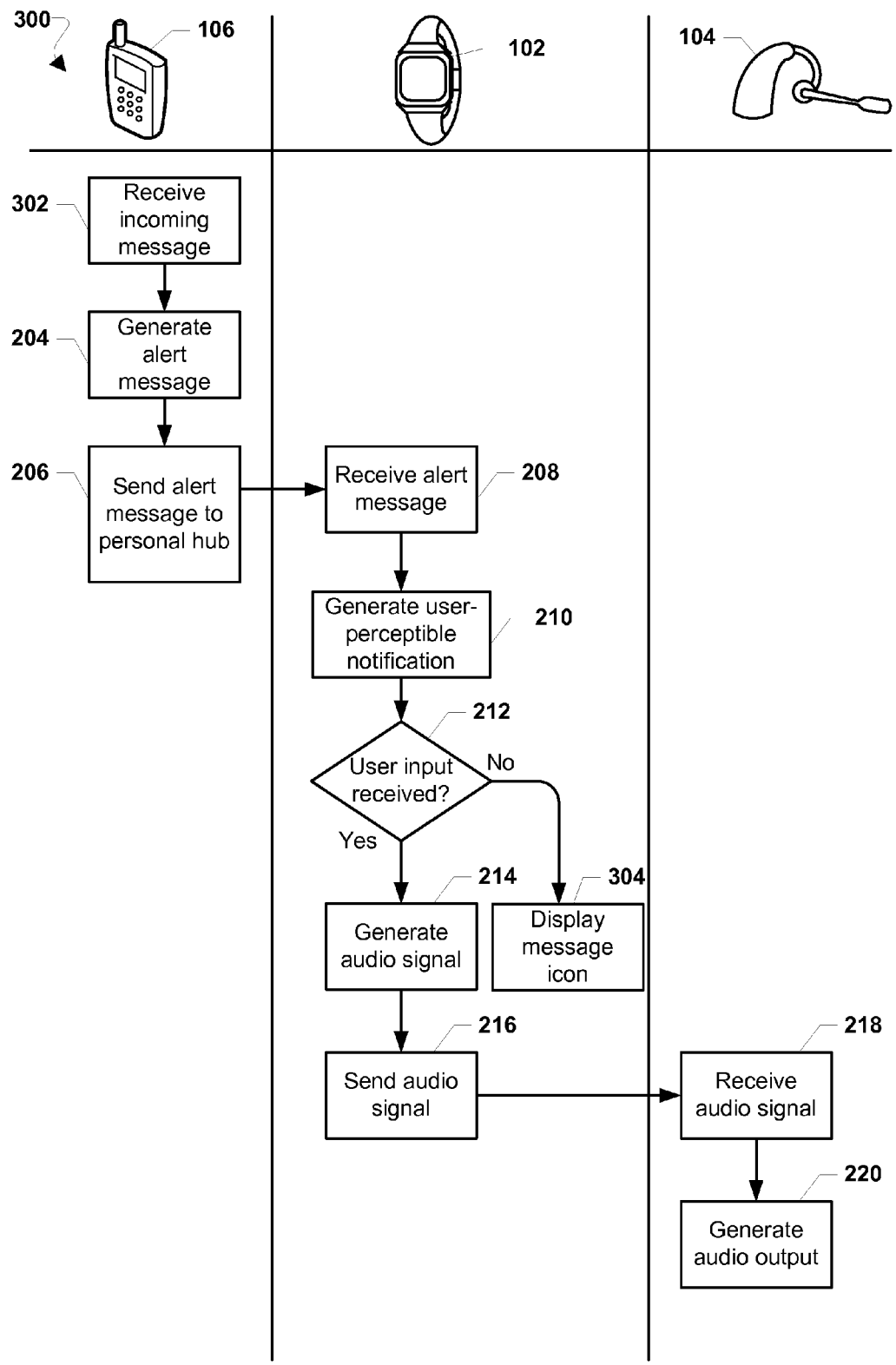
FIG. 3 is a process flow diagram illustrating a second embodiment method for providing and escalating notifications.

FIG. 3 illustrates an embodiment method 300 for providing and escalating notifications from a smart phone 106 to a personal hub 102 and wireless earpiece 104 similar to method 200 discussed above with reference to FIG. 2, except that method 300 may provide notifications related to an incoming text based message. At block 302 the smart phone 106 may receive an incoming text based message. As an example, an incoming text based message may be a text message, such as a short message service (SMS) message, an e-mail message, such as a simple mail transfer protocol (SMTP) message, or an application generated notification, such as a Facebook® post notification and/or game high score change notification. As discussed above, at block 204 the smart phone 106 may generate an alert message. As discussed further below, an alert message may include information related to the incoming text based message, such as a sender ID, urgency flag, a portion of the text based message such as header element or a portion of the text based message body, or a speech synthesis of a portion of the text based message.

As discussed above, at block 206 the smart phone 106 may send the alert message to the personal hub 102, and at blocks 208, 210, and 212 the personal hub 102 may perform operations of like numbered blocks of method 200 described above with reference to FIG. 2. If a user input is not received (i.e., determination block 212="No"), at block 304 the personal hub 102 may display a message icon which may serve as an indication to the user that an incoming message has been received by the smart phone 106 but has not been read been accessed yet. If a user input is received in the personal hub 102 (i.e., determination block 212="Yes"), at block 214 the personal hub may generate an audio signal to send to the wireless earpiece 104. As an example, in an embodiment in which the alert message includes a sender ID, the audio signal may be a sound associated with a specific sender.

As discussed above, at block 216 the personal hub 102 may send the audio signal to the wireless earpiece 104, at block 218 the wireless earpiece may receive the audio signal, and at block 220 the wireless earpiece 104 may generate an audio output of the received audio signal. As an example, in an embodiment in which the audio signal is a sound associated with a specific sender ID contained in the alert message, a user may hear the sound played by the wireless earpiece 104. This playing of the sender ID associated sound in addition to the generated user-perceptible notification may give the user additional information with which to make a decision about retrieving the incoming text based message.

Figure 4:
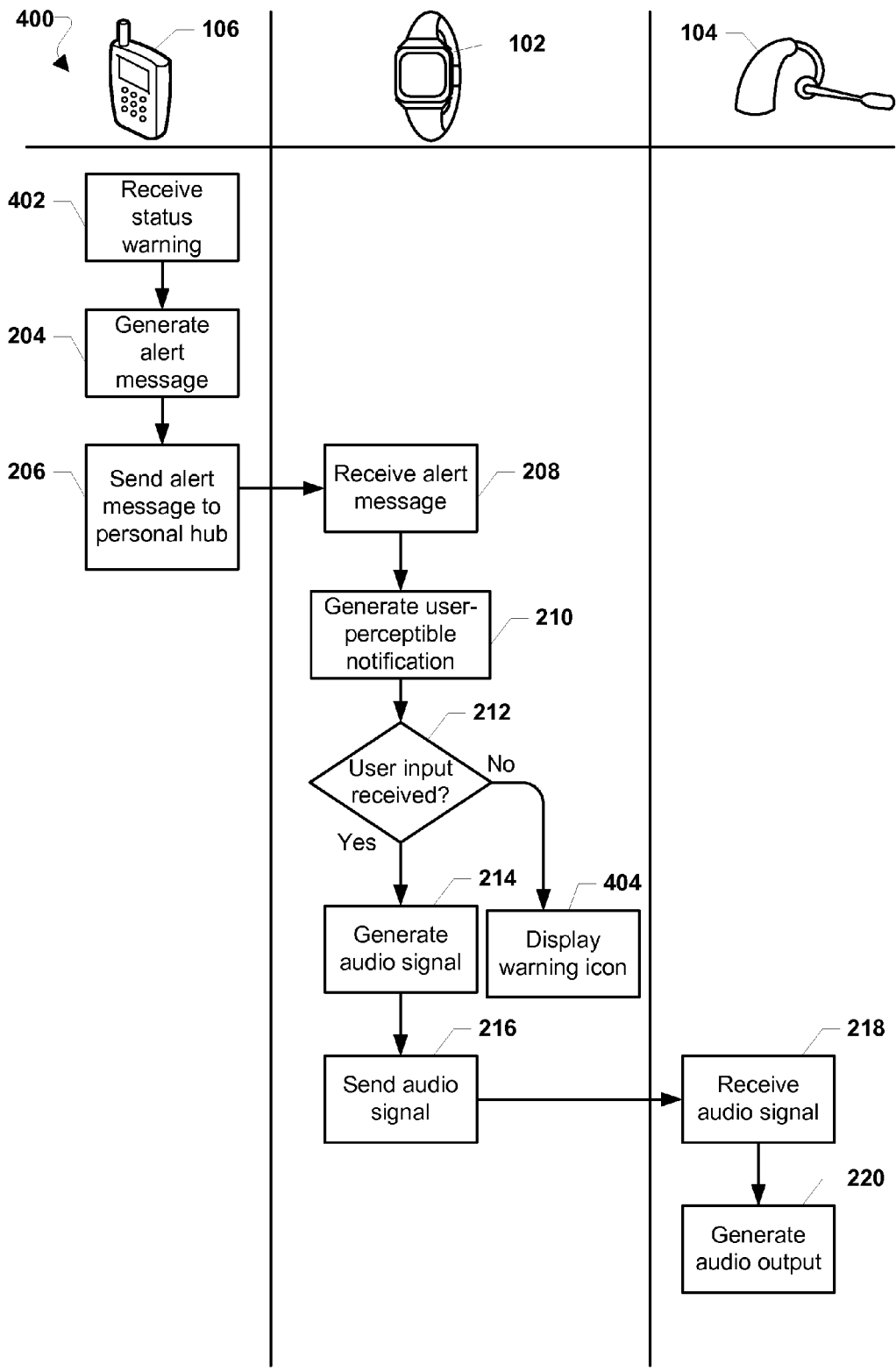
FIG. 4 is a process flow diagram illustrating a third embodiment method for providing and escalating notifications.

FIG. 4 illustrates an embodiment method 400 for providing and escalating notifications from a smart phone 106 to a personal hub 102 and wireless earpiece 104 similar to method 200 discussed above with reference to FIG. 2, except that method 400 may provide notifications related to an incoming status warning. At block 402 the smart phone 106 may receive a status warning. As an example, a status warning may be a warning generated by the smart phone 106 or a warning related to device, such as another mobile device (e.g., laptop 108). As an example, a status warning may be a warning of a change in condition of a device, such as a low battery indication or an indication of a degradation in network connectivity. As discussed above, at block 204 the smart phone may generate an alert message. As discussed further below, an alert message may include information relating to the status warning, for example the status warning or a portion of the status warning.

As discussed above, at block 206 the smart phone 106 may send the alert message to the personal hub 102, and at blocks 208, 210, and 212 the personal hub 102 may perform operations of like numbered blocks of method 200 described above with reference to FIG. 2. If a user input is not received (i.e., determination block 212="No"), at block 404 the personal hub 102 may display a warning icon which may serve as an indication to the user that a status warning has been received by the smart phone 106 but has not been acknowledged by the user. If a user input is received in the personal hub 102 (i.e., determination block 212="Yes"), at block 214 the personal hub may generate an audio signal to send to the wireless earpiece 104.

As an example, the audio signal may be a sound associated only with status warnings. As discussed above, at block 216 the personal hub 102 may send the audio signal to the wireless earpiece 104, at block 218 the wireless earpiece may receive the audio signal, and at block 220 the wireless earpiece 104 may generate an audio output of the received audio signal. As an example, in an embodiment in which the audio signal is a sound associated with status warnings, a user may hear the sound played by the wireless earpiece 104. This playing of the status warning associated sound, in addition to the generated user-perceptible notification, may give the user additional information with which to make a decision about acknowledging the status warning.

Figure 5:
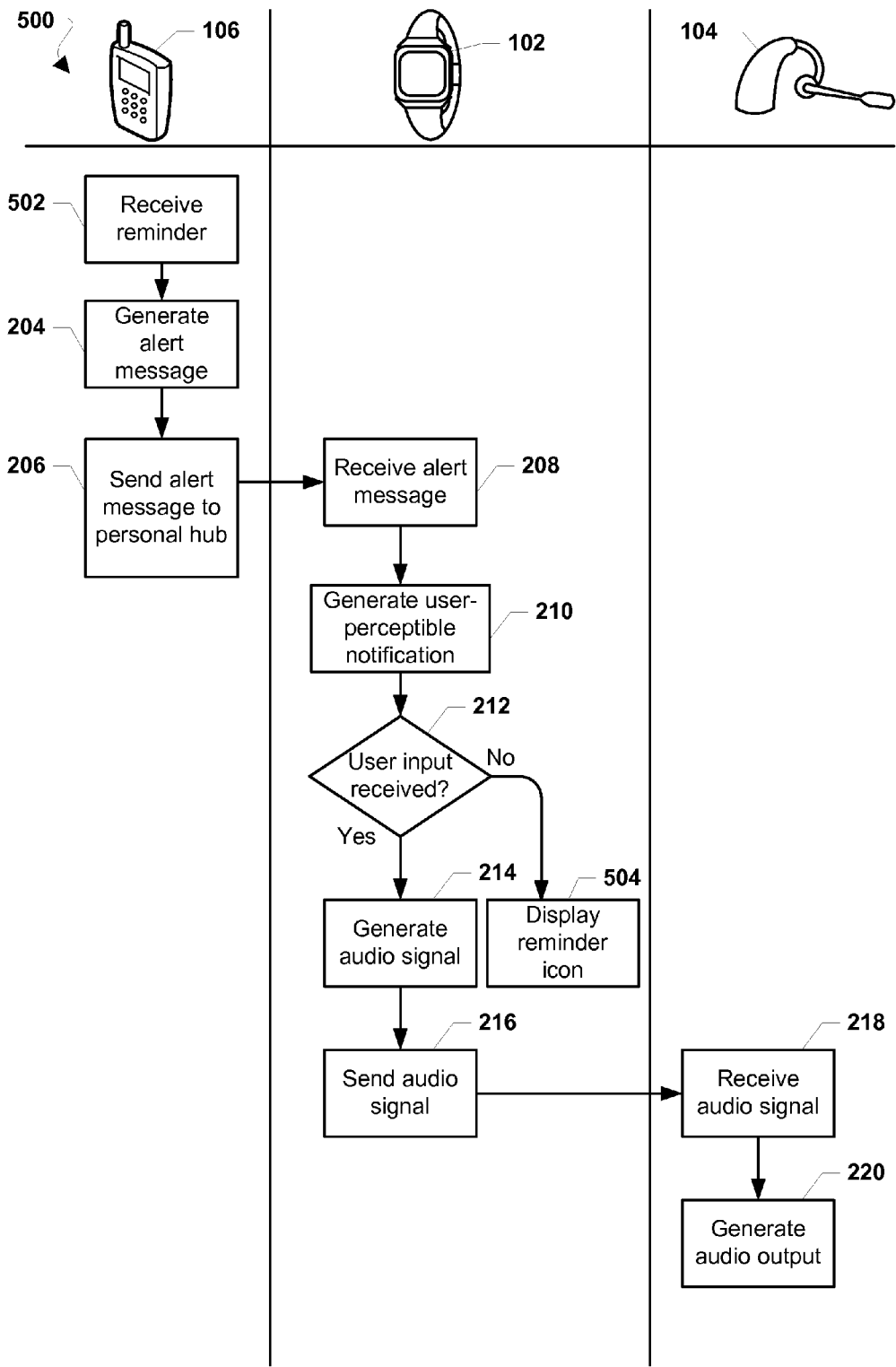
FIG. 5 is a process flow diagram illustrating a fourth embodiment method for providing and escalating notifications.

FIG. 5 illustrates an embodiment method 500 for providing and escalating notifications from a smart phone 106 to a personal hub 102 and wireless earpiece 104 similar to method 200 discussed above with reference to FIG. 2, except that method 500 may provide notifications related to a received reminder. At block 502 the smart phone 106 may receive a reminder. As an example, a reminder may be a reminder generated by the smart phone 106 or a reminder generated by another device, such as another mobile device (e.g., laptop 108) or a remote server. As an example, a reminder may be a calendar reminder associated with an event identified in a calendar application running on the smart phone 106. As discussed above, at block 204 the smart phone may generate an alert message. As discussed further below, an alert message may include information relating to the reminder, for example the reminder or a portion of the reminder.

As discussed above, at block 206 the smart phone 106 may send the alert message to the personal hub 102, and at blocks 208, 210, and 212 the personal hub 102 may perform operations of like numbered blocks of method 200 described above with reference to FIG. 2. If a user input is not received (i.e., determination block 212="No"), at block 504 the personal hub 102 may display a reminder icon which may serve as an indication to the user that a calendar event may be approaching. If a user input is received in the personal hub 102 (i.e., determination block 212="Yes"), at block 214 the personal hub may generate an audio signal to send to the wireless earpiece 104. As an example, the audio signal may be a sound associated only with reminders.

As discussed above, at block 216 the personal hub 102 may send the audio signal to the wireless earpiece 104, at block 218 the wireless earpiece may receive the audio signal, and at block 220 the wireless earpiece 104 may generate an audio output of the received audio signal. As an example, in an embodiment in which the audio signal is a sound associated with reminders, a user may hear the sound played by the wireless earpiece 104. This playing of the reminder associated sound, in addition to the generated user-perceptible notification, may give the user additional information with which to make a decision about acknowledging the reminder.

Figure 6:
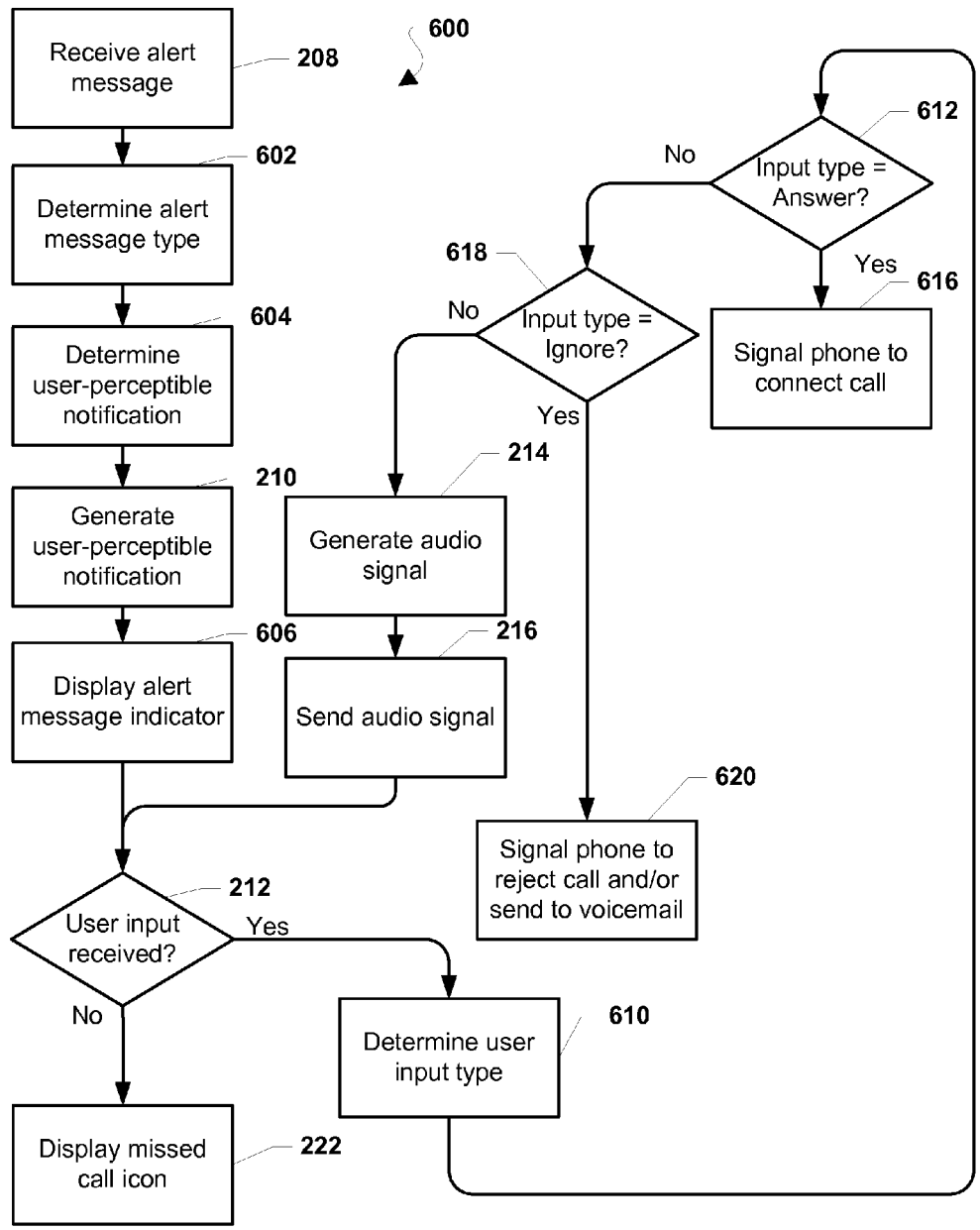
FIG. 6 is a process flow diagram illustrating an embodiment method for escalating notifications for an incoming call.

FIG. 6 illustrates an embodiment method 600 for escalating notifications for an incoming call based on received user inputs. In an embodiment, method 600 may be implemented in personal hub 102. As discussed above, at block 208 the personal hub 102 may receive an alert message. In an embodiment, the alert message may include information indicating an alert message type as discussed further below. As an example, the alert message may include information indicating the alert message was generated in response to an incoming call to a smart phone 106. At block 602 the personal hub 102 may determine the alert message type. In an embodiment, the personal hub 102 may compare information in the alert message to information stored in a memory of the personal hub 102, such as a data table, to determine the alert message type.

At block 604 the personal hub 102 may determine a user-perceptible notification to generate. In an embodiment, the personal hub 102 may determine a user-perceptible notification based on the alert message type. In an embodiment in which the personal hub 102 is configured to generate multiple different user-perceptible notifications (e.g., different displays, different vibrations, different vibration patterns, and/or any combination thereof) the determination of the alert message type may enable the personal hub 102 to associate different user-perceptible notifications with different alert message types. As an example, a data table stored in a memory of the personal hub may associate each alert message type with its own user-perceptible notification. As an example, an alert message indicating an incoming call has been received by a smart phone 106 may be associated with a specific user-perceptible notification such as a vibration of a set duration period (e.g., two seconds). As discussed above, at block 210 the personal hub 102 may generate the determined user-perceptible notification.

At block 606 the personal hub 102 may display an alert message indicator. The alert message indicator may be a visual indication that the personal hub 102 received an alert message, for example a blinking light, a flash of the personal hub 102 screen, an icon displayed on the personal hub 102 screen, etc. In an embodiment, the alert message indicator may be different for each alert message type. In a further embodiment, the alert message indicator may display information contained in the alert message, such as a caller or sender ID.

As discussed above, at determination block 212 the personal hub 102 may determine whether a user input is received in the personal hub 102. If no user input is received in the personal hub 102 (i.e., determination block 212="No"), as discussed above, at block 222 the personal hub may display a missed call icon. If a user input is received in the personal hub 102 (i.e., determination block 212="Yes"), at block 610 the personal hub may determine the user input type. In the various embodiments, the personal hub 102 may be configured to receive multiple different user inputs. In an embodiment, the personal hub 102 may include buttons, a touch screen, and accelerometers. In such an embodiment, different button push events may represent different user inputs. In such an embodiment, different gestures performed on the touch screen (e.g., slide and drag events, taps, double taps, swipes, flicks, pinches, etc.) may represent different user inputs. In such an embodiment, different movements of the personal hub 102 (e.g., up, down, left, right, in a circle, shaking, etc.) may be detected by the accelerometers, and may represent different user inputs.

At determination block 612, the personal hub 102 may determine whether the input type is an input type associated with answering the incoming call. As an example, the personal hub 102 may reference a data table stored in a memory of the personal hub 102 in which user inputs are correlated with actions to be taken in response to the received user inputs to determine whether the input type is an input type associated with answering the incoming call. If the input type is associated with answering the incoming call (i.e., determination block 612="Yes"), at block 616 the personal hub 102 may signal the smart phone 106 to connect the call. As an example, the personal hub 102 may send an answer signal from the personal hub 102 to the smart phone 106 via wireless data link 128. As discussed further below, in response to receiving such an answer signal, the smart phone 106 may activate the call over the wireless data link 134 between the wireless earpiece 104 and the smart phone 106.

If the input type is not associated with answering the incoming call (i.e., determination block 612="No"), at determination block 618 the personal hub 102 may determine whether the input type is an input type associated with ignoring the incoming call. As an example, the personal hub 102 may reference a data table stored in a memory of the personal hub 102 in which user inputs are correlated with actions to be taken in response to the received user inputs to determine whether the input type is an input type associated with ignoring the incoming call. If the input type is associated with ignoring the incoming call (i.e., determination block 618="Yes"), at block 620 the personal hub 102 may signal the smart phone 106 to reject the incoming call and/or send the incoming call to voicemail. As an example, the personal hub 102 may send a reject signal from the personal hub 102 to the smart phone 106 via wireless data link 128. In this manner, upon receiving the reject signal, the smart phone 106 may ignore the incoming call and/or send the incoming call to voicemail based on the smart phone 106 settings.

If the input type is not associated with ignoring the incoming call (i.e., determination block 618="No"), as discussed above with reference to FIG. 2, at block 214 the personal hub 102 may generate an audio signal and at block 216 may send the audio signal to the wireless earpiece 104. The method 600 may then proceed to determination block 212. In this manner, method 600 may enable a user to control the escalation of notifications following an initial user-perceptible notification. As an example, following a user-perceptible notification, a user may desire to escalate the notification and a first user input may result in the generation of an audio signal, if the user then desires to answer the call (i.e., escalate the notification further), a second user input may result in the activation of the call.

Figure 7:
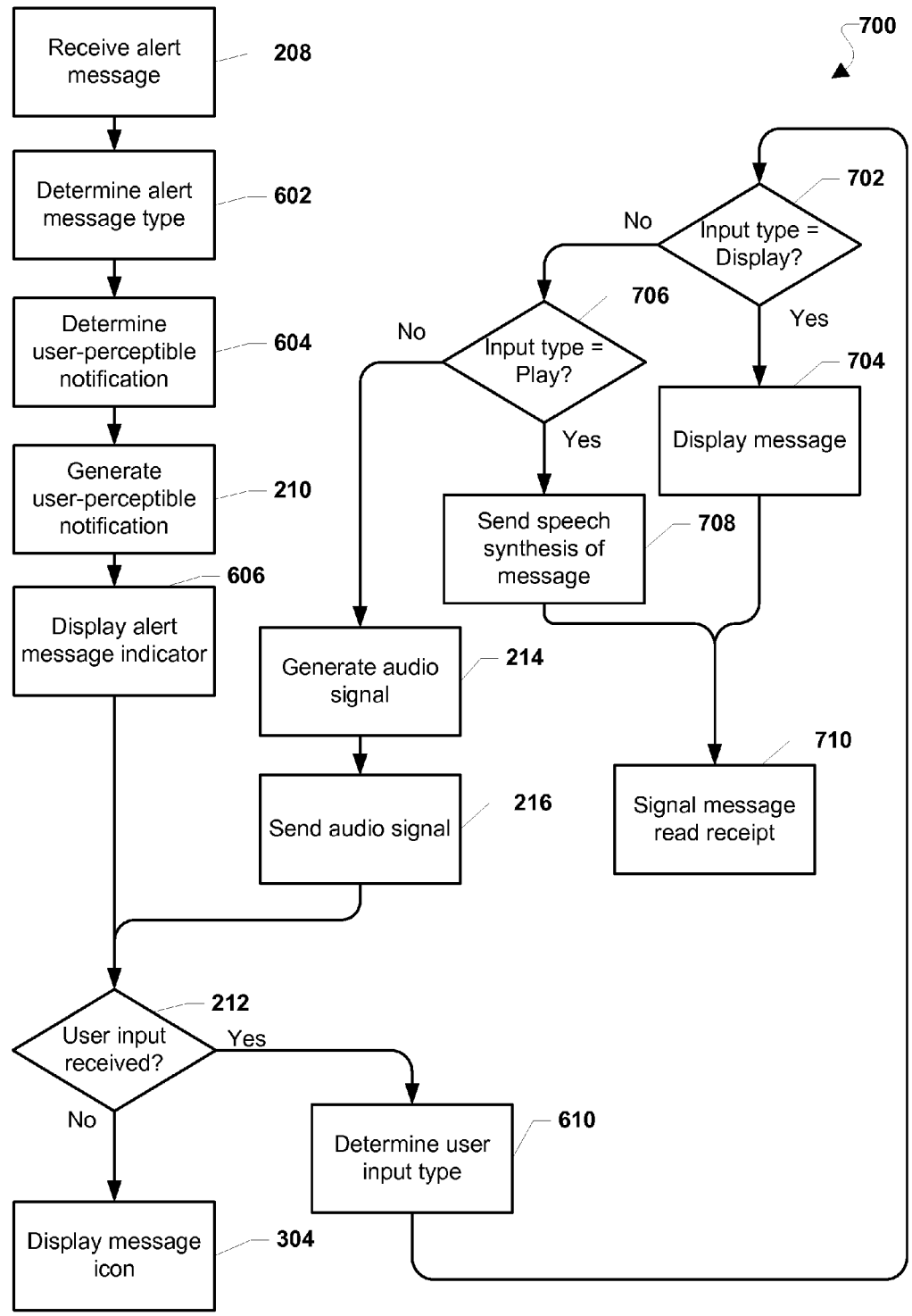
FIG. 7 is a process flow diagram illustrating an embodiment method for escalating notifications for an incoming text based message.

FIG. 7 illustrates an embodiment method 700 for escalating notifications similar to method 600 discussed above with reference to FIG. 6, except that method 700 may escalate notifications for an incoming text based message. As discussed above, at block 208 the personal hub 102 may receive an alert message. As discussed further below, an alert message associated with a text based message may contain information related to the text based message, such as all or part of the text based message itself and/or a speech synthesis of the text based message. At blocks 602, 604, 210, and 606 the personal hub 102 may perform operations of like numbered blocks of method 600 described above with reference to FIG. 6. As discussed above, at determination block 212 the personal hub 102 may determine whether a user input is received in the personal hub 102. If no user input is received in the personal hub 102 (i.e., determination block 212="No"), as discussed above, at block 304 the personal hub 102 may display a message icon. If a user input is received in the personal hub 102 (i.e., determination block 212="Yes"), as discussed above, at block 610 the personal hub may determine the user input type.

At determination block 702 the personal hub 102 may determine whether the input type is an input type associated with displaying the message. As an example, the personal hub 102 may reference a data table stored in a memory of the personal hub 102 in which user inputs are correlated with actions to be taken in response to the received user inputs to determine whether the input type is an input type associated with displaying the incoming text based message. If the input type is associated with displaying the (i.e., determination block 702="Yes"), at block 704 the personal hub 102 may display the text based message. As an example, in an embodiment in which the alert message contains a portion of the text based message, the personal hub 102 may display the portion of the text based message on a display of the personal hub 102.

At block 710 the personal hub 102 may signal a message read receipt. As an example, the signal of a message read receipt may be a message from the personal hub 102 back to the mobile device that originated the alert message (e.g., a read receipt indication sent from the personal hub 102 to the smart phone 106 via wireless data link 128). As an additional example, signaling of a message read receipt may be sent from the personal hub 102 to all mobile devices with a wireless data link to the personal hub 102 (e.g., a read receipt indication sent from the personal hub 102 to the smart phone 106 and the laptop 108 via wireless data links 128 and 132, respectively). As discussed further below, signaling a message read receipt to multiple mobile devices may prevent multiple notifications for an already read message being generated.

If the input type is not associated with displaying the text based message (i.e., determination block 702="No"), at determination block 706 the personal hub 102 may determine whether the input type is an input type associated with playing a speech synthesis of the text based message. As an example, the personal hub 102 may reference a data table stored in a memory of the personal hub 102 in which user inputs are correlated with actions to be taken in response to the received user inputs to determine whether the input type is an input type associated with playing a speech synthesis of the text based message. If the input type is associated with playing the text based message (i.e., determination block 706="Yes"), at block 708 the personal hub 102 may send a speech synthesis of the text based message (e.g., the speech synthesis of the text based message in the alert message) to the wireless earpiece 104. In this manner, upon receiving the speech synthesis the wireless earpiece 104 may generate an audio output for the user of the wireless earpiece 104 that may allow the user to receive the text based message without needing to retrieve their mobile device (e.g., smart phone 106). As discussed above, at block 710 the personal hub may signal a message read receipt. If the input type is not associated with playing the text based message (i.e., determination block 706="No"), as discussed above with reference to FIG. 3, at block 214 the personal hub 102 may generate an audio signal and at block 216 may send the audio signal to the wireless earpiece 104. The method 700 may then proceed to determination block 212, and, in this manner, the method 700 may enable a user to control the escalation of notifications following an initial user-perceptible notification.

Figure 8:
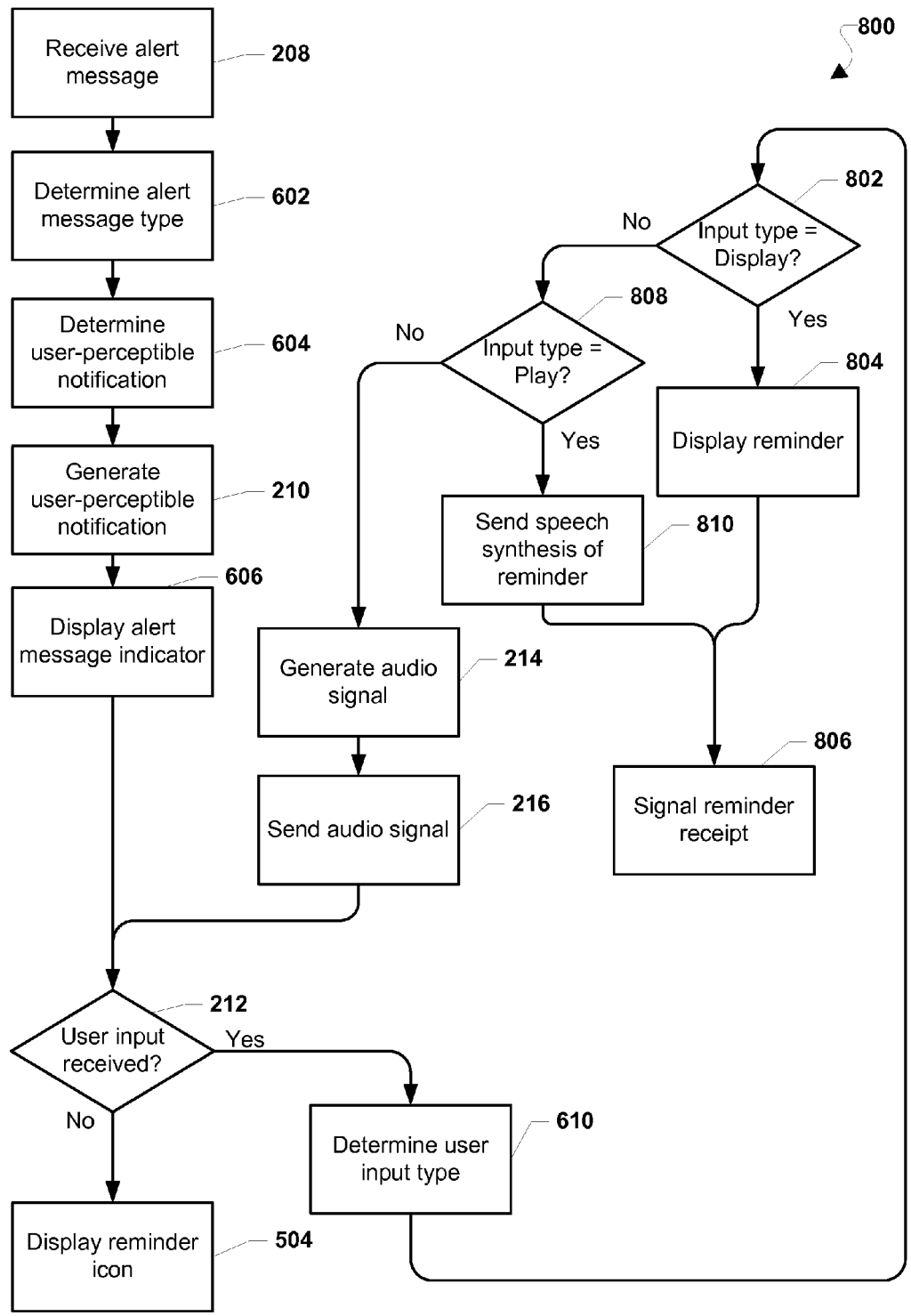
FIG. 8 is a process flow diagram illustrating an embodiment method for escalating notifications for a reminder.

FIG. 8 illustrates an embodiment method 800 for escalating notifications similar to method 600 discussed above with reference to FIG. 6, except that method 800 may escalate notifications for a reminder. As discussed above, at block 208 the personal hub 102 may receive an alert message. As discussed further below, an alert message associated with a reminder may contain information related to the reminder, such as all or part of the reminder itself and/or a speech synthesis of the reminder. At blocks 602, 604, 210, and 606 the personal hub 102 may perform operations of like numbered blocks of method 600 described above with reference to FIG. 6. As discussed above, at determination block 212 the personal hub 102 may determine whether a user input is received in the personal hub 102. If no user input is received in the personal hub 102 (i.e., determination block 212="No"), as discussed above, at block 504 the personal hub 102 may display the reminder icon. If a user input is received in the personal hub 102 (i.e., determination block 212="Yes"), as discussed above, at block 610 the personal hub may determine the user input type.

At determination block 802 the personal hub 102 may determine whether the input type is an input type associated with displaying the reminder. As an example, the personal hub 102 may reference a data table stored in a memory of the personal hub 102 in which user inputs are correlated with actions to be taken in response to the received user inputs to determine whether the input type is an input type associated with displaying the reminder. If the input type is associated with displaying the reminder (i.e., determination block 702="Yes"), at block 804 the personal hub 102 may display the reminder. As an example, in an embodiment in which the alert message contains a portion of the reminder, the personal hub 102 may display the portion of the reminder on a display of the personal hub 102.

At block 806 the personal hub may signal a reminder receipt. As an example, the signal of a reminder receipt may be a message from the personal hub 102 back to the mobile device that originated the alert message (e.g., a reminder receipt indication sent from the personal hub 102 to the smart phone 106 via wireless data link 128). As an additional example, signaling of a reminder receipt may be sent from the personal hub 102 to all mobile devices with a wireless data link to the personal hub 102 (e.g., a reminder receipt indication sent from the personal hub 102 to the smart phone 106 and the laptop 108 via wireless data links 128 and 132, respectively). As discussed further below, in an embodiment in which multiple mobile devices generate and/or display reminders associated with the same event (e.g., a shared calendar with shared calendar events) signaling a reminder receipt to multiple mobile devices may prevent multiple notifications being provided to the user for the same event.

If the input type is not associated with displaying the reminder (i.e., determination block 802="No"), at determination block 808 the personal hub 102 may determine whether the input type is an input type associated with playing a speech synthesis of the reminder. As an example, the personal hub 102 may reference a data table stored in a memory of the personal hub 102 in which user inputs are correlated with actions to be taken in response to the received user inputs to determine whether the input type is an input type associated with playing a speech synthesis of the reminder. If the input type is associated with playing the reminder (i.e., determination block 808="Yes"), at block 810 the personal hub 102 may send a speech synthesis of the reminder (e.g., the speech synthesis of the reminder in the alert message) to the wireless earpiece 104. In this manner, upon receiving the speech synthesis the wireless earpiece 104 may generate an audio output for the user of the wireless earpiece 104 that may allow the user to receive the reminder without needing to retrieve their mobile device (e.g., smart phone 106). As discussed above, at block 806 the personal hub may signal a reminder receipt. If the input type is not associated with playing the speech synthesis of the reminder (i.e., determination block 808="No"), as discussed above, at block 214 the personal hub 102 may generate an audio signal and at block 216 may send the audio signal to the wireless earpiece 104. The method 800 may then proceed to determination block 212, and, in this manner, the method 800 may enable a user to control the escalation of notifications following an initial user-perceptible notification.

Figure 9:
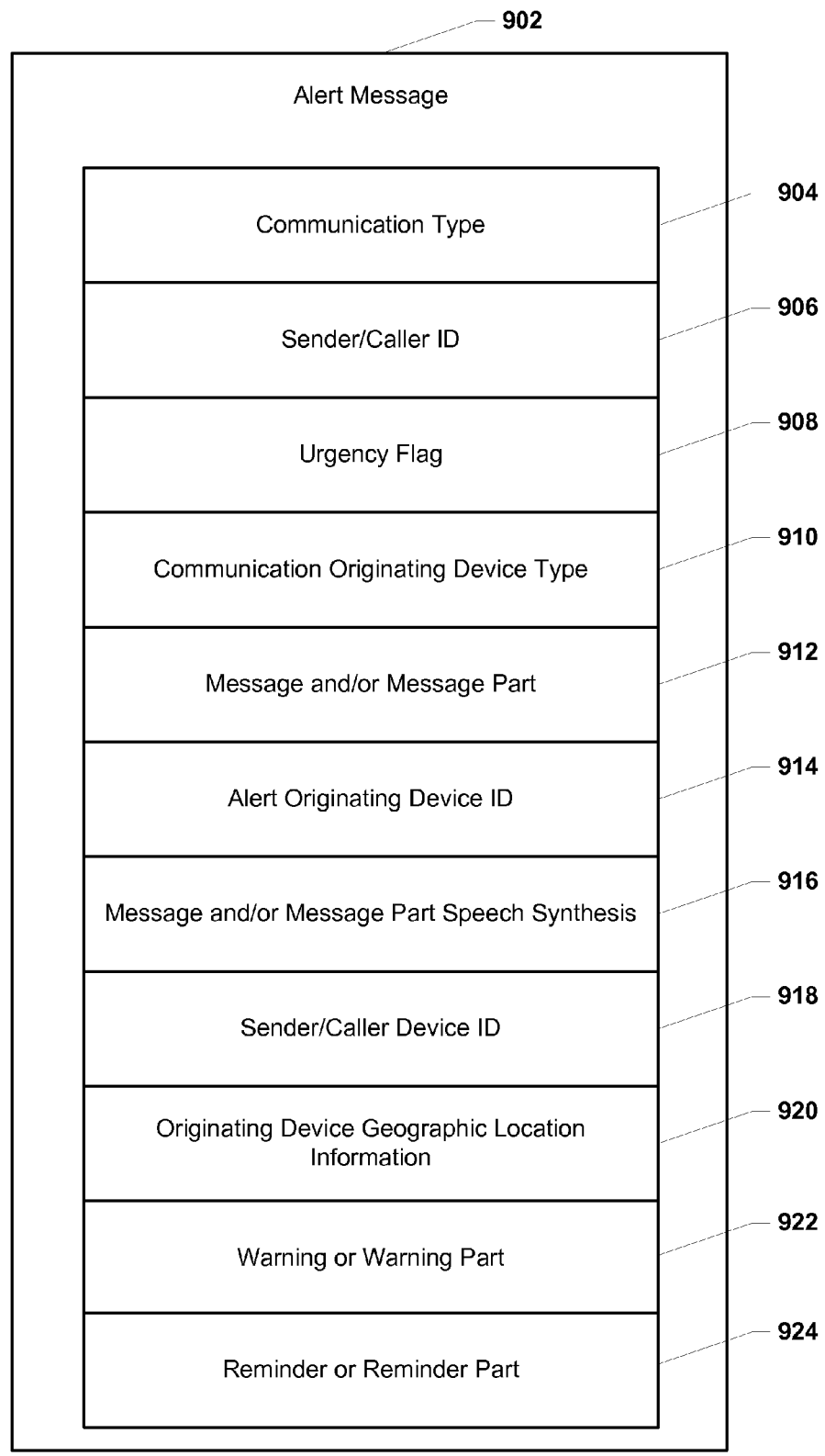
FIG. 9 is a data structure diagram illustrating potential elements of an alert message.
Figure 22:
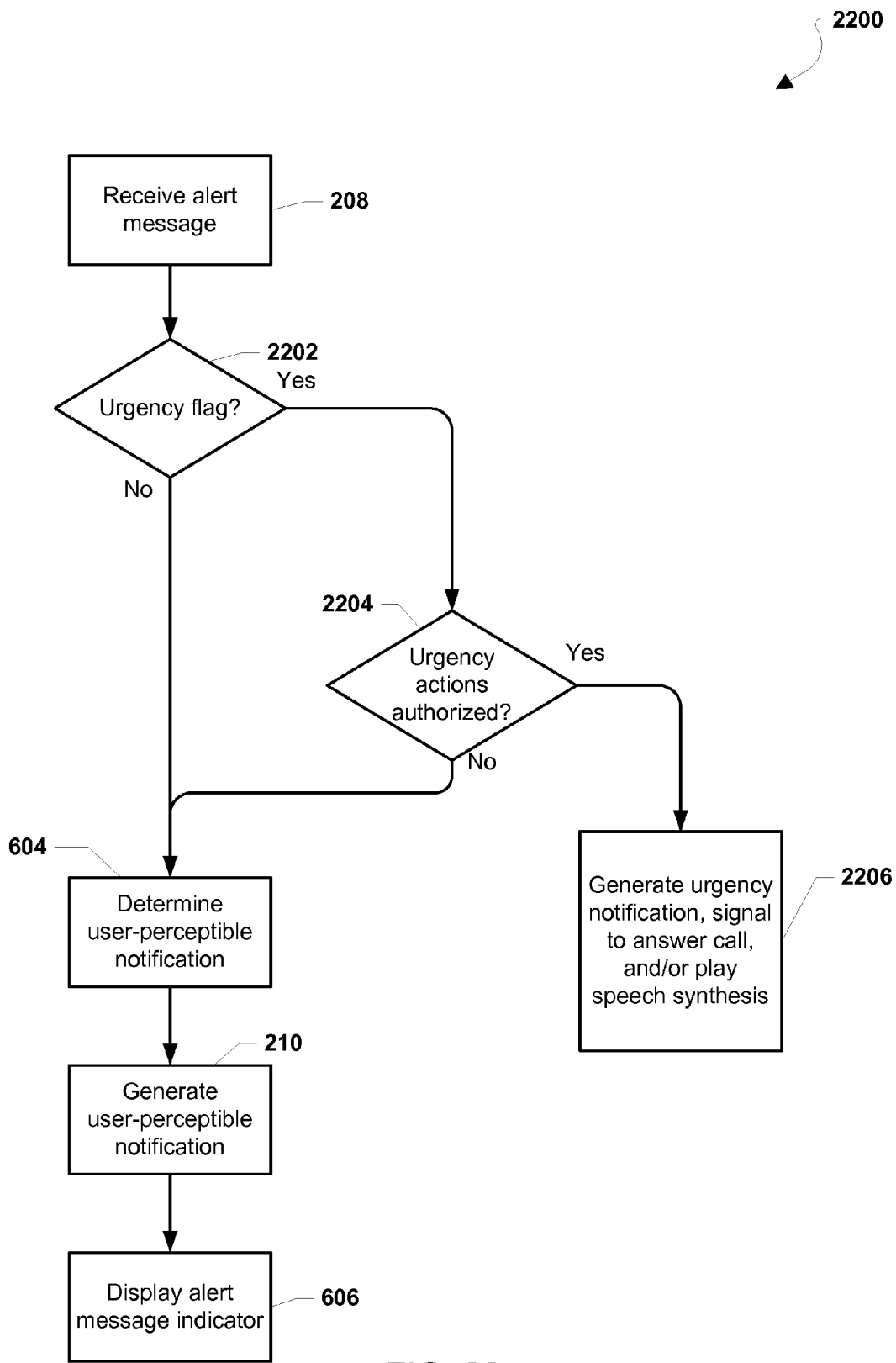
FIG. 22 is a process flow diagram illustrating an embodiment method for generating urgent notifications.
Figure 23:
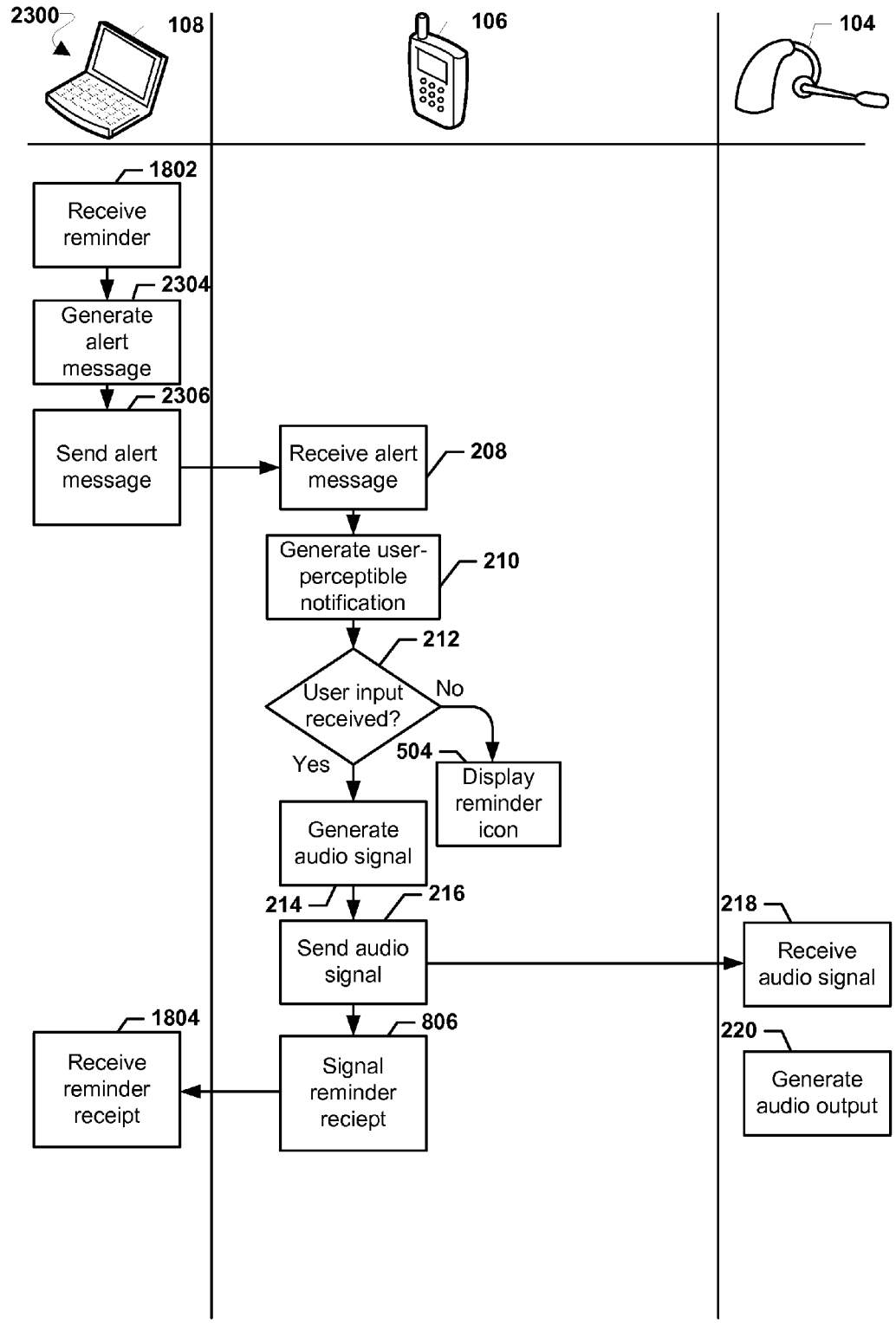
FIG. 23 is a process flow diagram illustrating a fifth embodiment method for providing and escalating notifications.
Figure 30:
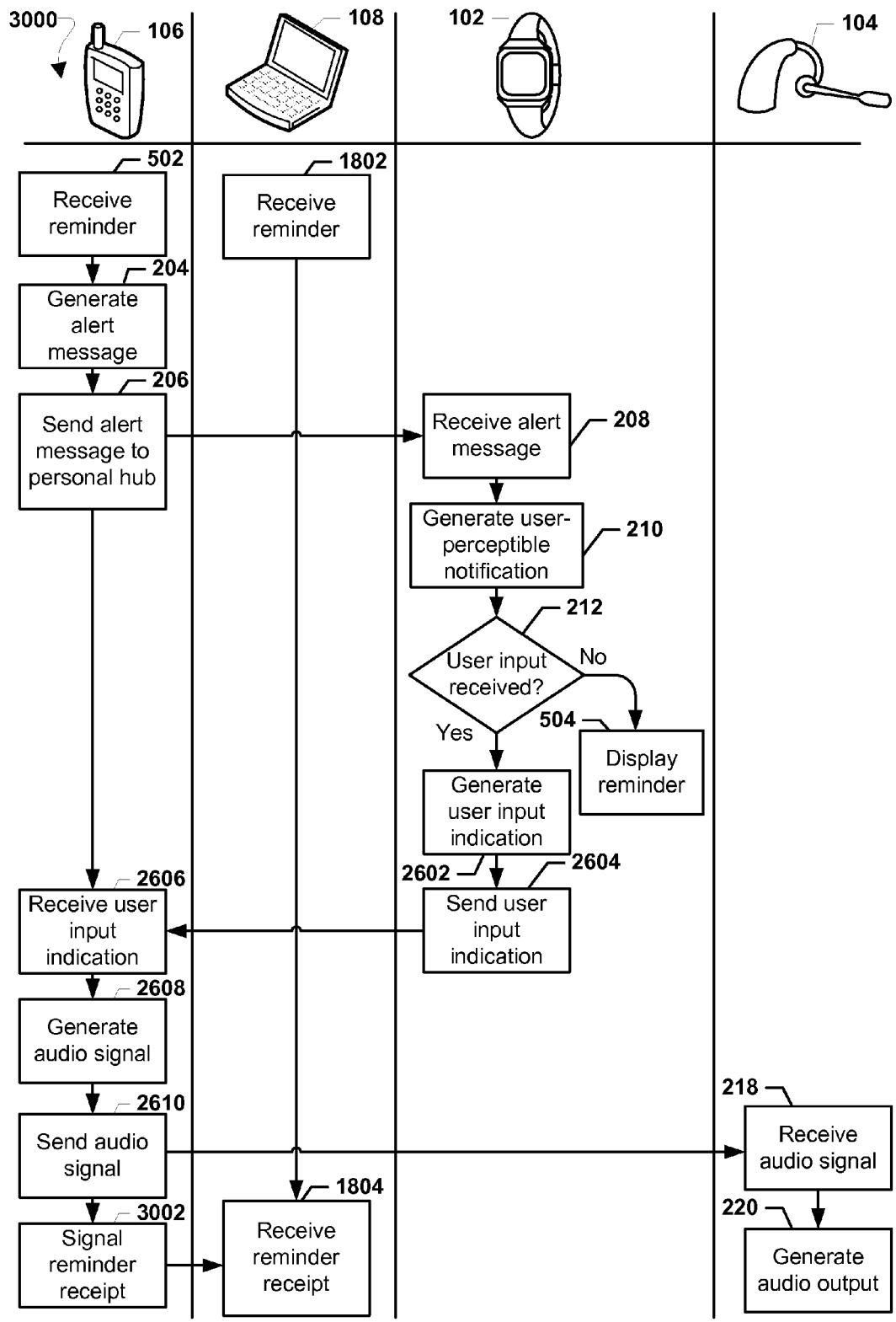
FIG. 30 is a process flow diagram illustrating another embodiment method for sending reminder receipt indications from a personal hub.
Figure 31:
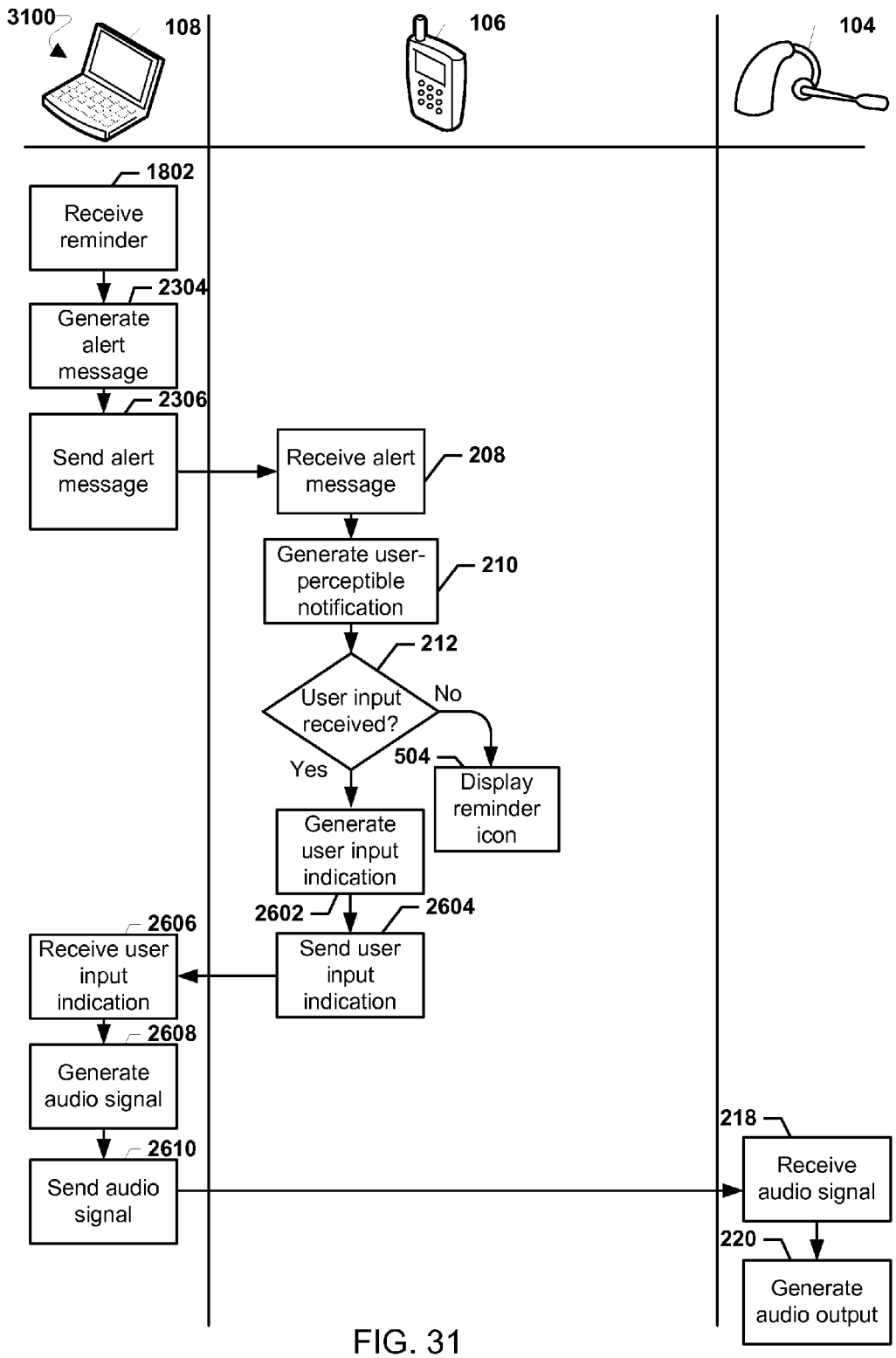
FIG. 31 is a process flow diagram illustrating an eleventh embodiment method for providing and escalating notifications.

FIG. 9 is a data structure diagram illustrating potential elements of an alert message 902, which may be generated at block 204 in FIGS. 2-5, 12-18, 24, 26-30 and 34; which may be generated at block 2304 in FIGS. 23 and 31; and/or received in block 208 in FIGS. 2-8, 18-19, 21-23 and 26-33. An alert message 902 may include information describing the communication type 904 of the communication in response to which the alert message 902 was generated. As examples, communication type 904 may be a data label indicating the communication was an incoming voice or data call, an incoming SMS text message, an incoming e-mail, a reminder, an application notification, such as a Facebook® post notification and/or game high score change notification, or a status warning. An alert message 902 may include a sender/caller ID 906 related to the received incoming call or text based message. As examples, the sender/caller ID 906 may be the originating phone number for an incoming call or the e-mail address of a sender of an e-mail or a name associated with the originating phone number or e-mail address. An alert message 902 may include an urgency flag 908 which may be a designation in the alert message 902 that the alert message 902 was generated in response to an urgent communication. In some embodiments, the urgency flag 908 may be a designation in the alert message 902 that the alert message 902 was generated in response to a communication that included one or more indications (e.g., one or more keywords) that indicate urgency. In an embodiment, urgency flags 908 may be binary (i.e., an alert message is urgent or not and an urgency flag is set or not). In an alternative embodiment, an urgency flag 908 may be a descriptive designator (i.e., the urgency flag 908 may itself be associated with different levels of urgency, enabling different messages to be labeled with different urgency levels).

An alert message 902 may include information about the communication originating device type 910. As an example, the alert message 902 may include information to enable distinguishing between device categories, such as land-line phones, smart phones, laptops, etc. for the originating device. As an additional example, the alert message 902 may include information as specific as the make and model of the communication originating device. An alert message 902 may include the message and/or message part 912 of an incoming text based message received by the alert message 902 generating device. In an embodiment, the alert message 902 may include only part of an incoming text based message. As an example an alert message 902 may include the message header of a received SMS text message. In an alternative embodiment, the alert message 902 may include all of an incoming text based message. As an example, an alert message 902 may include the e-mail header and e-mail payload of a received e-mail. An alert message 902 may include an alert originating device ID 914. An alert message 902 may include a message and/or message part speech synthesis 916. As discussed further below, in an embodiment, the mobile device originating the alert message 902 may generate a speech synthesis 916 of a received text based message and/or a speech synthesis 916 of part of a text based message, and may include the speech synthesis 916 in the alert message 902.

An alert message 902 may include a sender/caller device ID 918. As an example, the sender/caller device ID 918 may be a network ID or a group ID assigned to the device originating the communication. An alert message 902 may include originating device geographic location information 920. As an example, originating device geographic location information 920 may be GPS coordinates of the originating device which may be received as part of a received text based message or which may be transmitted with an incoming voice call or data call. An alert message 902 may include a warning or warning part 922. As an example, an alert message 902 generated in response to a low battery warning for a mobile device may include information such as a battery charge level estimate. An alert message 902 may include a reminder or reminder part 924. As an example, an alert message 902 generated in response to a calendar event may include the start time for the calendar event and the location of the calendar event.

Figure 10:
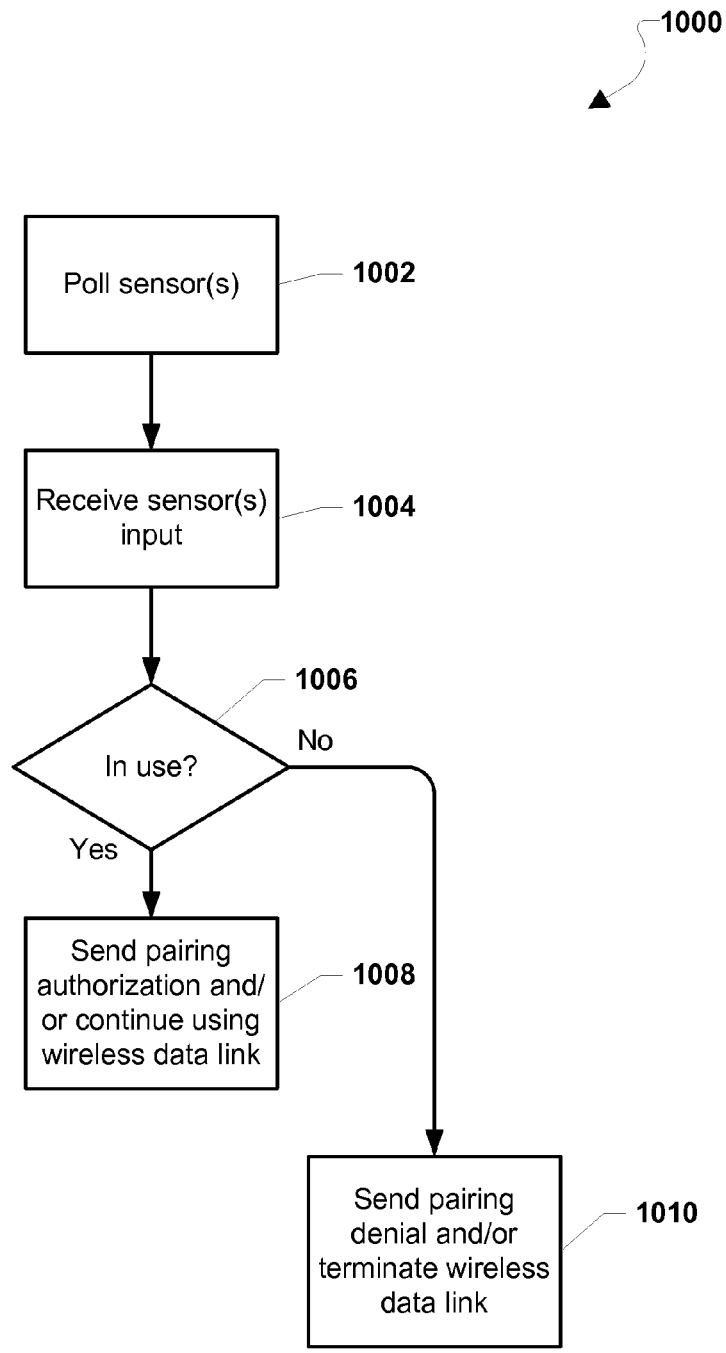
FIG. 10 is a process flow diagram illustrating an embodiment method for linking a personal hub with other devices.

FIG. 10 illustrates an embodiment method 1000 for ensuring a personal hub 102 may not be linked with other devices (e.g., wireless earpiece 104, smart phone 106, and/or laptop 108) when the personal hub 102 may be powered on, but not in use by a user. At block 1002 the personal hub 102 may poll a sensor or sensors included in the personal hub 102. In an embodiment, the personal hub 102 may include sensors, such as temperature sensors and/or accelerometers. As an example, a processor of the personal hub 102 may poll a temperature sensor located on a back panel of the personal hub 102 to request a temperature reading be taken. In an embodiment, the personal hub 102 may poll sensors in response to a pairing request received at the personal hub 102. In an additional embodiment, the personal hub 102 may poll sensors periodically based on internal settings. At block 1004 the processor of the personal hub 102 may receive the sensor(s) input.

At determination block 1006, the personal hub 102 may determine whether the personal hub 102 is in use by a user. As an example, utilizing the received sensor input, such as a temperature reading, the personal hub 102 may determine whether it is in use. As an example, the personal hub 102 may compare the received temperature reading to a data table stored in a memory of the personal hub 102. A temperature reading near 98.6 degrees Fahrenheit may indicate the personal hub 102 is being worn by a user, and a temperature reading lower than 98.6 degrees may indicate the personal hub 102 is not being worn, and thus may not be in use by the user. As an alternative example, if no motion of the personal hub 102 is detected by the accelerometers, the personal hub 102 may not be in use. If the personal hub 102 is in use (i.e., determination block 1006="Yes"), at block 1008 the personal hub 102 may send a pairing authorization and/or continue using a wireless data link already establish (e.g., wireless data link 128 established between the personal hub 102 and the smart phone 106). If the personal hub 102 is not in use (i.e., determination block 1006="No"), at block 1010 the personal hub 102 may send a pairing denial and/or terminate a previously established data link. In this manner, a personal hub 102 device that is powered on, but not in use (e.g., in a user's bag rather than being worn by the user) may be prevented from receiving alert messages. By preventing the receipt of alert messages by a personal hub 102 that may not be in use, a processor of the personal hub 102 may not be taxed until the personal hub 102 is actually in use which may conserve battery power at the personal hub 102. In an embodiment, when the personal hub 102 returns to use (i.e., is worn by the user again), alert messages which were not previously sent to the personal hub 102 may be sent in a batch to the personal hub 102.

Figure 11:
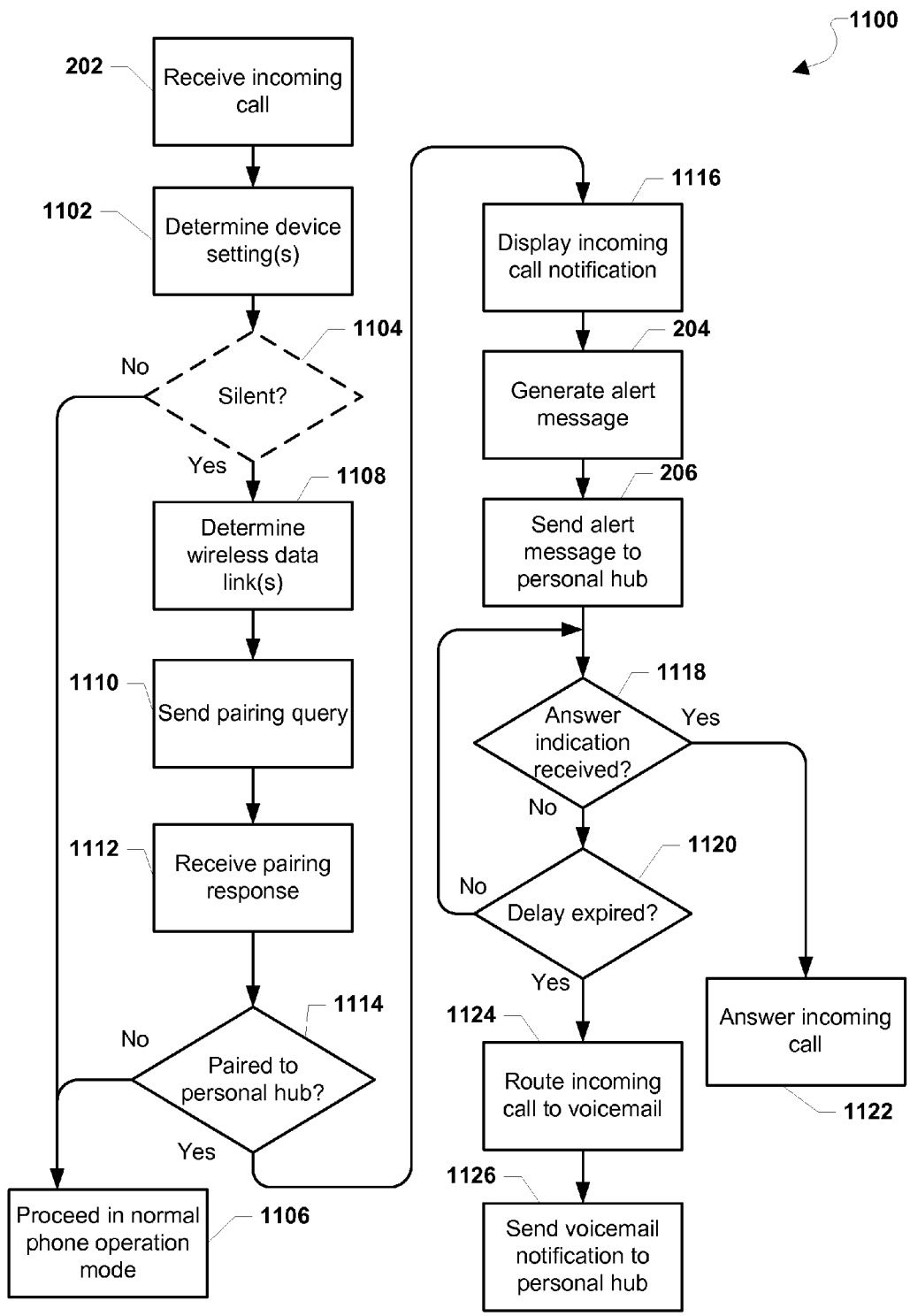
FIG. 11 is a process flow diagram illustrating an embodiment method for generating alert messages from a mobile device.

FIG. 11 illustrates an embodiment method 1100 for generating alert messages from a mobile device, such as smart phone 106, in response to an incoming call. As discussed above at block 202 the mobile device may receive an incoming call. At block 1102 the mobile device may determine the current device setting(s) related to generating notifications. For example, device settings related to generating notifications may include silent (e.g., no audible sound or vibration generated), vibrate (e.g., no audible sound generated), discrete (e.g., a minimal sound generated), and/or various volume settings for generated sounds. In an embodiment, a mobile device may default to sending alert messages regardless of device settings. In an optional embodiment, a mobile device may optionally determine whether or not to send alert messages based on device settings. In an optional embodiment, at optional determination block 1104, the mobile device may determine whether the device setting is silent. If the device setting is not silent (i.e., optional determination block 1104="No"), at block 1106 the mobile device may proceed in normal operation mode. If the device setting is silent (i.e., optional determination block 1104="Yes"), the method 1100 may proceed to block 1108.

At block 1108 the mobile device may determine the wireless data link(s) the mobile device has established with other devices. As an example, smart phone 106 may determine wireless data links 126 and 128 with the laptop 108 and personal hub 102, respectively, have been established. At block 1110 the mobile device may send a pairing request to the personal hub 102. At block 1112 the mobile device may receive a pairing response for the personal hub 102. At determination block 1114 the mobile device may determine whether the mobile device is paired to the personal hub 102. If the mobile device is not paired to the personal hub 102 (i.e., determination block 1114="No"), at block 1106 the mobile device may proceed in normal operation mode.

If the mobile device is paired to the personal hub 102 (i.e., determination block 1114="Yes"), at block 1116 the mobile device may display an incoming call notification. As an example, the mobile device may flash a light or display an incoming call icon on a screen of the mobile device. As discussed above, at block 204 the mobile device may generate an alert message, and at block 206 may send the alert message to the personal hub 102.

At determination block 1118 the mobile device may determine whether an answer indication has been received from the personal hub 102. As an example, an answer indication may be an answer signal from the personal hub 102 received over a wireless data link, such as wireless data link 128 established between the smart phone 106 and the personal hub 102. If an answer indication is received (i.e., determination block 1118="Yes"), at block 1122 the mobile device may answer the incoming call. In an embodiment, the mobile device may answer the incoming call by activating the call with the mobile device and exchanging voice and data packets over a wireless data link with the wireless earpiece 104. If an answer indication is not received (i.e., determination block 1118="No"), at determination block 1120 the mobile device may determine whether a delay has expired. As an example, the delay may be a period of time or number of rings to wait. As an example, the delay may be a value stored in a memory of the mobile device, or may be a countdown timer started upon sending the alert message at block 206. If the delay has not expired (i.e., determination block 1120="No"), the method 1100 may return to determination block 1118. If the delay has expired (i.e., determination block 1120="Yes"), at block 1124 the mobile device may route the incoming call to voicemail. At block 1126 the mobile device may send a voicemail notification to the personal hub 102. In this manner, the personal hub 102 may display a voicemail icon to indicate to the user a voicemail is available.

Figure 12:
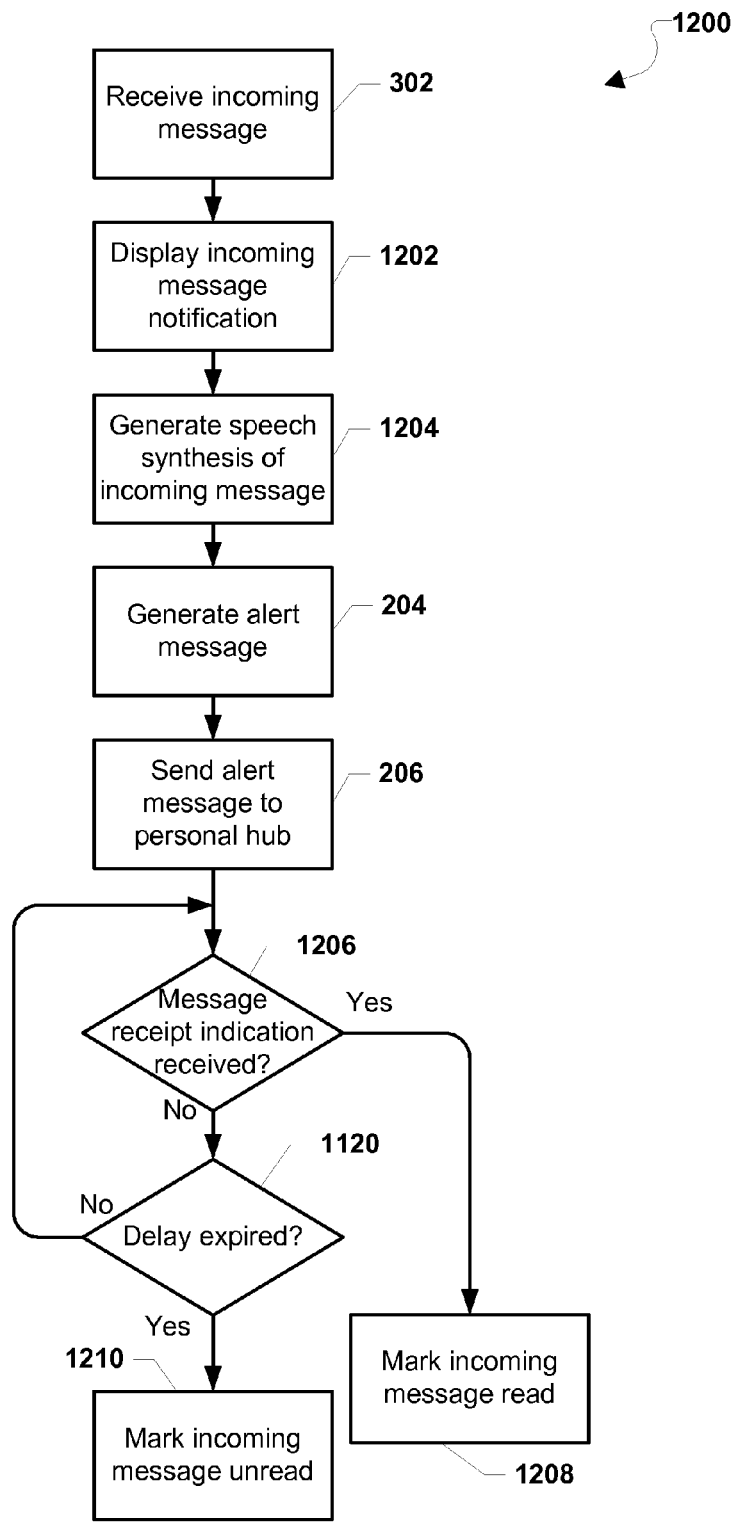
FIG. 12 is a process flow diagram illustrating a second embodiment method for generating alert messages from a mobile device.

FIG. 12 illustrates an embodiment method 1200 for generating alert messages from a mobile device, such as smart phone 106, in response to an incoming text based message. As discussed above, at block 302 the mobile device may receive an incoming text based message. At block 1202 the mobile device may display an incoming text based message notification. As examples, an incoming text based message notification may be a flashing light on the mobile device and/or an icon displayed a screen of the mobile device. At block 1204 the mobile device may generate a speech synthesis of the incoming message. As an example, the mobile device may utilize a speech synthesizer application to convert the text in a text based message to speech and may store the speech synthesis as an audio file in an audio format suitable for play over the wireless earpiece 104. Alternatively, the mobile device may utilize the speech synthesizer application to convert a portion of the text in a text based message to speech (e.g., header information, such as sender, time, and subject). In the various embodiments, the mobile device may use well known speech synthesis methods to convert the text in a text based message to speech. As discussed above, at block 204 the mobile device may generate an alert message, and at block 206 the mobile device may send the alert message to the personal hub 102. As discussed above, the alert message may include the speech synthesis generated at block 1204.

At determination block 1206 the mobile device may determine whether a message receipt indication is received from the personal hub 102. If a message receipt indication is received (i.e., determination block 1206="Yes"), at block 1208 the mobile device may mark the incoming text based message as read. As an example, the mobile device may mark an e-mail as read in an e-mail application resident on the mobile device. If a message receipt is not received (i.e., determination block 1206="No"), as discussed above, at determination block 1120 the mobile device may determine whether a delay has expired. If the delay has not expired (i.e., determination block 1120="No"), the method 1200 may return to determination block 1206. If the delay has expired (i.e., determination block 1120="Yes"), at block 1210 the incoming text based message may be marked as unread. As an example, the mobile device may mark a SMS text message as unread in a SMS text message list resident on the mobile device.

Figure 13:
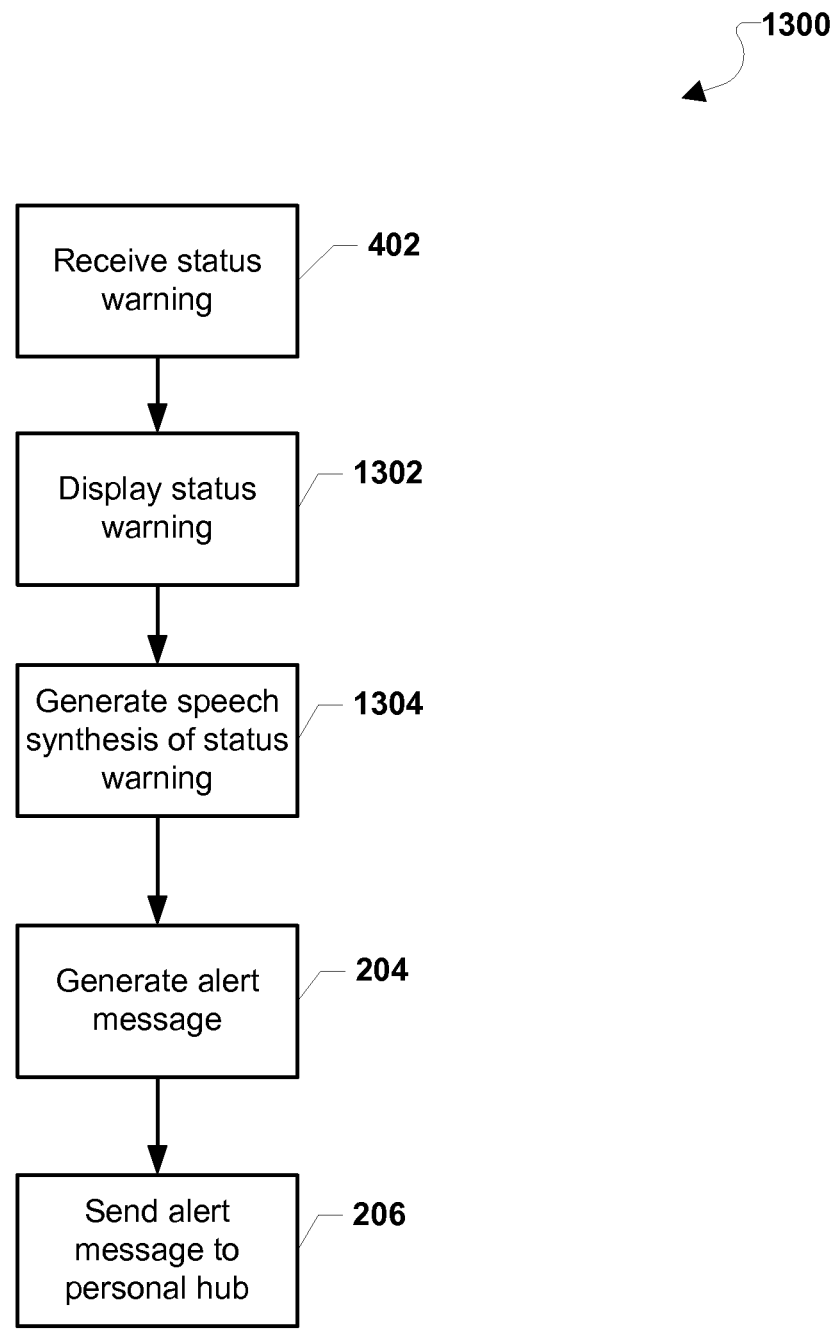
FIG. 13 is a process flow diagram illustrating a third embodiment method for generating alert messages from a mobile device.

FIG. 13 illustrates an embodiment method 1300 for generating alert messages from a mobile device, such as smart phone 106, in response to a status warning. As discussed above, at block 402 the mobile device may receive a status warning. At block 1302 the mobile device may display the status warning. As an example, the mobile device may display an icon on a display of the mobile device corresponding to the status warning type. At block 1304 the mobile device may generate a speech synthesis of the status warning. As an example, the mobile device may convert a textual warning label and an originating device ID included in the status warning into a speech synthesis. As discussed above, at block 204 the mobile device may generate an alert message. In an embodiment, the alert message may include the generated speech synthesis of the status warning. As discussed above, at block 206 the mobile device may send the alert message to the personal hub 102.

Figure 14:
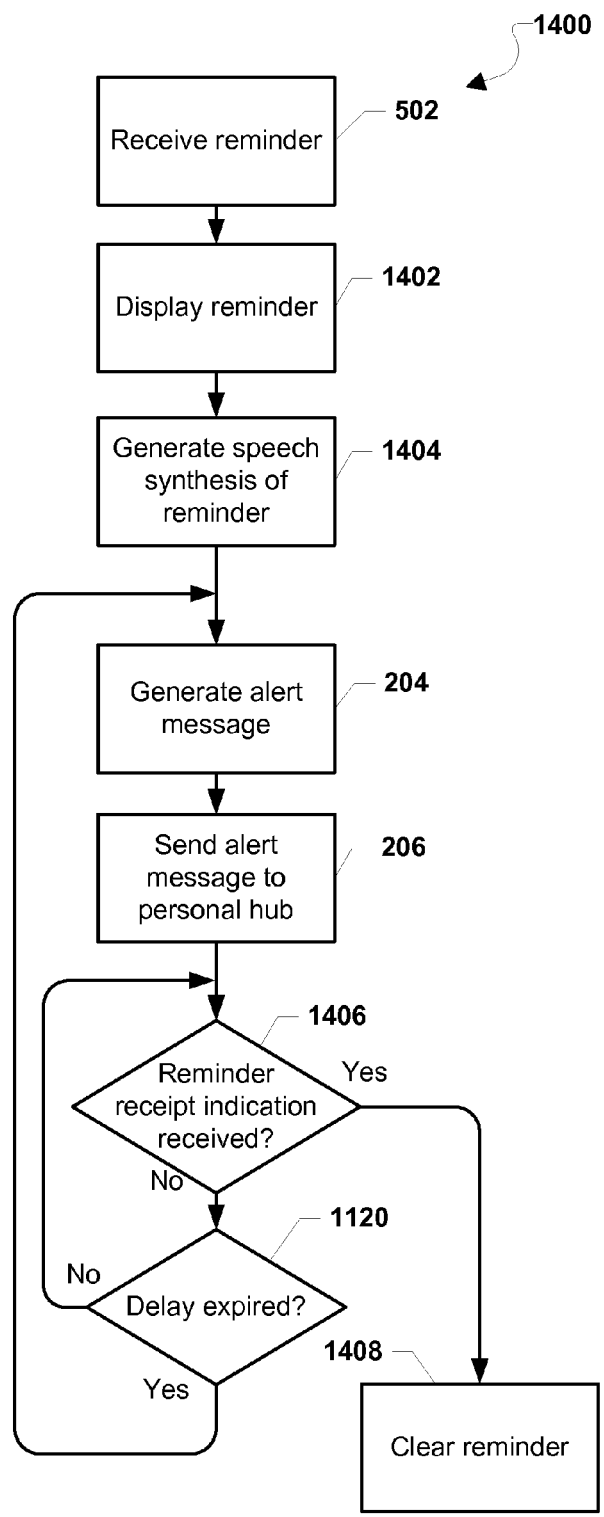
FIG. 14 is a process flow diagram illustrating a fourth embodiment method for generating alert messages from a mobile device.

FIG. 14 illustrates an embodiment method 1400 for generating alert messages from a mobile device, such as smart phone 106, in response to a reminder. As discussed above at block 502 the mobile device may receive a reminder. At block 1402 the mobile device may display the reminder. As an example, the mobile device may display a pop up message including the reminder information on a screen of the mobile device. At block 1404 the mobile device may generate a speech synthesis of the reminder. As an example, the mobile device may convert the date, time, location, and subject information included in a reminder into a speech synthesis. As discussed above at block 204 the mobile device may generate an alert message. In an embodiment, the alert message may include the speech synthesis. As discussed above, at block 206 the mobile device may send the alert message to the personal hub 102. At determination block 1406 the mobile device may determine whether a reminder receipt indication is received from the personal hub 102. If a reminder receipt indication is received (i.e., determination block 1406="Yes"), at block 1408 the mobile device may clear the reminder. If a reminder receipt is not received (i.e., determination block 1406="No"), as discussed above, at determination block 1120 the mobile device may determine if a delay has expired. If the delay has not expired (i.e., determination block 1120="No"), the method 1400 may return to determination block 1406. If the delay has expired (i.e., determination block 1120="Yes"), the method 1400 may proceed to block 204 and generate another alert message. In this manner, reminders that are not acknowledged may be continually presented to a user. In a further embodiment, the mobile device may generate only a limited number of repeat alert messages. As an example, the mobile device may increment a counter each time an alert message is generated, and when the counter value exceeds a threshold the mobile device may stop generating alert messages.

Figure 15:
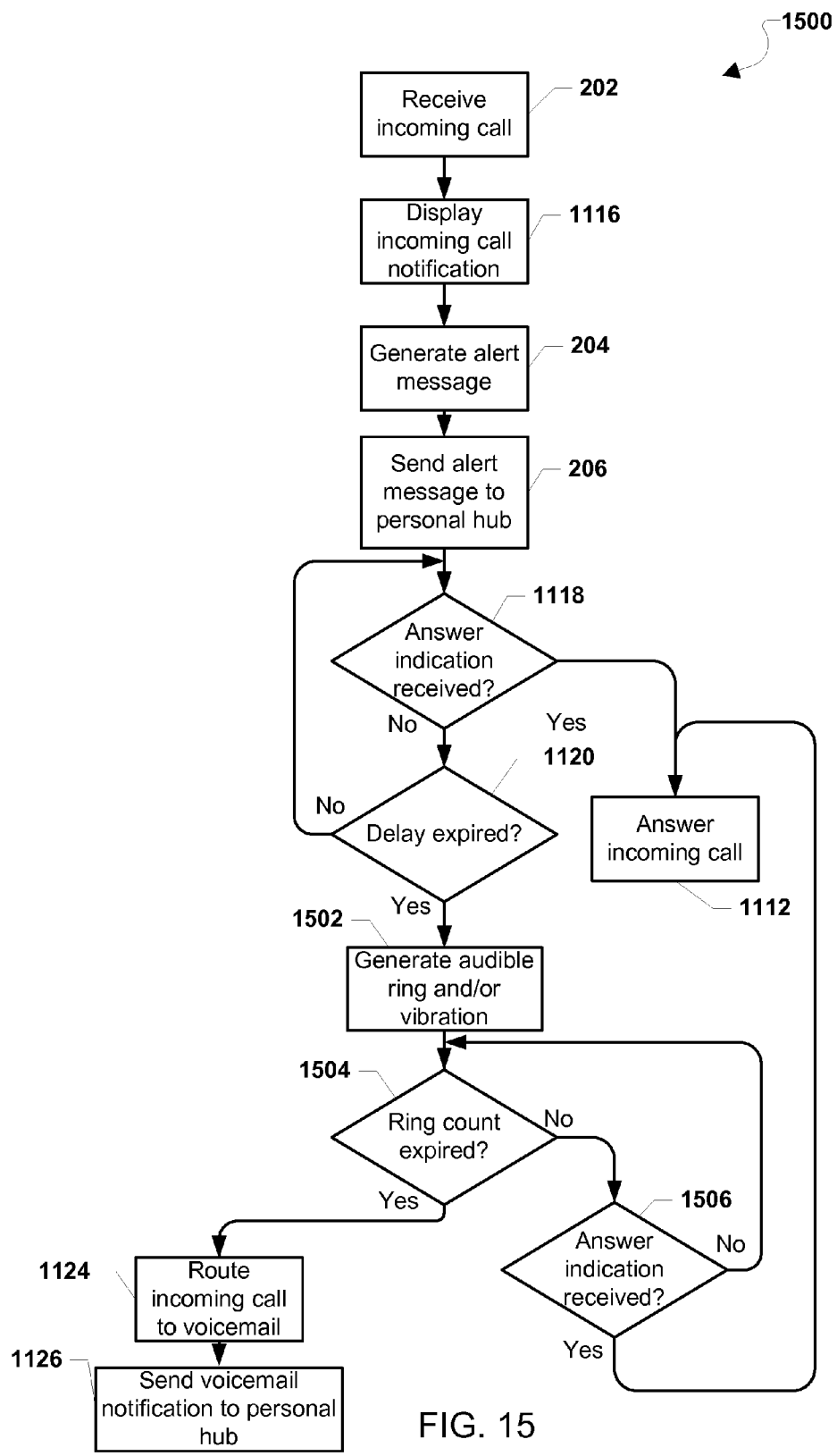
FIG. 15 is a process flow diagram illustrating a fifth embodiment method for generating alert messages from a mobile device.

FIG. 15 illustrates an embodiment method 1500 for generating alert messages from a mobile device similar to method 1100 discussed above with reference to FIG. 11, except method 1500 may escalate the notification in response to an unacknowledged alert message. At blocks 202, 1116, 204, 206, 1118, 1112, and 1120 the mobile device may perform operations of like numbered blocks of method 1100 described above with reference to FIG. 11. If the delay has expired (i.e., determination block 1120="Yes"), at block 1502 the mobile device may generate an audible ring and/or vibration. In this manner, if the incoming call is not answered in response to an alert message being sent to the personal hub 102 the mobile device may escalate the notification by audibly and/or physically generating its own notification. These escalated notifications may be more likely to be acknowledged by a user of the mobile device. At determination block 1504 the mobile device may determine if a ring count has expired. As an example, the ring count may be a value stored in a memory of the mobile device. If the ring count has not expired (i.e., determination block 1504="No"), at determination block 1506 the mobile device may determine if an answer indication has been received in the mobile device. As an example, an answer indication may be a button push event, such as an answer button push, on the mobile device. If an answer indication is received (i.e., determination block 1506="Yes"), as discussed above, at block 1112 the mobile device may answer the incoming call. If an answer indication is not received (i.e., determination block 1506="No"), the method 1500 may return to determination block 1504. If the ring count has expired (i.e., determination block 1504="Yes"), at blocks 1124 and 1126 the mobile device may perform operations of like numbered blocks of method 1100 described above with reference to FIG. 11.

Figure 16:
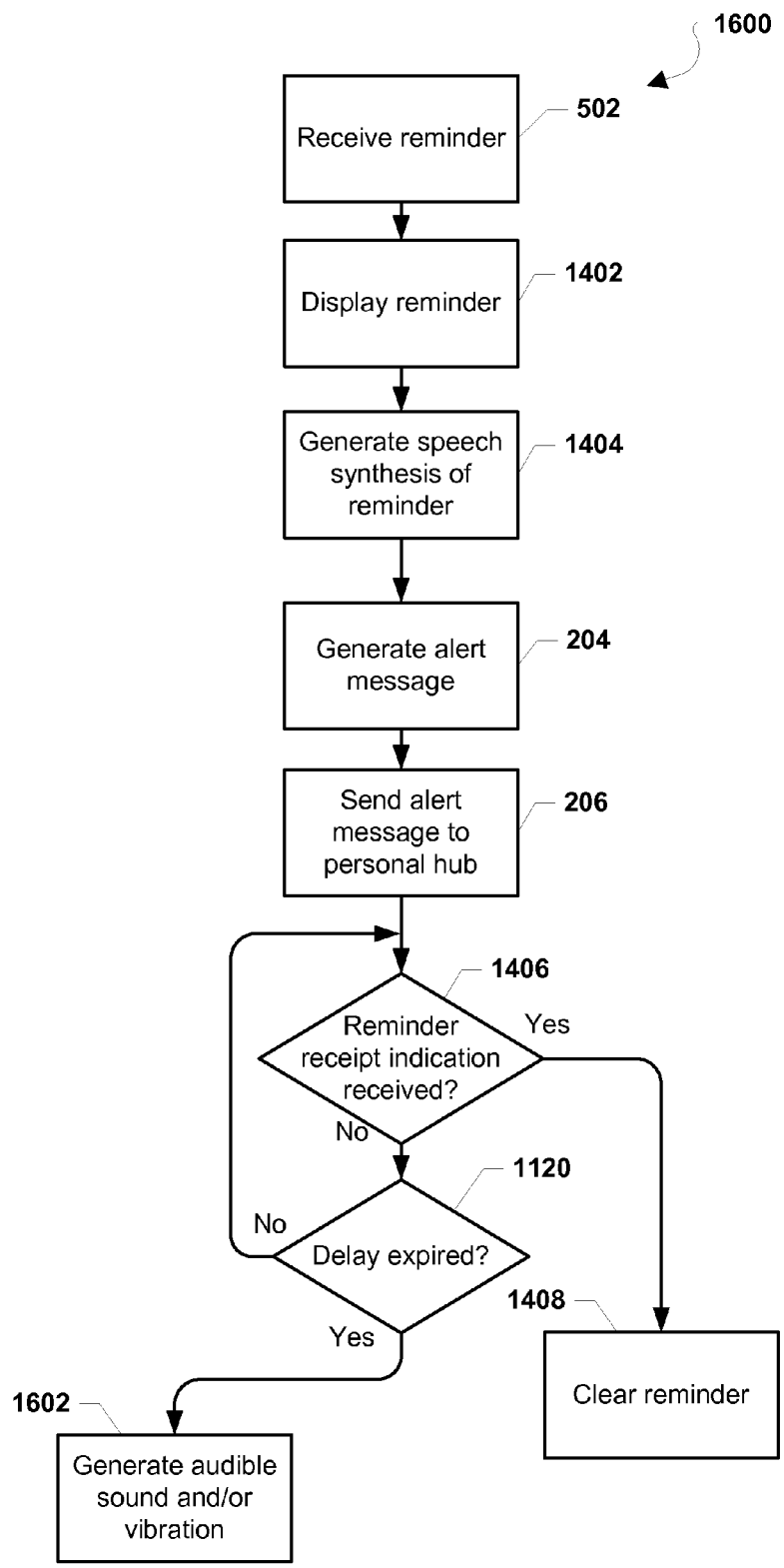
FIG. 16 is a process flow diagram illustrating an embodiment method for escalating notifications in a mobile device.

FIG. 16 illustrates an embodiment method 1600 for generating alert messages from a mobile device similar to method 1400 discussed above with reference to FIG. 14, except method 1600 may escalate the notification in response to an unacknowledged alert message. At blocks 502, 1402, 1404, 204, 206, 1406, 1408, and 1120 the mobile device may perform operations of like numbered blocks of method 1400 described above with reference to FIG. 14. If the delay has expired (i.e., determination block 1120="Yes"), at block 1602 the mobile device may generate an audible ring and/or vibration. In this manner, if the text based message is not acknowledged in response to an alert message being sent to the personal hub 102 the mobile device may escalate the notification by audibly and/or physically generating its own notification. These escalated notifications may be more likely to be acknowledged by a user of the mobile device.

Figure 17:
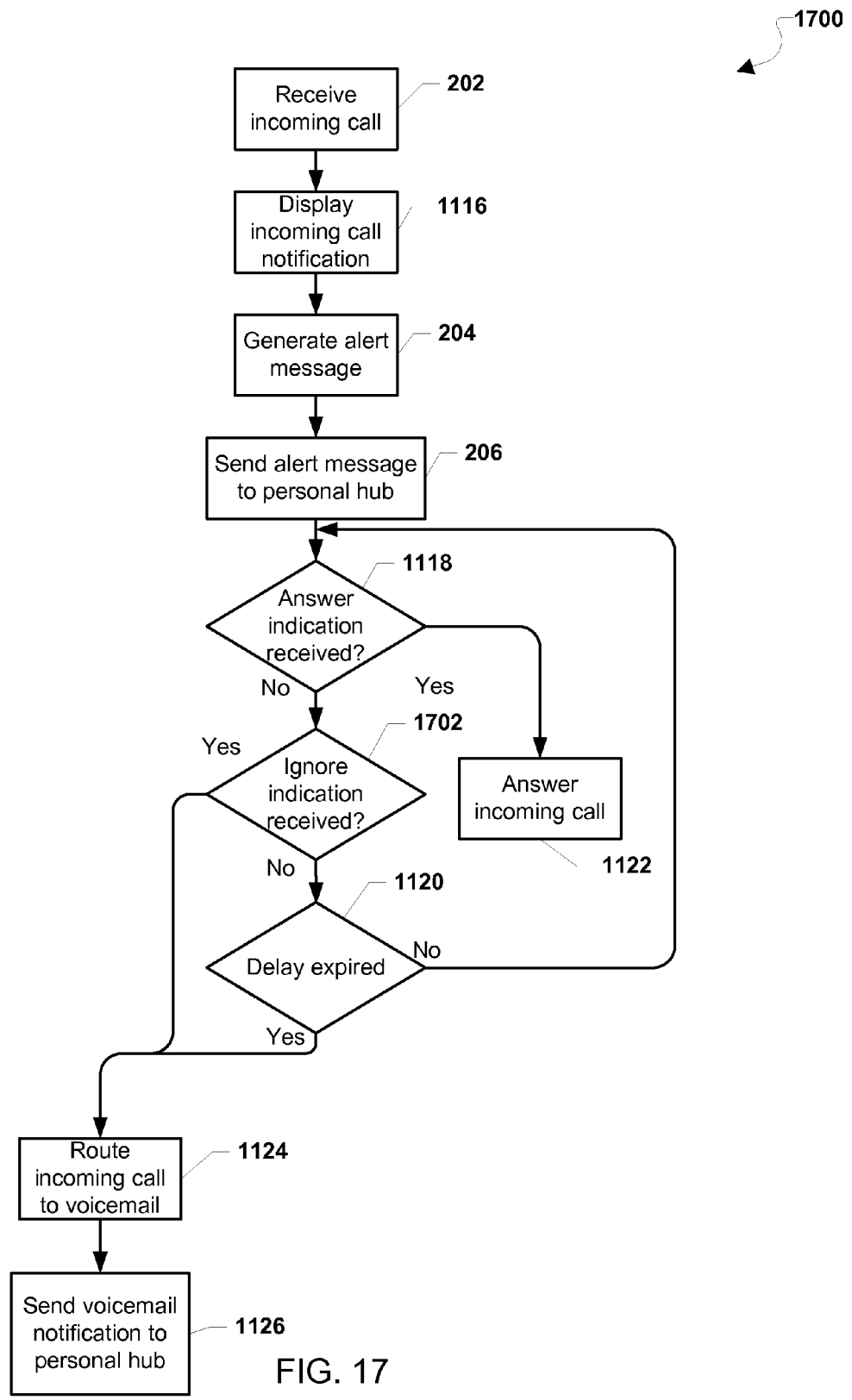
FIG. 17 is a process flow diagram illustrating a sixth embodiment method for generating alert messages from a mobile device.

FIG. 17 illustrates an embodiment 1700 for generating alert messages from a mobile device similar to method 1100 discussed above with reference to FIG. 11, except method 1700 may route the call directly to voice mail if an ignore indication is received from the personal hub 102. At blocks 202, 1116, 204, 206, 1118, and 1112 the mobile device may perform operations of like numbered blocks of method 1100 described above with reference to FIG. 11. If an answer indication is not received (i.e., determination block 1118="No"), at determination block 1702 the mobile device may determine if an ignore indication is received from the personal hub 102. If an ignore indication is received (i.e., determination block 1702="Yes"), as discussed above at block 1124 the mobile device may route the incoming call to voicemail, and at block 1126 the mobile device may send a voicemail notification to the personal hub 102. If an ignore indication is not received (i.e., determination block 1702="No"), at blocks 1120, 1124, and 1126 the mobile device may perform operations of like numbered blocks of method 1100 described above with reference to FIG. 11.

Figure 18:
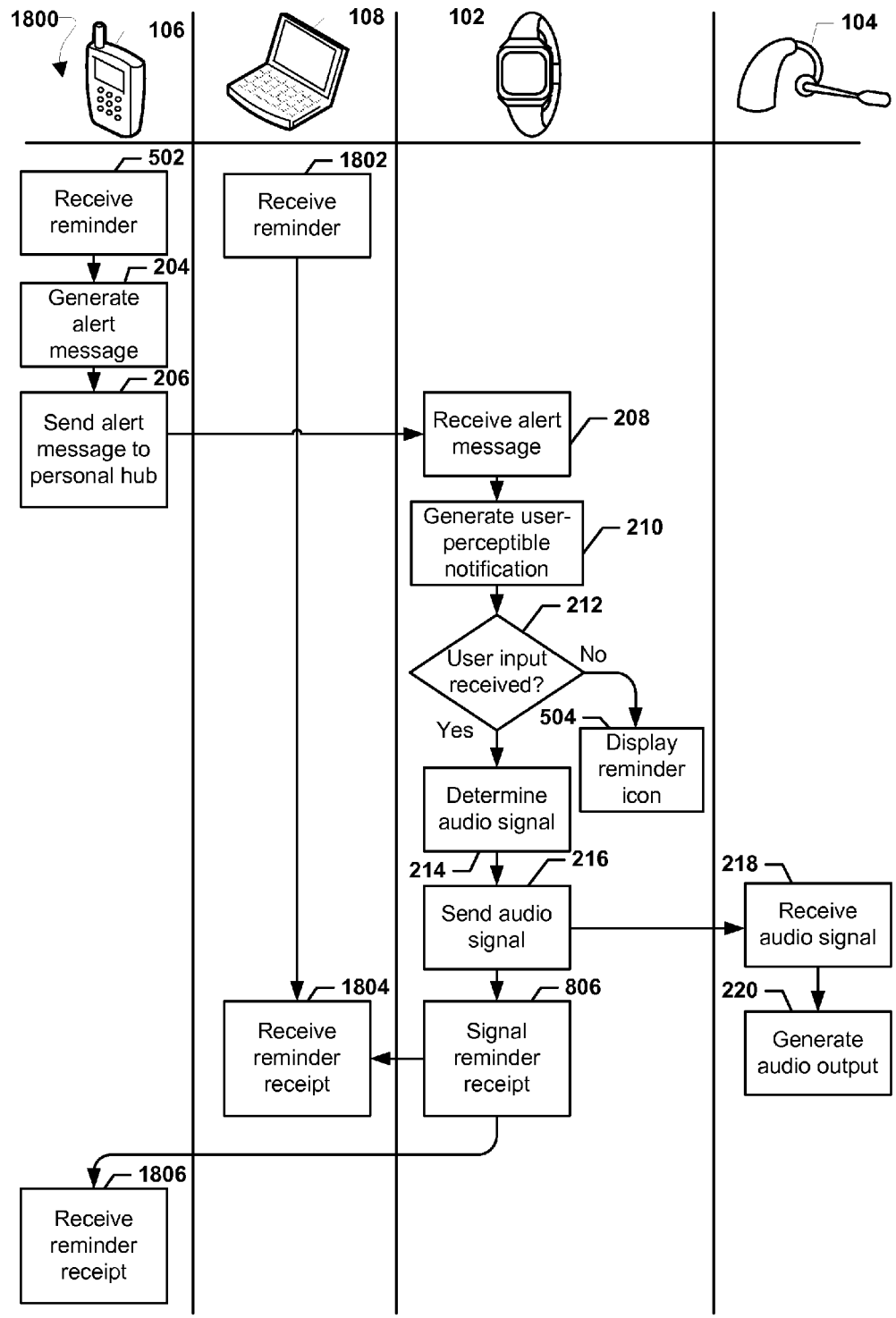
FIG. 18 is a process flow diagram illustrating an embodiment method for sending reminder receipt indications from a personal hub.

FIG. 18 illustrates an embodiment method 1800 for sending reminder receipt indications from a personal hub 102 to multiple mobile devices, smart phone 106 and laptop 108. At block 502 the smart phone 106 may receive a reminder, such as a calendar reminder generated from a server based calendar application. At block 1802 the laptop 108 may receive the same reminder generated from the server based calendar application in response to the same calendar reminder. At blocks 204 and 206 the smart phone 106 may perform operations of like numbered blocks of method 500 described above with reference to FIG. 5. At blocks 208, 210, 212, 504, 214, and 216 the personal hub 102 may perform operations of like numbered blocks of method 500 described above with reference to FIG. 5. At blocks 218 and 220 the wireless earpiece 104 may perform operations of like numbered blocks of method 500 described above with reference to FIG. 5. As discussed above with reference to FIG. 8, at block 806 the personal hub 102 may signal a reminder receipt. At block 1804 the laptop 108 may receive the reminder receipt. At block 1806 the smart phone 106 may receive the reminder receipt. In this manner, the laptop 108 and smart phone 106 may both receive an indication the user has acknowledged the reminder and the generation of multiple notifications from multiple mobile devices may be avoided.

Figure 19:
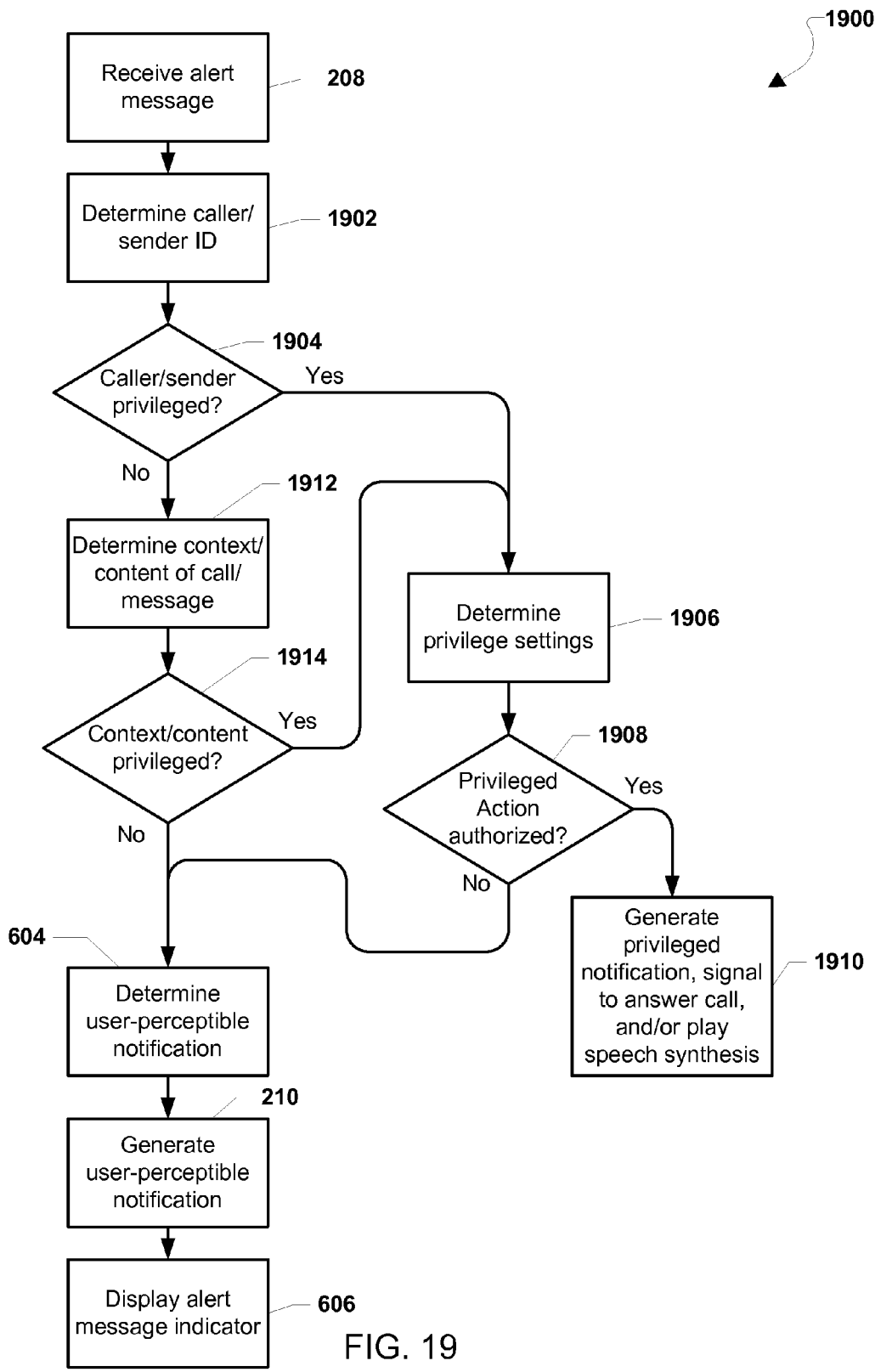
FIG. 19 is a process flow diagram illustrating an embodiment method for generating privileged notifications.

FIG. 19 illustrates an embodiment method 1900 for generating privileged notifications with a personal hub 102 in response to a received alert message. As discussed above, at block 208 the personal hub 102 may receive an alert message. In an embodiment, the alert message may include a caller ID of the originating caller (i.e., for a voice or data call) or a sender ID of the originating sender (i.e., for a text based message). At block 1902 the personal hub 102 may determine the caller/sender ID based on information in the alert message. At determination block 1904 the personal hub 102 may determine if the caller/sender corresponding to the determined caller/sender ID is a privileged caller/sender. As an example, a list or table of privileged callers/senders may be stored in the memory of the personal hub 102, and the caller/sender ID may be compared with the stored privileged callers/senders list.

If the caller/sender is not privileged (i.e., determination block 1904="No"), at block 1912 the personal hub 102 may determine if the context/content of the alert message is privileged. In an embodiment, the personal hub 102 may parse the alert message to determine in the content or context of the alert message indicates the message should be treated as privileged. As an example, a received text based message subject line and/or content included in the alert may use the word "emergency" which may correspond to a list of content based words stored in a memory of the personal hub 102 that may indicate an alert message should be treated as privileged. If the content/context is not privileged (i.e., determination block 1914="No"), as discussed above with reference to FIG. 6, at block 604 the personal hub 102 may determine a user-perceptible notification. At block 210 the personal hub 102 may generate the user-perceptible notification, and at block 606 the personal hub may display an alert message indicator.

If the caller/sender is privileged (i.e., determination block 1904="Yes") or the content/context is privileged (i.e., determination block 1914="Yes"), at block 1906 the personal hub 102 may determine the current privilege settings. Current privilege settings may be settings in the personal hub 102 that indicate how privileged communications should be handled. An example of a privilege setting may be that only calls from a specific caller may be answered directly (i.e., no prompt or limited prompt may be given before the incoming call is activated). At determination block 1908 the personal hub 102 may determine if a privileged action is authorized based on the determined privilege settings. If a privileged action is not authorized (i.e., determination block 1908="No"), at blocks 604, 210, and 606 the personal hub 102 may perform operations of like numbered blocks of method 600 discussed above with reference to FIG. 6. If a privileged action is authorized (i.e., determination block 1908="Yes"), at block 1910 the personal hub may generate a privileged notification, signal the mobile device to answer the call, cause a ringtone to be played (e.g., by sending, to the mobile device, a signal configured to cause the mobile device to play a ringtone one or more times; or by sending, to the earpiece, a signal including a ringtone, such as a ringtone included in the alert message received at block 208), and/or may cause a speech synthesis of the text based message to be played (e.g., by sending, to the mobile device via a data link, a signal configured to cause the mobile device to play audio based at least in part on a speech synthesis of the text based message; or by sending an audio signal based at least in part on a speech synthesis of the text based message to the earpiece via a data link). In this manner, privileged communications may receive automatic escalated notification as compared to non-privileged communications. In an embodiment, the personal hub may generate a privileged notification, signal the mobile device to answer the call, and/or may play a speech synthesis of the text based message without emitting an audible indication of the incoming call, and in a further embodiment, the mobile device may answer the call without emitting an audible indication. Desirably, when sending a signal configured to cause the mobile device to play a ringtone one or more times (or when sending a signal including a ringtone to the earpiece), the ringtone may be a ringtone associated with the caller, allowing a user to quickly determine whether to answer the call.

Figure 20:
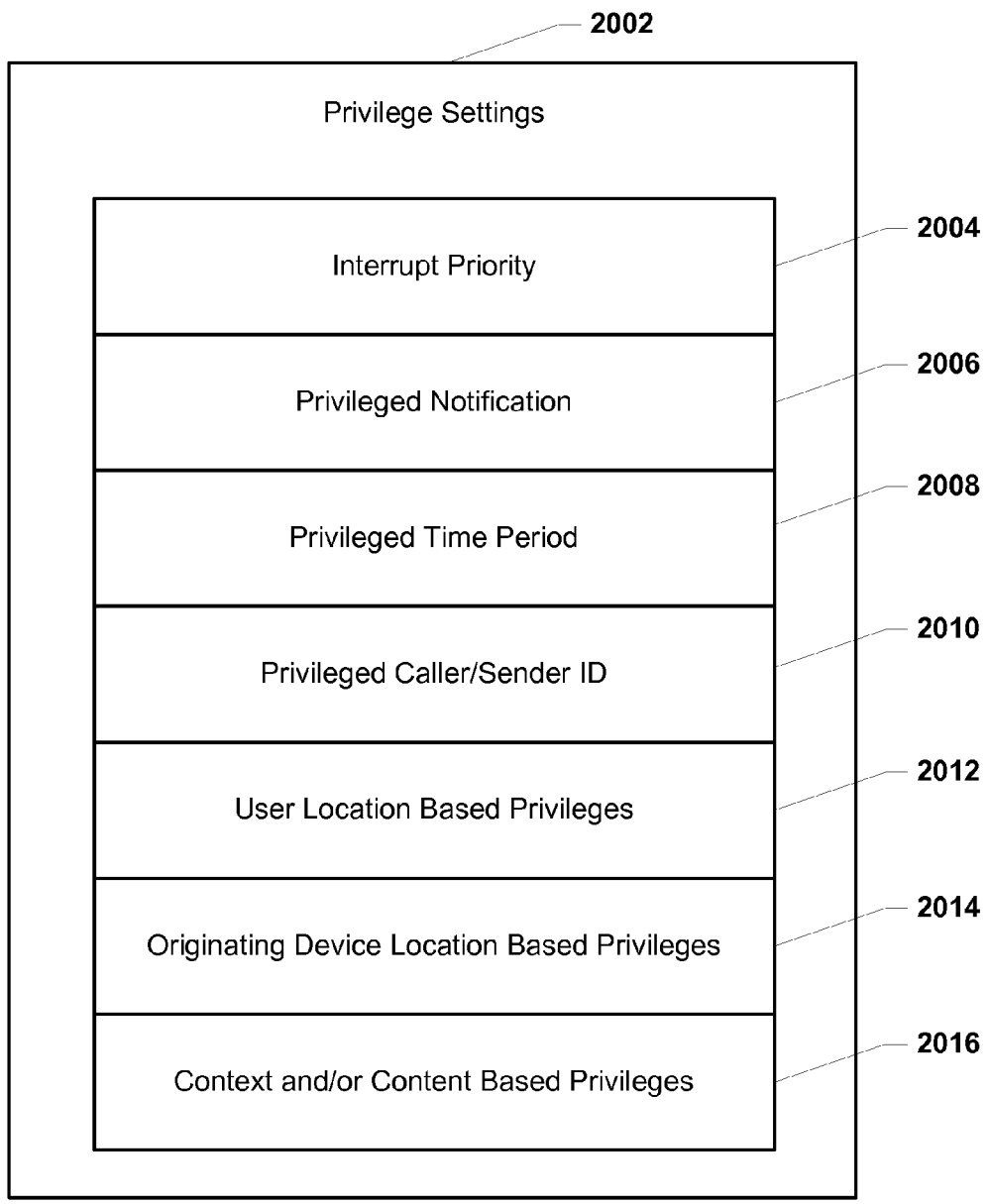
FIG. 20 is a data structure diagram illustrating potential privilege settings.

FIG. 20 is a data structure diagram illustrating potential privilege settings 2002 that may be resident in a memory of a personal hub 102. Privilege settings 2002 may include an interrupt priority 2004. As an example, an interrupt priority 2004 may indicate that privileged incoming calls should be allowed to be answered even though a non-privileged call may be in progress. Additionally, interrupt priority 2004 may establish a priority among privileged senders themselves. Privilege settings 2002 may include privileged notifications 2006. As an example, a privileged notification 2006 may be a separate notification used in conjunction with privileged alert message, such as a special vibration or audio signal. Privilege settings 2002 may include a privileged time period 2008. As an example, a privileged time period 2008 may be a period when privileged communications may be handled specially, such as during an important meeting no calls, privileged or otherwise, may be notified. Privilege settings 2002 may include privileged caller/sender IDs 2010. Privilege settings 2002 may include user location based privileges 2012. As an example, user location based privileges 2012 may be privileges that changed based on the personal hub's 102 location, such as having different privilege settings for work or home. Privilege settings 2002 may include originating device location based privileges 2014. As an example, originating device location based privileges 2014 may be privileges based on the location from which an incoming call or text based message originated, such as treating calls coming from hospitals as privileged regardless of the caller/sender ID. Privilege settings 2002 may include context and/or content based privileges 2016, such as treating calls or text based messages as privileged based on information in the calls or text based messages.

Figure 21:
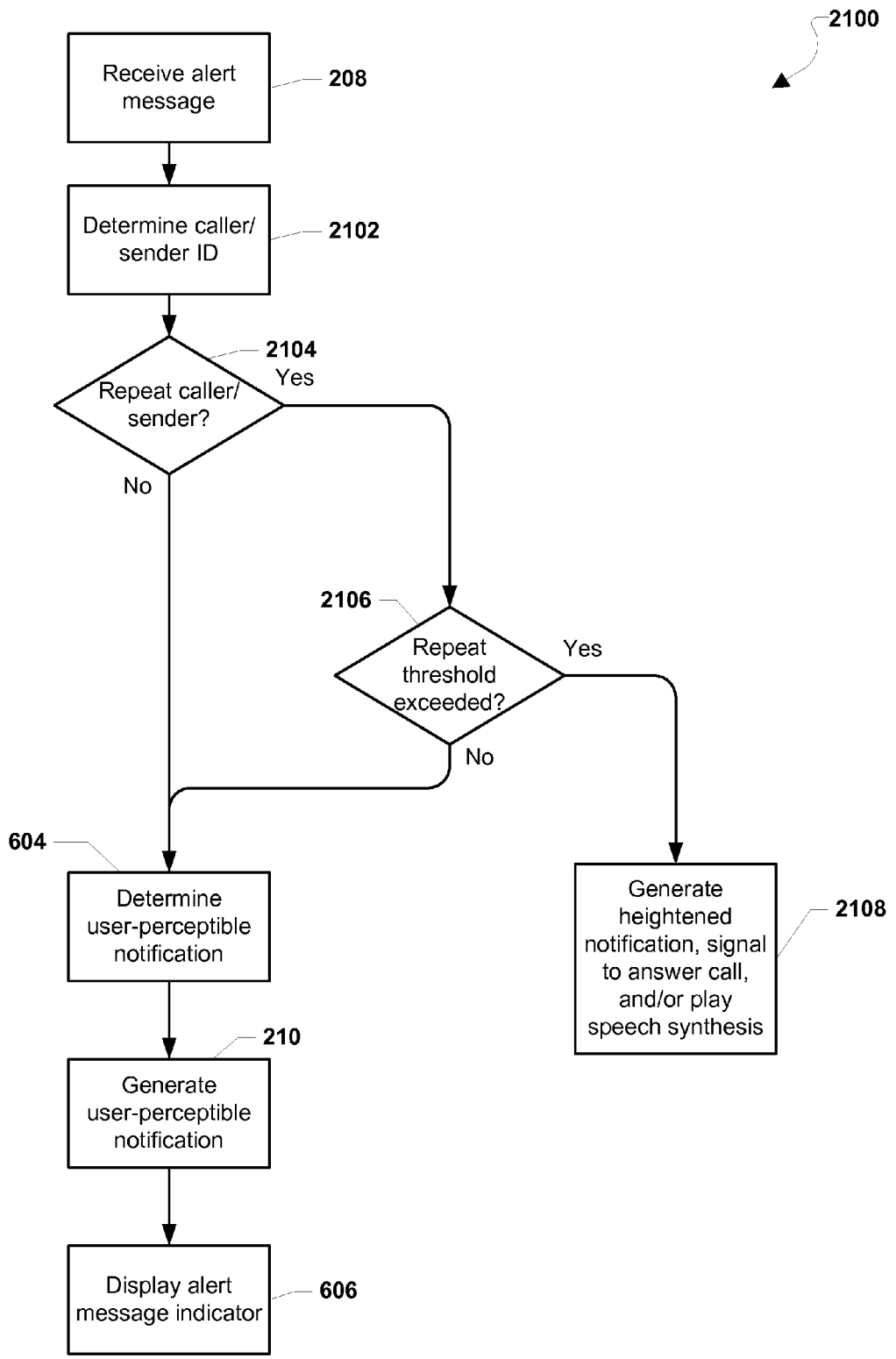
FIG. 21 is a process flow diagram illustrating an embodiment method for generating heightened notifications.

FIG. 21 illustrates an embodiment method 2100 for generating heightened notifications with a personal hub 102 in response to a received alert message from a repeat caller/sender. As discussed above, at block 208 the personal hub 102 may receive an alert message. In an embodiment, the alert message may include a caller ID of the originating caller (i.e., for a voice or data call) or a sender ID of the originating send (i.e., for a text based message). At block 2102 the personal hub 102 may determine the caller/sender ID based on information in the alert message. At determination block 2104 the personal hub 102 may determine if the caller/sender is a repeat caller/sender. As an example, the personal hub 102 may compare the caller/sender ID to a history log of previous alert messages stored in a memory of the personal hub 102 to determine if the caller/sender if a repeat caller/sender. An another example, the personal hub 102 may compare the current alert message's text or audio synthesis and a previous alert message's text or audio synthesis to determine if the subject of the current alert message is the same and thus from a repeat caller/sender. If the caller/sender is not a repeat caller/sender (i.e., determination block 2104="No"), at blocks 604, 210, and 606 the personal hub 102 may perform operations of like numbered blocks of method 600 discussed above with reference to FIG. 6.

If the caller/send is a repeat caller/sender (i.e., determination block 2104="Yes"), at determination block 2106 the personal hub 102 may determine if a repeat threshold is exceeded. As an example, a repeat threshold may be a number of times a repeat caller/sender must have previously called/messaged before the caller/sender may qualify for heightened notification. As another example, a repeat threshold may be a number of times a repeat caller/sender must have previously called/messaged in a set time period (e.g., one hour, one day, etc.) before the caller/sender may qualify for heightened notification. If the repeat threshold is not exceeded, (i.e., determination block 2106="No"), at blocks 604, 210, and 606 the personal hub 102 may perform operations of like numbered blocks of method 600 discussed above with reference to FIG. 6. If the repeat threshold is exceeded, (i.e., determination block 2106="Yes"), at block 2108 the personal hub may generate a heightened notification, signal the mobile device to answer the call, cause a ringtone to be played (e.g., by sending, to the mobile device, a signal configured to cause the mobile device to play a ringtone one or more times; or by sending, to the earpiece, a signal including a ringtone, such as a ringtone included in the alert message received at block 208), and/or may cause a speech synthesis of the text based message to be played (e.g., by sending, to the mobile device via a data link, a signal configured to cause the mobile device to play audio based at least in part on a speech synthesis of the text based message; or by sending an audio signal based at least in part on a speech synthesis of the text based message to the earpiece via a data link). In this manner, calls and/or text based messages from repeat callers/senders may receive automatic escalated notification as compared to calls and/or text based messages from first time callers/senders and/or first time caller/senders in a set time period. Desirably, when sending a signal configured to cause the mobile device to play a ringtone one or more times (or when sending a signal including a ringtone to the earpiece), the ringtone may be a ringtone associated with the caller, allowing a user to quickly determine whether to answer the call.

FIG. 22 illustrates an embodiment method 2200 for generating urgent notifications with a personal hub 102 in response to a received alert message with an urgency flag. As discussed above, at block 208 the personal hub 102 may receive an alert message. As discussed above, in an embodiment, the alert message may include an urgency flag. At determination block 2202 the personal hub 102 may determine if the alert message includes an urgency flag. If the alert message does not include an urgency flag (i.e., determination block 2202="No"), at blocks 604, 210, and 606 the personal hub 102 may perform operations of like numbered blocks of method 600 discussed above with reference to FIG. 6.

If the alert message does include an urgency flag (i.e., determination block 2202="Yes"), at determination block 2204 the personal hub 102 may determine if urgency actions are authorized. As an example, a user selectable setting in the personal hub 102 may toggle urgency action authorization on or off. If urgency actions are not authorized, (i.e., determination block 2204="No"), at blocks 604, 210, and 606 the personal hub 102 may perform operations of like numbered blocks of method 600 discussed above with reference to FIG. 6. If urgency actions are authorized, (i.e., determination block 2204="Yes"), at block 2206 the personal hub may generate an urgency notification, signal the mobile device to answer the call, cause a ringtone to be played (e.g., by sending, to the mobile device, a signal configured to cause the mobile device to play a ringtone one or more times; or by sending, to the earpiece, a signal including a ringtone, such as a ringtone included in the alert message received at block 208), and/or may cause a speech synthesis of the text based message to be played (e.g., by sending, to the mobile device via a data link, a signal configured to cause the mobile device to play audio based at least in part on a speech synthesis of the text based message; or by sending an audio signal based at least in part on a speech synthesis of the text based message to the earpiece via a data link). In this manner, urgent calls and/or text based messages may receive automatic escalated notification as compared to non-urgent calls and/or text based messages. Desirably, when sending a signal configured to cause the mobile device to play a ringtone one or more times (or when sending a signal including a ringtone to the earpiece), the ringtone may be a ringtone associated with the caller, allowing a user to quickly determine whether to answer the call.

FIG. 23 illustrates an embodiment method 2300 similar to method 500 described above with reference to FIG. 5, except that in method 2300 a smart phone 106 running a personal hub application may replace the personal hub 102 and may receive a reminder from the laptop 108. At block 1802 the laptop 108 may receive a reminder. As an example, a reminder may be a reminder generated by the laptop 108 or a reminder generated by another device, such as a remote server. As an example, reminder may be a calendar reminder associated with an event identified in a calendar application running on the laptop 108. At block 2304 the laptop 108 may generate an alert message, similar to the alert generated in block 204 in FIG. 5. At block 2306 the laptop 108 may send the alert message to the smart phone 106 running a personal hub application. At blocks 208, 210, 212, 504, 214, and 216 the smart phone 106 may perform the operations of like numbered blocks of method 500 described above with reference to FIG. 5. At blocks 218 and 220 the wireless earpiece 104 may perform the operations of like numbered blocks of method 500 described above with reference to FIG. 5. At block 806 the smart phone 106 running a personal hub application may signal a reminder receipt. At block 1804 the laptop 108 may receive the reminder receipt.

Figure 24:
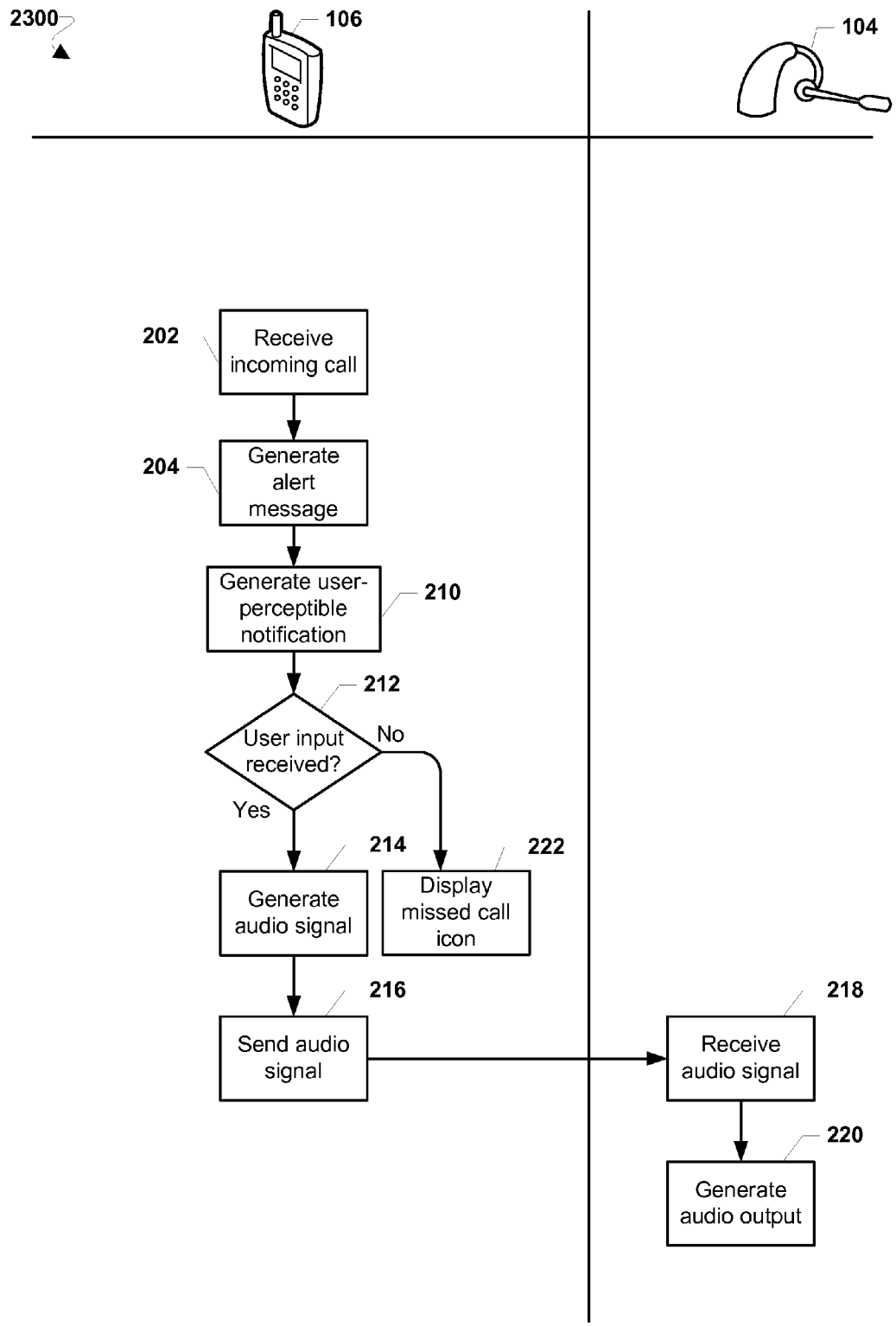
FIG. 24 is a process flow diagram illustrating a sixth embodiment method for providing and escalating notifications.

FIG. 24 illustrates an embodiment method 2400 similar to method 200 described above with reference to FIG. 2, except that in method 2400 a smart phone 106 running a personal hub application may replace the personal hub 102. At blocks 202 and 204 the smart phone 106 may perform the operations of like numbered blocks of method 200 described above with reference to FIG. 2. In an embodiment in which the smart phone 106 may be running a personal hub application, the alert message may not need to be sent or receive. Rather, at block 210 the smart phone 106 may generate a user-perceptible notification, and at blocks 212, 214, 216, and 222 the smart phone 106 may perform the operations of like numbered blocks of method 200 described above with reference to FIG. 2. At blocks 218 and 219 the wireless earpiece 104 may perform the operations of like numbered blocks of method 200 described above with reference to FIG. 2.

While discussed only with reference to received reminders and calls in FIGS. 23 and 24, respectively, in additional embodiments a mobile device, such as smart phone 106, may run a personal hub application which may implement any of the operations described above as occurring on a personal hub 102.

Figure 25:
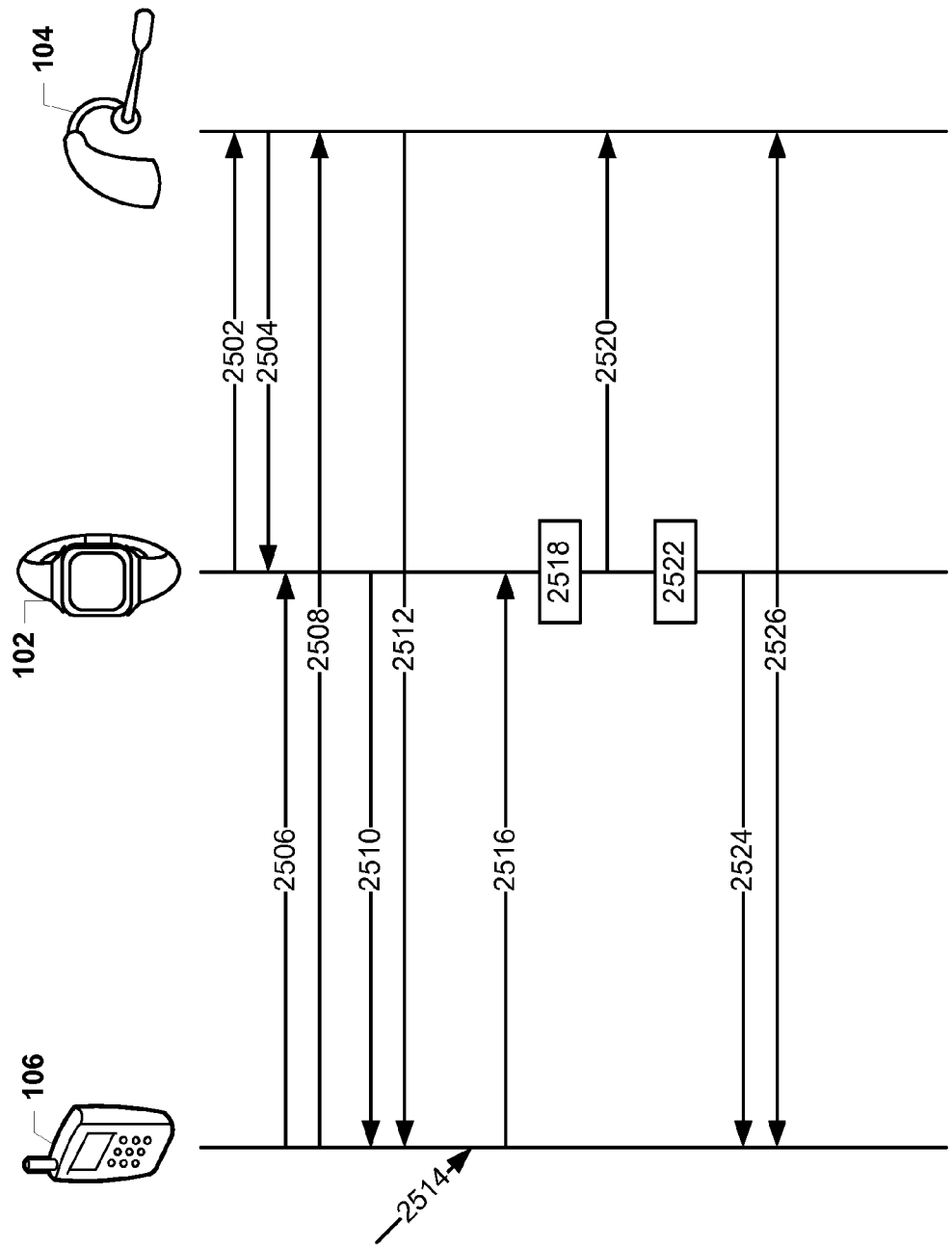
FIG. 25 is a communications flow diagram illustrating example interactions between a smart phone, personal hub, and wireless earpiece.

FIG. 25 is a communication flow diagram illustrating example interactions between the smart phone 106, personal hub 102, and wireless earpiece 104. FIG. 25 illustrates example interactions which may occur in an embodiment in which the smart phone 106 receives an incoming call. The personal hub 102 may send a pairing request message 2502 to the wireless earpiece 104. In response the personal hub 102 may receive a pairing response message 2504 from the wireless earpiece 104. In this manner, the personal hub 102 and the wireless earpiece 104 may be paired and establish a wireless data link with each other, such as wireless data link 130. The smart phone 106 may send a pairing request message 2506 to the personal hub 102, and the smart phone 106 may send a pairing request message 2508 to the wireless earpiece 104. In response the smart phone 106 may receive a pairing response message 2510 from the personal hub 102. In this manner, the smart phone 106 and the personal hub 102 may be paired and establish a wireless data link with each other, such as wireless data link 128. Additionally, the smart phone 106 may receive a pairing response message 2512 from the wireless earpiece 104. In this manner, the smart phone 106 and the wireless earpiece 104 may be paired and establish a wireless data link with each other, such as wireless data link 134.

The smart phone may receive an incoming call 2514. As discussed above, the smart phone 106 may generate an alert message. The smart phone 106 may send the alert message 2516 to the personal hub. As discussed above, the personal hub 102 may generate a user-perceptible notification. As discussed above, if the personal hub 102 receives a first user input indication, 2518, the personal hub 102 may send an audio signal 2520 to the wireless earpiece 104. As discussed above, the wireless earpiece 104 may generate an audio output for the user. As discussed above, if the personal hub 102 receives a second user input indication 2522, the personal hub 102 may send a signal 2524 to the smart phone 106 to connect the call. In response, the smart phone 106 may establish and activate the call by exchanging voice and data packets 2526 over the wireless data link, such as wireless data link 134, with the wireless earpiece 104.

Figure 26:
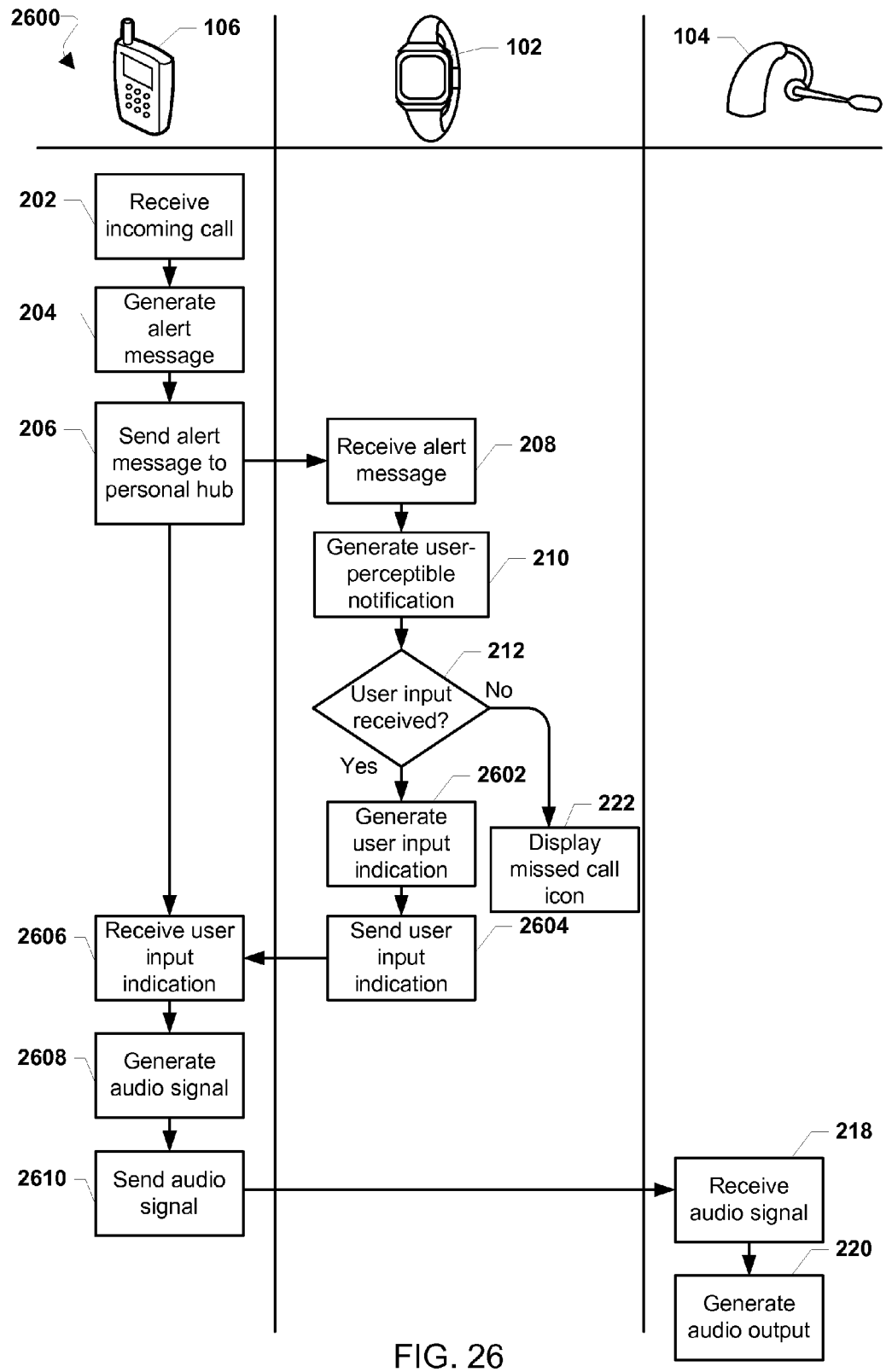
FIG. 26 is a process flow diagram illustrating a seventh embodiment method for providing and escalating notifications.

FIG. 26 illustrates an embodiment method 2600 for providing and escalating notifications from a smart phone 106 to a personal hub 102 and wireless earpiece 104 similar to method 200 discussed above with reference to FIG. 2, except that method 2600 may generate an audio signal from the smart phone 106 to the wireless earpiece 104 in response to a user input at the personal hub 102. At blocks 202, 204, and 206 the smart phone 106 may perform operations of like numbered blocks of method 200 described above with reference to FIG. 2. At blocks 208, 210, 212, and 222 the personal hub 102 may perform operations of like numbered blocks of method 200 described above with reference to FIG. 2.

If a user input is received in the personal hub 102 (i.e., determination block 212="Yes"), at block 2602 the personal hub 102 may generate a user input indication. As an example, the user input indication may be a message including a user input flag. At block 2604 the personal hub 102 may send the user input indication. At block 2606 the smart phone 106 may receive the user input indication. At block 2608 the smart phone 106 may generate an audio signal to send to the wireless earpiece 104. As an example, the audio signal may be a single tone which may be associated with the incoming call. As another example, the audio signal may be a ringtone associated with the caller identified by the caller ID. As yet another example, the audio signal may be a speech synthesis of the caller ID. At block 2610 the smart phone 106 may send the audio signal to the wireless earpiece 104. As an example, the smart phone 106 may send the audio signal to the wireless earpiece 104 via the wireless data link 134. As discussed above, at block 218 the wireless earpiece 104 may receive the audio signal, and at block 220 the wireless earpiece may generate an audio output.

Figure 27:
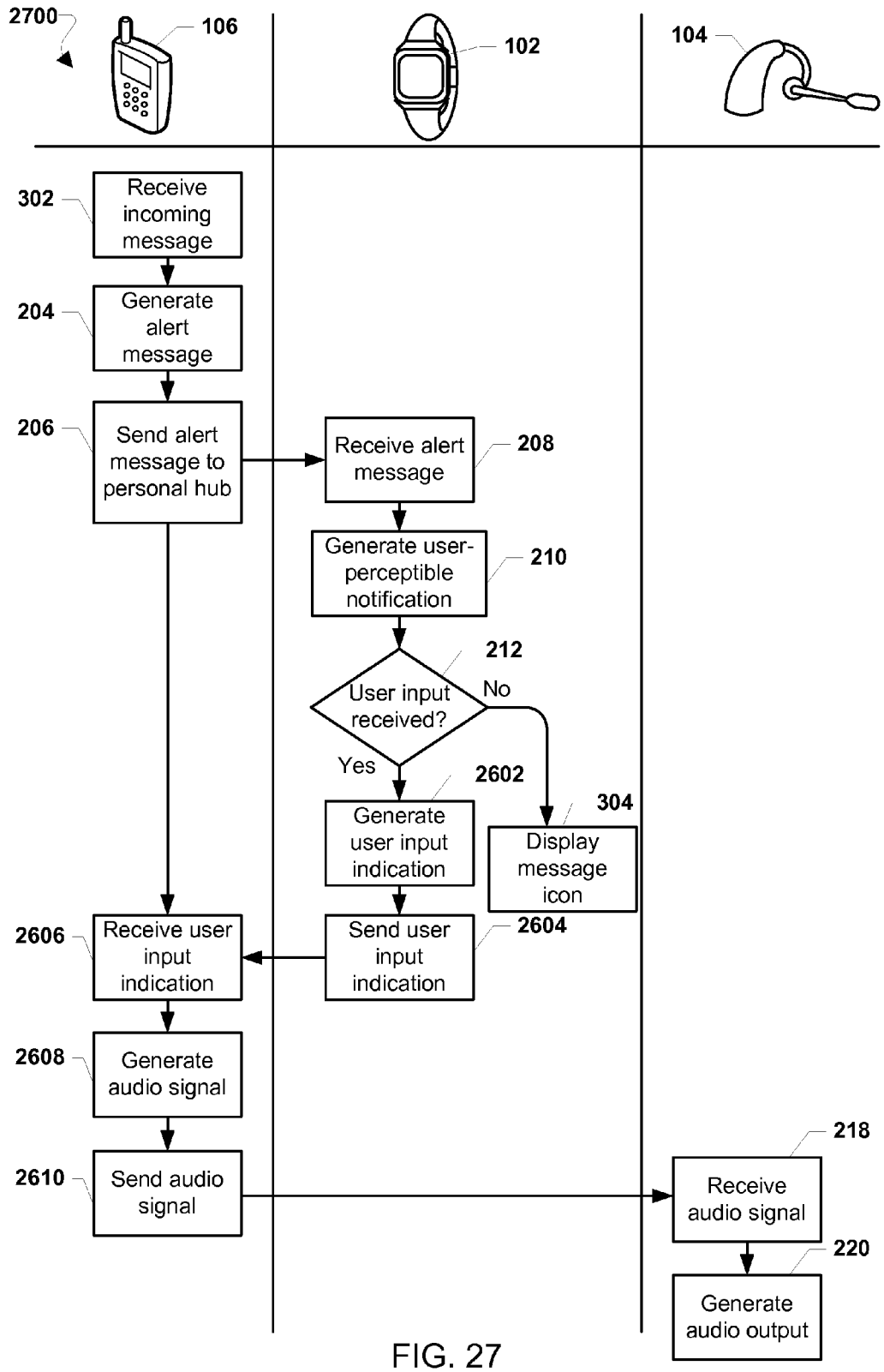
FIG. 27 is a process flow diagram illustrating an eighth embodiment method for providing and escalating notifications.

FIG. 27 illustrates an embodiment method 2700 for providing and escalating notifications from a smart phone 106 to a personal hub 102 and wireless earpiece 104 similar to method 300 discussed above with reference to FIG. 3, except that method 2700 may generate an audio signal from the smart phone 106 to the wireless earpiece 104 in response to a user input at the personal hub 102. At blocks 302, 204, and 206 the smart phone 106 may perform operations of like numbered blocks of method 300 described above with reference to FIG. 3. At blocks 208, 210, 212, and 304 the personal hub 102 may perform operations of like numbered blocks of method 300 described above with reference to FIG. 3. At blocks 2602 and 2604 the personal hub 102 may perform operations of like numbered blocks of method 2600 described above with reference to FIG. 26. At block 2606 the smart phone 106 may receive the user input indication. At block 2608 the smart phone 106 may generate an audio signal to send to the wireless earpiece 104. As an example, the audio signal may be a sound associated with a specific sender. As discussed above, at block 2610 the smart phone 106 may send the audio signal to the wireless earpiece 104, at block 218 the wireless earpiece may receive the audio signal, and at block 220 the wireless earpiece may generate an audio output of the received audio signal.

Figure 28:
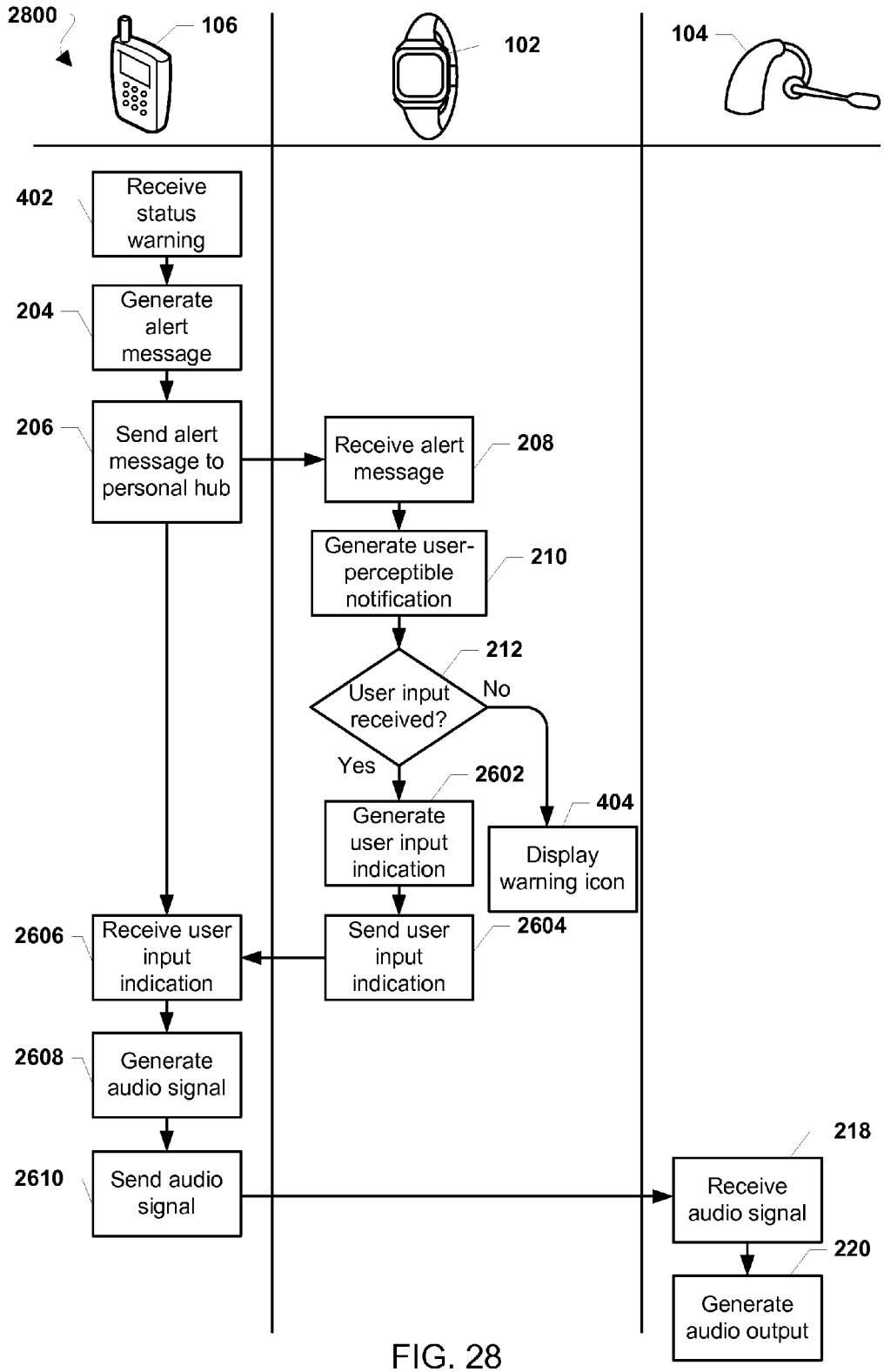
FIG. 28 is a process flow diagram illustrating a ninth embodiment method for providing and escalating notifications.

FIG. 28 illustrates an embodiment method 2800 for providing and escalating notifications from a smart phone 106 to a personal hub 102 and wireless earpiece 104 similar to method 400 discussed above with reference to FIG. 4, except that method 2800 may generate an audio signal from the smart phone 106 to the wireless earpiece 104 in response to a user input at the personal hub 102. At blocks 402, 204, and 206 the smart phone 106 may perform operations of like numbered blocks of method 400 described above with reference to FIG. 4. At blocks 208, 210, 212, and 404 the personal hub 102 may perform operations of like numbered blocks of method 400 described above with reference to FIG. 4. At blocks 2602 and 2604 the personal hub 102 may perform operations of like numbered blocks of method 2600 described above with reference to FIG. 26. At block 2606 the smart phone 106 may receive the user input indication. At block 2608 the smart phone 106 may generate an audio signal to send to the wireless earpiece 104. As an example, the audio signal may be a sound associated only with status warnings. As discussed above, at block 2610 the smart phone 106 may send the audio signal to the wireless earpiece 104, at block 218 the wireless earpiece may receive the audio signal, and at block 220 the wireless earpiece may generate an audio output of the received audio signal.

Figure 29:
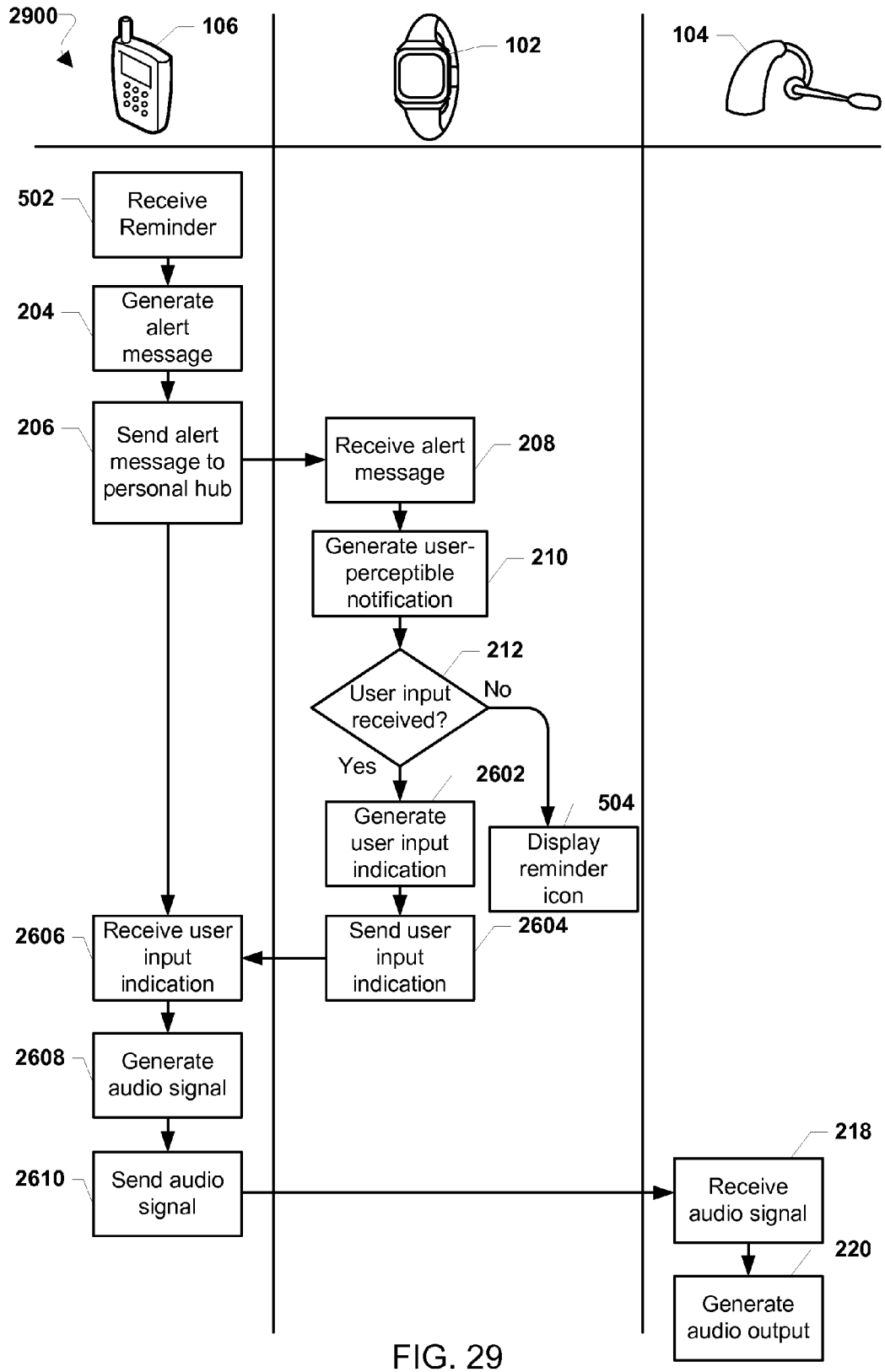
FIG. 29 is a process flow diagram illustrating a tenth embodiment method for providing and escalating notifications.

FIG. 29 illustrates an embodiment method 2900 for providing and escalating notifications from a smart phone 106 to a personal hub 102 and wireless earpiece 104 similar to method 500 discussed above with reference to FIG. 5, except that method 2800 may generate an audio signal from the smart phone 106 to the wireless earpiece 104 in response to a user input at the personal hub 102. At blocks 502, 204, and 206 the smart phone 106 may perform operations of like numbered blocks of method 500 described above with reference to FIG. 5. At blocks 208, 210, 212, and 504 the personal hub 102 may perform operations of like numbered blocks of method 500 described above with reference to FIG. 5. At blocks 2602 and 2604 the personal hub 102 may perform operations of like numbered blocks of method 2600 described above with reference to FIG. 26. At block 2606 the smart phone 106 may receive the user input indication. At block 2608 the smart phone 106 may generate an audio signal to send to the wireless earpiece 104. As an example, the audio signal may be a sound associated only with reminders. As discussed above, at block 2610 the smart phone 106 may send the audio signal to the wireless earpiece 104, at block 218 the wireless earpiece may receive the audio signal, and at block 220 the wireless earpiece may generate an audio output of the received audio signal.

FIG. 30 illustrates an embodiment method 3000 for sending reminder receipt indications similar to method 1800 discussed above with reference to FIG. 18, except that method 3000 may generate an audio signal from the smart phone 106 to the wireless earpiece 104 in response to a user input at the personal hub 102. At blocks 502, 204, and 206 the smart phone 106 may perform operations of like numbered blocks of method 1800 described above with reference to FIG. 18. At block 1802 the laptop 108 may receive a reminder as discussed above with reference to FIG. 18. At blocks 208, 210, 212, and 504 the personal hub 102 may perform operations of like numbered blocks of method 1800 described above with reference to FIG. 18. At blocks 2602 and 2604 the personal hub 102 may perform operations of like numbered blocks of method 2900 described above with reference to FIG. 29. At blocks 2606, 2608, and 2610 the smart phone 106 may perform operations of like numbered blocks of method 2900 described above with reference to FIG. 29. At blocks 218 and 220 the wireless earpiece 104 may perform operations of like numbered blocks of method 2900 described above with reference to FIG. 29. At block 3002 the smart phone 106 may signal a reminder receipt. As an example, the signal of a reminder receipt may be a message sent from the smart phone 106 to all mobile devices with a wireless data link to the smart phone 106 (e.g., a reminder receipt indication sent from the smart phone 106 to the laptop 108 via wireless data link 126). As discussed above, at block 1804 the laptop 108 may receive the reminder receipt.

FIG. 31 illustrates an embodiment method 3100 similar to method 2300 described above with reference to FIG. 23, except that method 3000 may generate an audio signal from the laptop 108 to the wireless earpiece 104 in response to a user input at the smart phone 106 running a personal hub application. At blocks 1802, 2304, and 2306 the laptop 108 may perform operations of like numbered blocks of method 2300 described above with reference to FIG. 23. At block 208, 210, 212, 504, 2602, and 2604 the smart phone 106 running the personal hub application may perform operations of like numbered blocks of method 3100 described above with reference to FIG. 29. At block 2606, 2608, and 2610 the laptop 108 may perform operations of like numbered blocks of method 2900 described above with reference to FIG. 29. At blocks 218 and 220 the wireless earpiece 104 may perform the operations of like numbered blocks of method 2900 described above with reference to FIG. 29.

Figure 32:
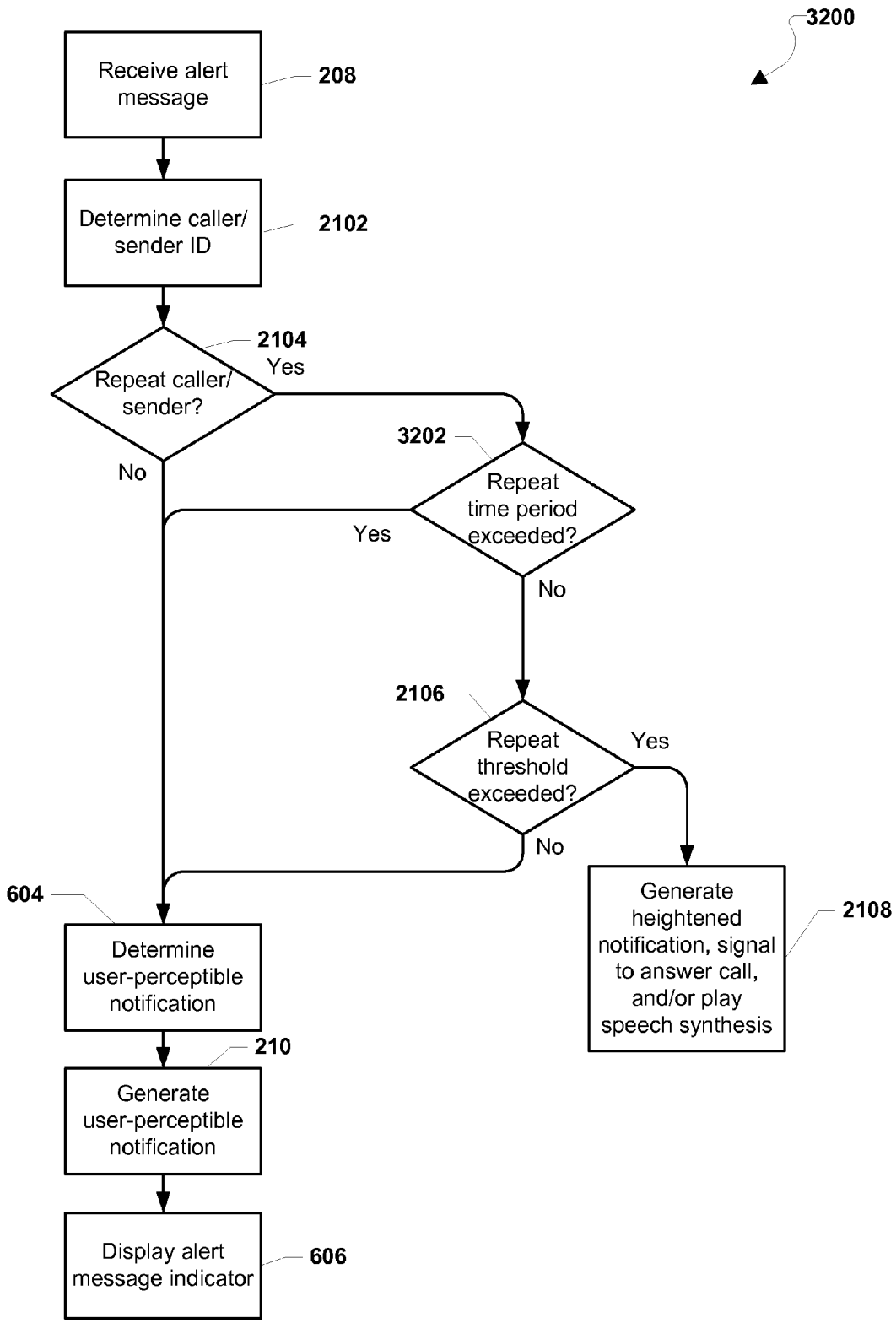
FIG. 32 is a process flow diagram illustrating another embodiment method for generating urgent notifications.

FIG. 32 illustrates an embodiment method 3200 for generating heightened notifications with a personal hub 102 in response to a received alert message from a repeat caller/sender similar to method 2100 described above with reference to FIG. 21, except that method 3200 may escalate only alert messages from a repeat caller/sender received in a set time period. At blocks 208, 2102, 2104, 604, 210, and 606 the personal hub 102 may perform operations of like numbered blocks of method 2100 described above with reference to FIG. 21. If the caller/send is a repeat caller/sender (i.e., determination block 2104="Yes"), at determination block 3202 the personal hub 102 may determine if a repeat time period is exceeded. In an embodiment, a repeat time period may be a set time period (e.g., one hour, one day, five minutes, etc.) stored in a memory of the personal hub 102. In an embodiment, the personal hub may compare the time between receiving the current alert message from the repeat caller/sender and the previous alert message from the repeat caller/sender to the repeat time period to determine if the time between the alert messages is greater than the repeat time period. If the repeat time period is exceeded (i.e., determination block 3202="Yes"), the method 3200 may proceed to block 604. If the repeat time period is not exceeded (i.e., determination block 3202="No"), the method 3200 may proceed to block 2106. At blocks 2106 and 2108, the personal hub 102 may perform operations of like numbered blocks of method 2100 described above with reference to FIG. 21. In this manner, a heightened notification may not be generated for repeat calls/messages which do not collectively fall within a specified repeat time period.

Figure 33:
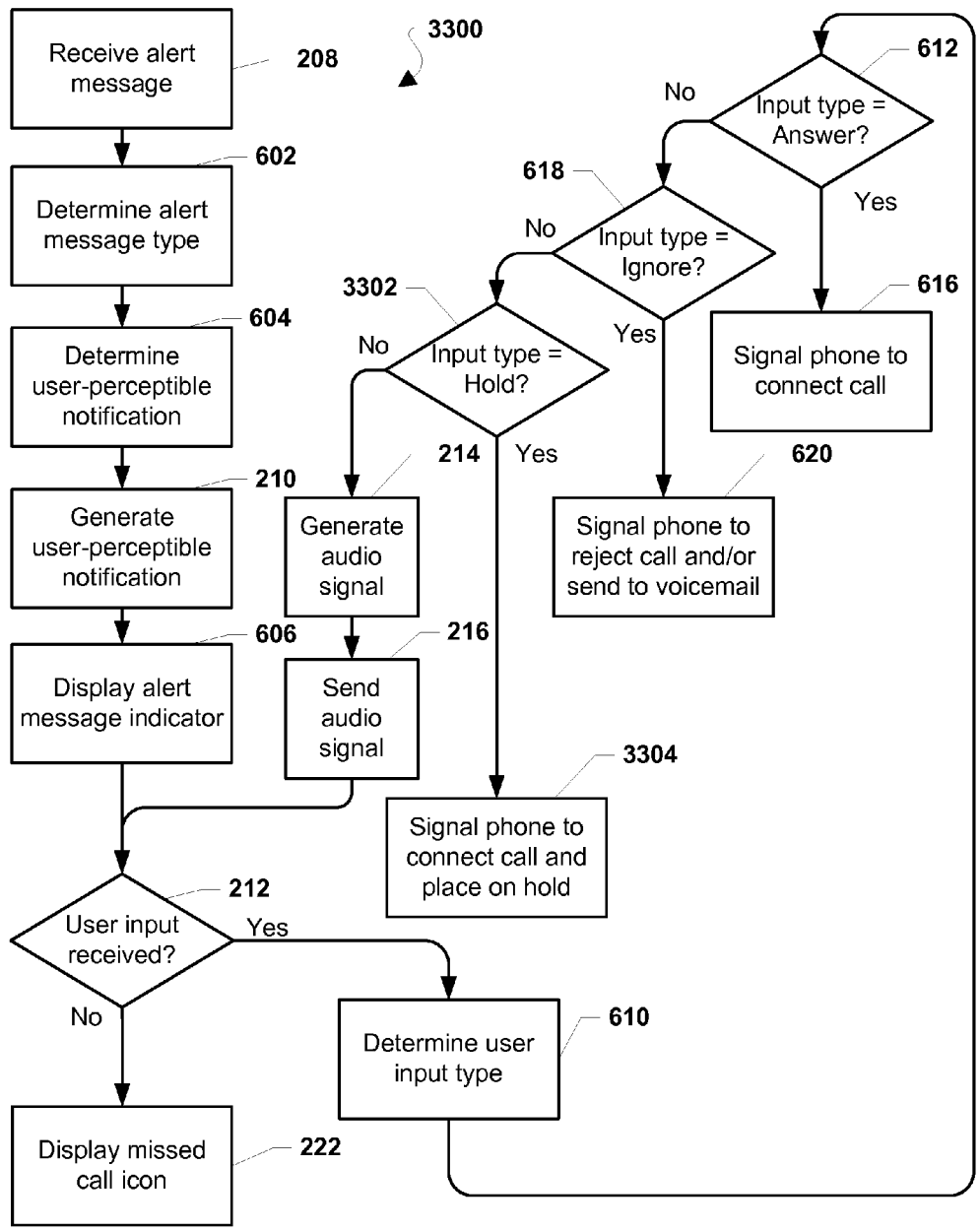
FIG. 33 is a process flow diagram illustrating another embodiment method for escalating notifications for an incoming call.

FIG. 33 illustrates an embodiment method 3300 for escalating notifications for an incoming call based on received user inputs similar to method 600 described above with reference to FIG. 6, except that method 3300 may determine if a user indication to place a call on hold is received. In an embodiment, method 3300 may be implemented in personal hub 102. At blocks 208, 602, 604, 210, 606, 212, 222, 610, 612, 616, 618, and 620 the personal hub 102 may perform operations of like numbered blocks of method 600 described above with reference to FIG. 6. If the input type is not associated with ignoring the incoming call (i.e., determination block 618="No"), at determination block 3302 the personal hub 102 may determine if the input type is associated with holding the incoming call. As an example, the personal hub 102 may reference a data table stored in a memory of the personal hub 102 in which user inputs are correlated with actions to be taken in response to the received user inputs to determine whether the input type is an input type associated with holding the incoming call.

If the user input type is associated with holding the incoming call (i.e., determination block 3302="Yes"), at block 3304 the personal hub 102 may signal the smart phone 106 to connect the call and place the call on hold. As an example, the personal hub 102 may send an answer signal including a hold indication from the personal hub 102 to the smart phone 106 via wireless data link 128. As discussed further below, in response to receiving such an answer signal including a hold indication, the smart phone 106 may activate the call over the wireless data link 134 between the wireless earpiece 104 and the smart phone 106, may place direct the wireless earpiece 104 to mute its speaker(s) and/or microphone(s), and/or may play a hold message and/or sound over the call to the originating caller.

If the user input type is not associated with holding the incoming call (i.e., determination block 3302="No"), as discussed above, at block 214 the personal hub 102 may generate an audio signal and at block 216 may send the audio signal to the wireless earpiece 104.

Figure 34:
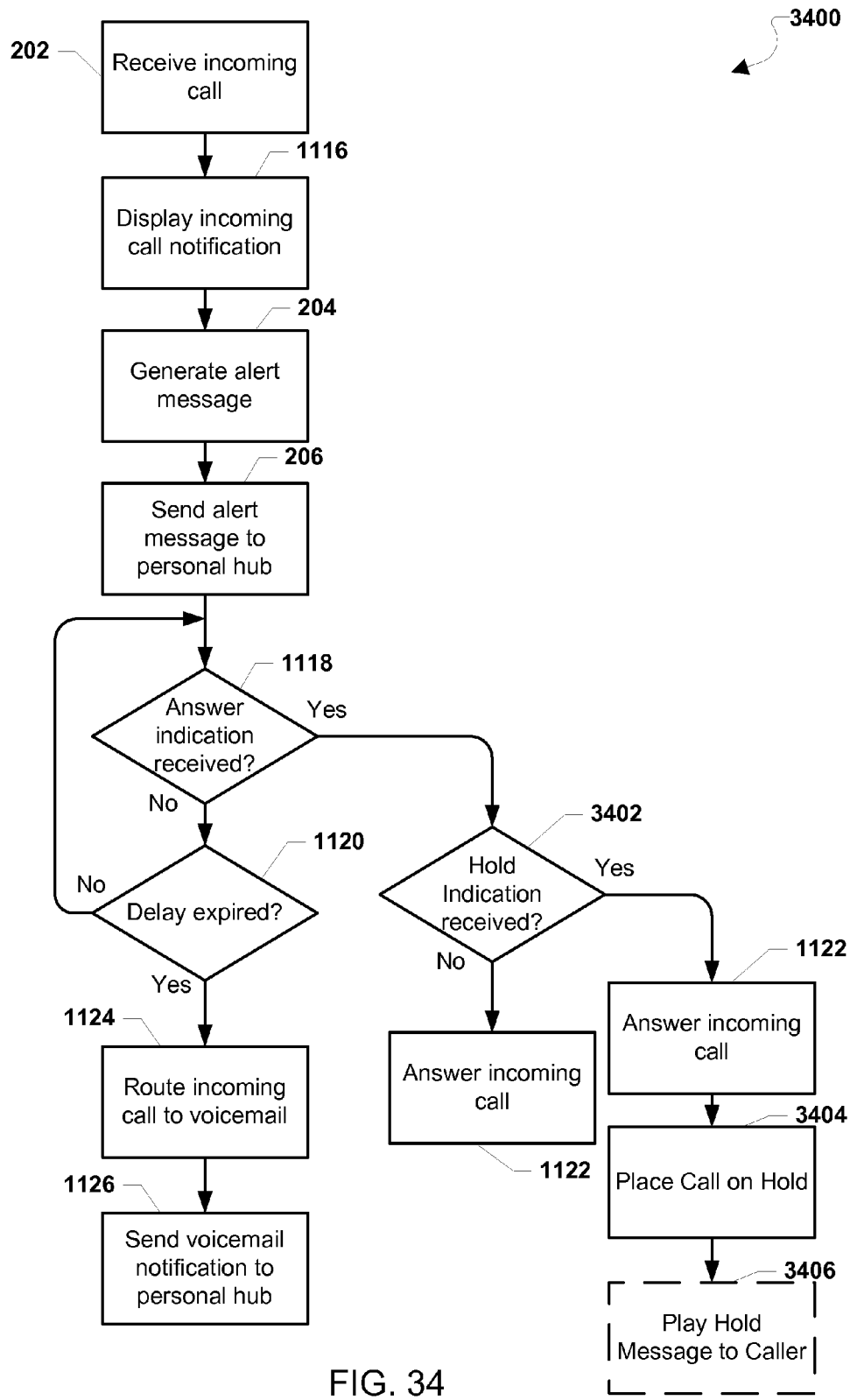
FIG. 34 is a process flow diagram illustrating a seventh embodiment method for generating alert messages from a mobile device.

FIG. 34 illustrates an embodiment method 3400 for generating alert messages from a mobile device similar to method 1100 described above with reference to FIG. 11, except that method 3400 may determine if an indication to place a call on hold is received. At blocks 202, 1116, 204, 206, 1118, 1120, 1124, and 1126 the mobile device may perform operations of like numbered blocks of method 3400 described above with reference to FIG. 11.

If an answer indication is received (i.e., determination block 1118="Yes"), at determination block 3402 the mobile device may determine if a hold indication was received with the answer indication. As an example, a hold indication may be a message sent at the same time as the answer indication and/or a flag set in the answer indication. If a hold indication is not received (i.e., determination block 3402="No"), as discussed above, at block 1122 the mobile device may answer the incoming call. If a hold indication is received (i.e., determination block 3402="Yes"), at block 1122 the mobile device may answer the incoming call. At block 3404 the mobile device may place the incoming call on hold. As an example, in an embodiment in which the incoming call is activated between the smart phone 106 and wireless earpiece 104, the smart phone 106 may direct the microphone of the wireless earpiece 104 to be muted. In an optional embodiment, at block 3406 the mobile device may play a message and/or sound over the incoming call back to the originating caller indicating the call has been answered and placed on hold.

Figure 35:
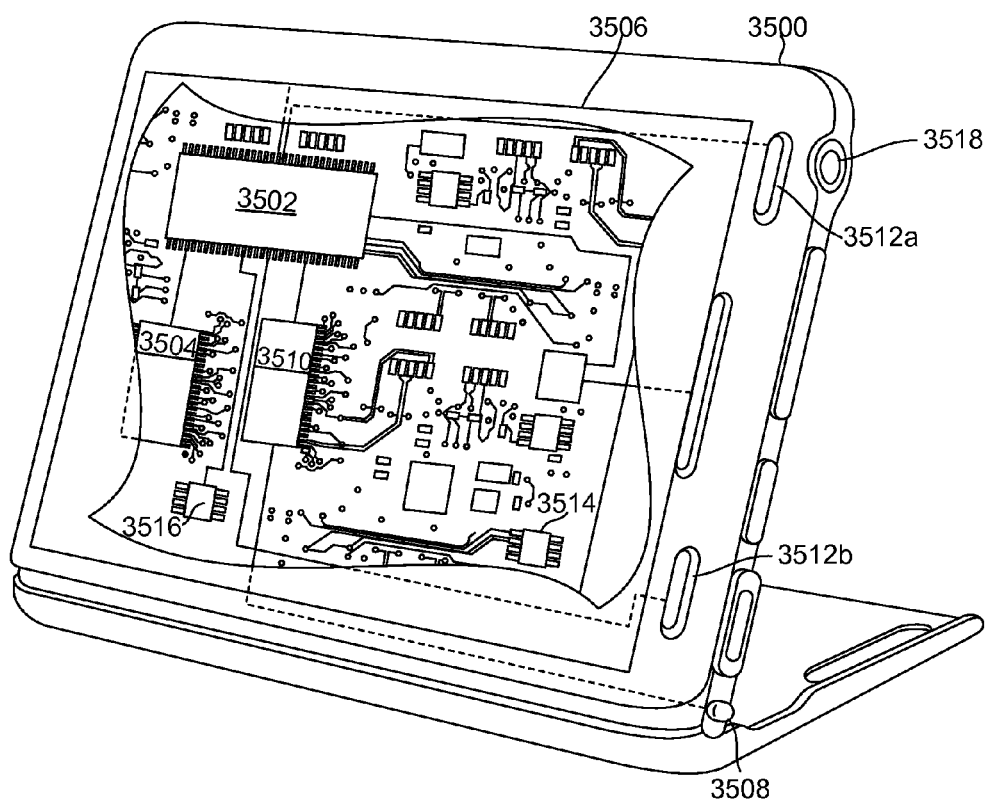
FIG. 35 is a component diagram of an example mobile device suitable for use with the various embodiments.

The various embodiments may be implemented in any of a variety of mobile devices, an example of which is illustrated in FIG. 35. For example, the mobile device 3500 may include a processor 3502 coupled to internal memories 3504 and 3510. Internal memories 3504 and 3510 may be volatile or non-volatile memories, and may also be secure and/or encrypted memories, or unsecure and/or unencrypted memories, or any combination thereof. The processor 3502 may also be coupled to a touch screen display 3506, such as a resistive-sensing touch screen, capacitive-sensing touch screen infrared sensing touch screen, or the like. Additionally, the display of the mobile device 3500 need not have touch screen capability. Additionally, the mobile device 3500 may have one or more antenna 3508 for sending and receiving electromagnetic radiation that may be connected to a wireless data link and/or cellular telephone transceiver 3516 coupled to the processor 3502. The mobile device 3500 may also include physical buttons 3512a and 3512b for receiving user inputs. The mobile device 3500 may also include a power button 3518 for turning the mobile device 3500 on and off.

Figure 36:
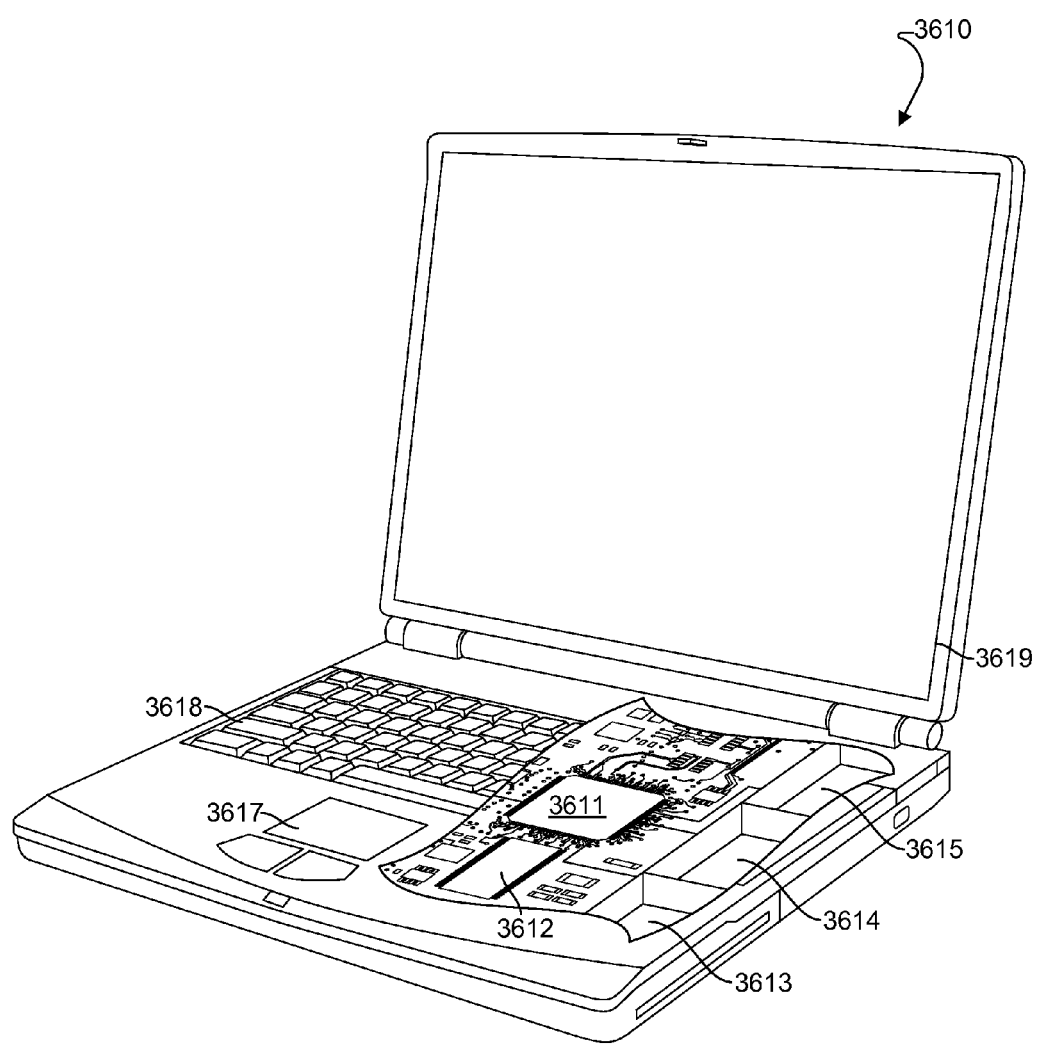
FIG. 36 is a component diagram of another example mobile device suitable for use with the various embodiments.

The various embodiments described above may also be implemented within a variety of personal computing devices, such as a laptop computer 3610 as illustrated in FIG. 36. Many laptop computers include a touch pad touch surface 3617 that serves as the computer's pointing device, and thus may receive drag, scroll, and flick gestures similar to those implemented on mobile computing devices equipped with a touch screen display and described above. A laptop computer 3610 will typically include a processor 3611 coupled to volatile memory 3612 and a large capacity nonvolatile memory, such as a disk drive 3613 of Flash memory. The computer 3610 may also include a floppy disc drive 3614 and a compact disc (CD) drive 3615 coupled to the processor 3611. The computer device 3610 may also include a number of connector ports coupled to the processor 3611 for establishing data connections or receiving external memory devices, such as a USB or FireWire® connector sockets, or other network connection circuits for coupling the processor 3611 to a network. In a notebook configuration, the computer housing includes the touchpad 3617, the keyboard 3618, and the display 3619 all coupled to the processor 3611. Other configurations of the computing device may include a computer mouse or trackball coupled to the processor (e.g., via a USB input) as are well known, which may also be use in conjunction with the various embodiments.

Figure 37:
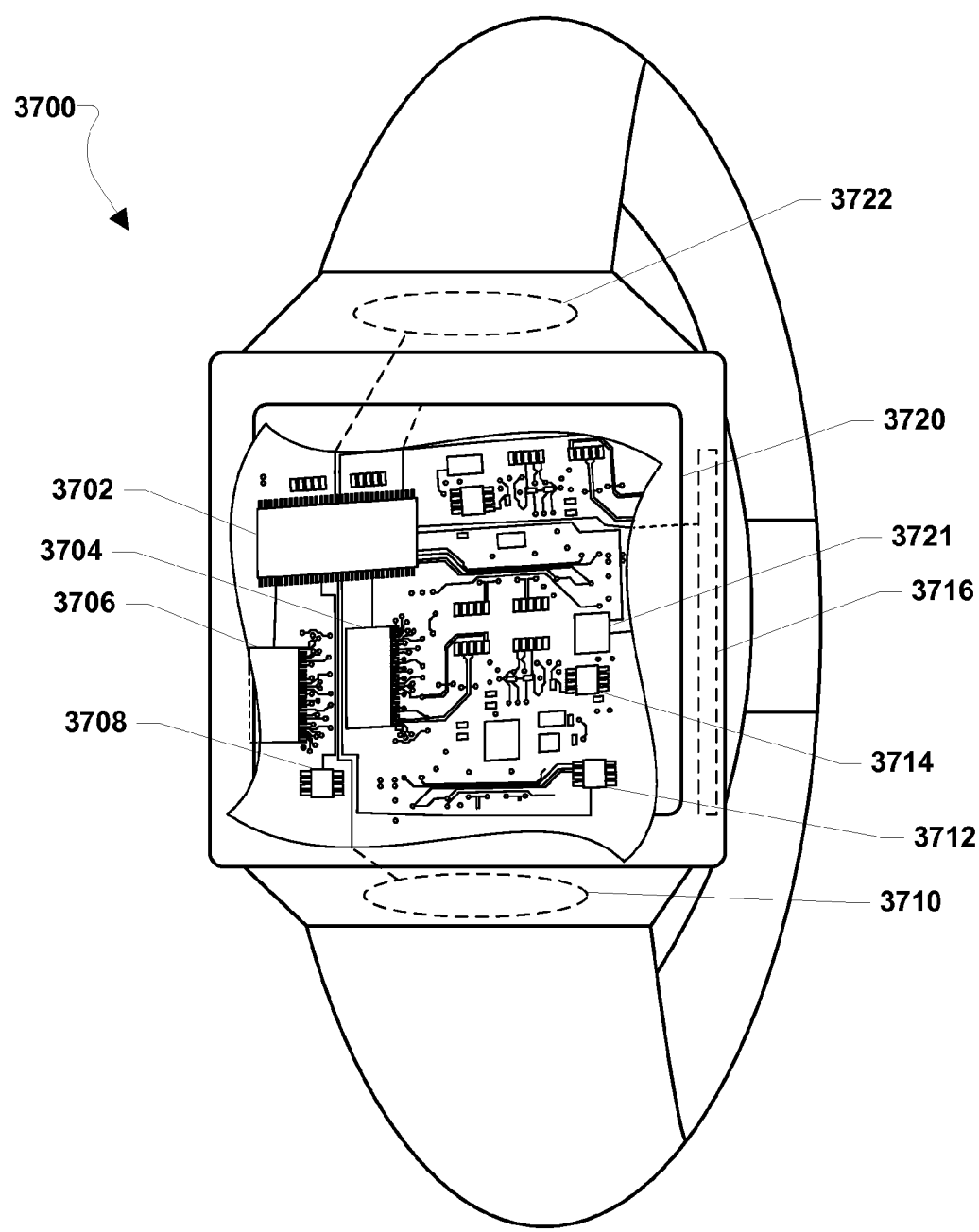
FIG. 37 is a component diagram of a personal hub suitable for use with the various embodiments.

The various embodiments described above may also be implemented within a variety of personal hubs, such as a wrist watch type personal hub 3700 as illustrated in FIG. 37. A personal hub 3700 may include a processor 3702 coupled to internal memories 3704 and 3706. Internal memories 3704 and 3706 may be volatile or non-volatile memories, and may also be secure and/or encrypted memories, or unsecure and/or unencrypted memories, or any combination thereof. The processor 3702 may also be coupled to a touch screen display 3720, such as a resistive-sensing touch screen, capacitive-sensing touch screen infrared sensing touch screen, or the like. Additionally, the personal hub 3700 may have one or more antenna 3708 for sending and receiving electromagnetic radiation that may be connected to a wireless data link and coupled to the processor 3702. The personal hub 3700 may also include physical buttons 3722 and 3710 for receiving user inputs as well as a slide sensor 3716 for receiving user inputs. The personal hub 3700 may also include a vibratory motor 3721 coupled to the processor 3702 to enable the personal hub 3700 to vibrate. The personal hub 3700 may also include various sensors, such as a temperature sensor 3714 and accelerometer 3712 coupled to the processor 3702.

Figure 38:
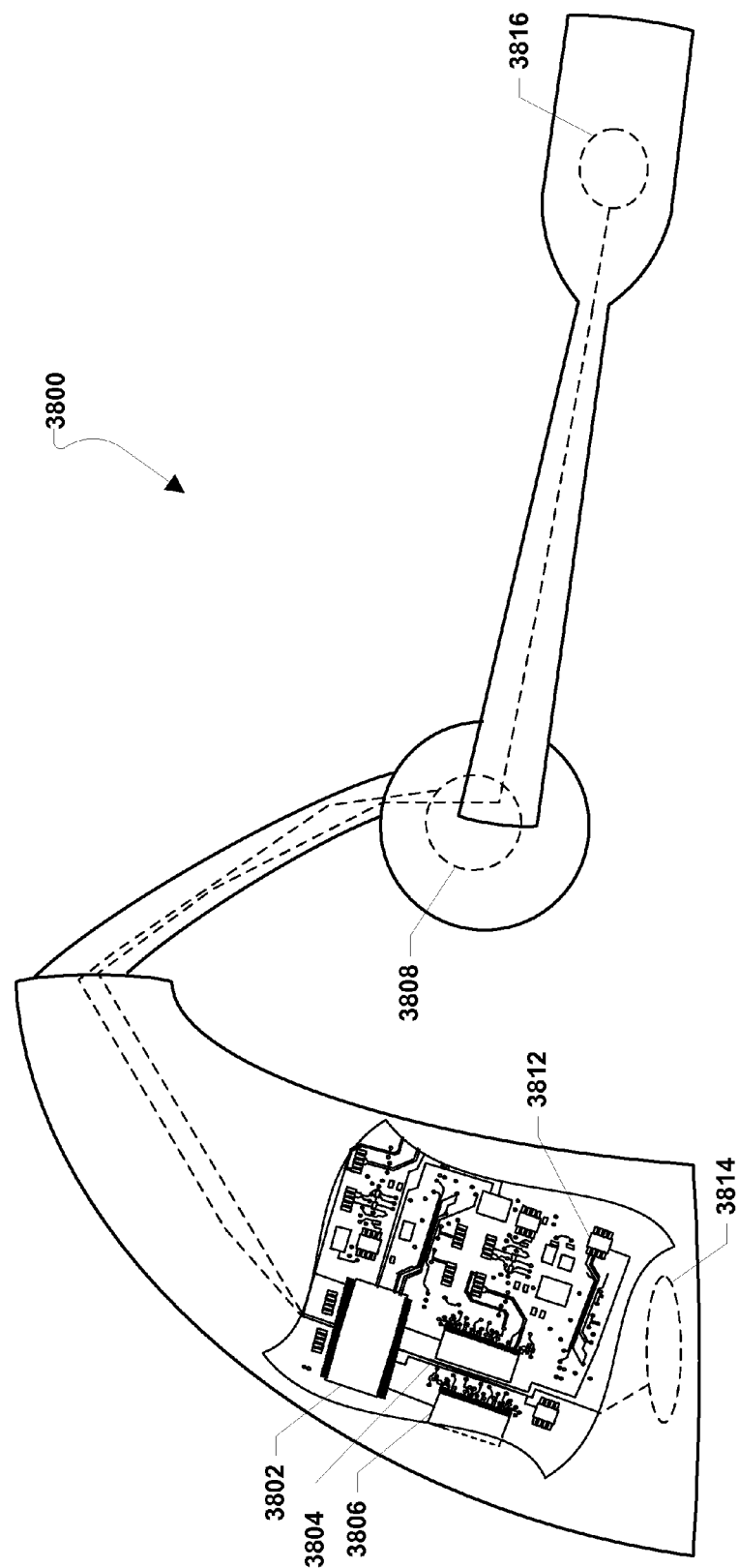
FIG. 38 is a component diagram of a wireless earpiece suitable for use with the various embodiments.

The various embodiments described above may also be implemented within a variety of wireless earpieces, such as wireless earpiece 3800 as illustrated in FIG. 38. A wireless earpiece 3800 may include a processor 3802 coupled to internal memories 3804 and 3806. Internal memories 3804 and 3806 may be volatile or non-volatile memories, and may also be secure and/or encrypted memories, or unsecure and/or unencrypted memories, or any combination thereof. The wireless earpiece 3800 may include a physical button 3814 for receiving user inputs. Additionally, the wireless earpiece 3800 may have one or more antenna 3812 for sending and receiving electromagnetic radiation that may be connected to a wireless data link and coupled to the processor 3802. The wireless earpiece 3800 may include a speaker 3808 coupled to the processor 3802 and configured to generate an audio output. The wireless earpiece 3800 may also include a microphone 3816 coupled to the processor 3802 to receive an audio input.

The processors 3502, 3611, 3702, and 3802 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 3504, 3510, 3612, 3613, 3704, 3706, 3804, and 3806 before they are accessed and loaded into the processors 3502, 3611, 3702, and 3802. The processors 3502, 3611, 3702, and 3802 may include internal memory sufficient to store the application software instructions. In many devices the internal memory may be a volatile or nonvolatile memory, such as flash memory, or a mixture of both. For the purposes of this description, a general reference to memory refers to memory accessible by the processors 3502, 3611, 3702, and 3802 including internal memory or removable memory plugged into the device and memory within the processor 3502, 3611, 3702, and 3802 themselves.

Figure 39:
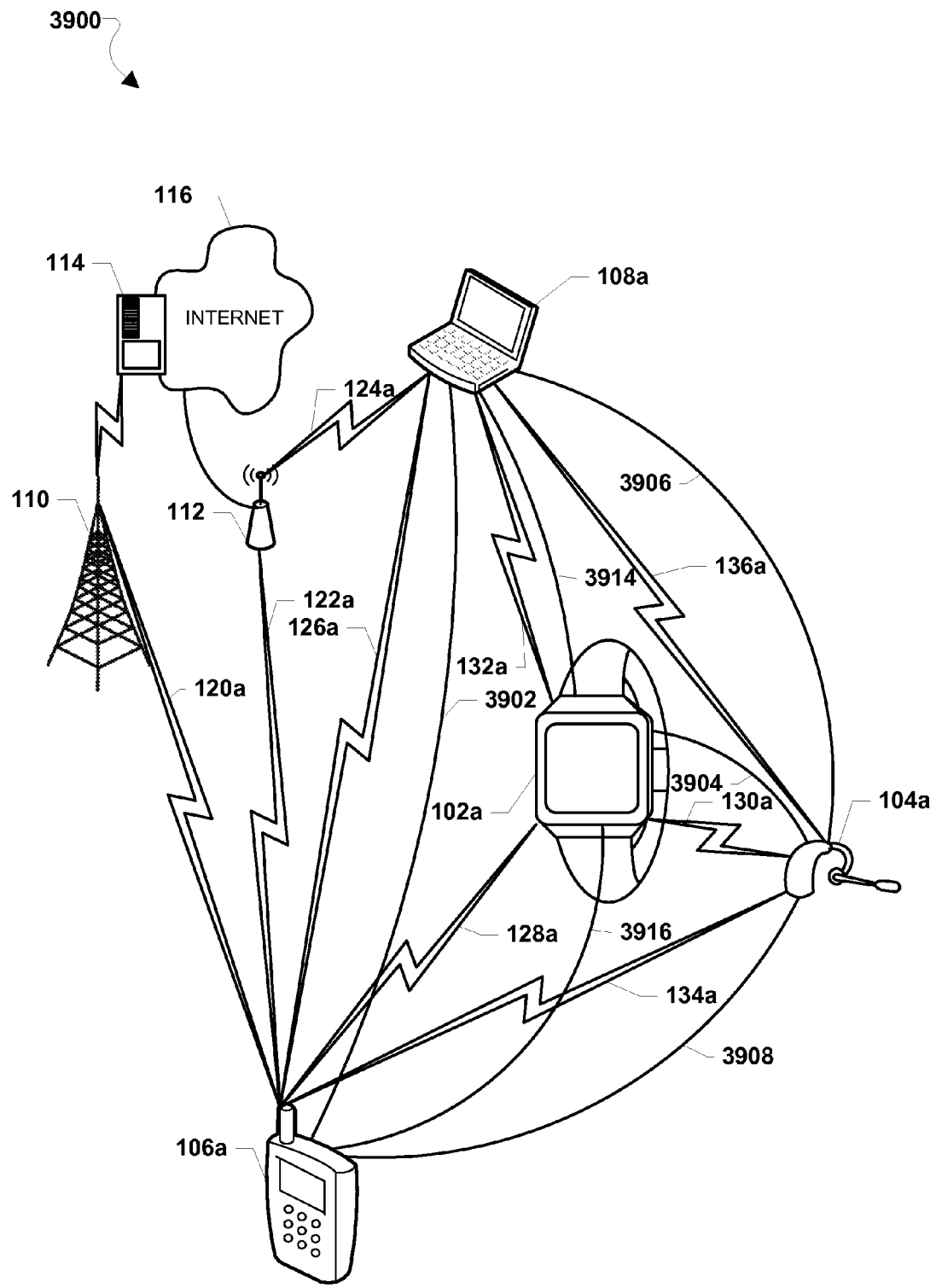
FIG. 39 is a communication system block diagram of another network suitable for use with the various embodiments.

In further embodiments, the communications between a personal hub, smart phone, laptop, and/or earpiece may be transmitted over wired data links or combinations of wired and wireless data links. In these embodiments, an example of which is illustrated in FIG. 39 discussed below, two or more of the personal hub, smart phone, laptop, and earpiece may be connected by various cables instead of, or in addition to, wireless data links. In such embodiments, the personal hub may be worn or carried by a user and may interact with a variety of mobile devices and/or accessories through wired connections, or combinations of wired and wireless connections, such as wired headphones, wireless headsets, wired earpieces, etc.

FIG. 39 illustrates a network system 3900 suitable for use with the various embodiments employing wired data links. The network system 3900 may include multiple devices, such as a personal hub 102a, an earpiece 104a, and two mobile devices, such as a smart phone 106a and laptop 108a. In an embodiment, the personal hub 102a, earpiece 104a, smart phone 106a, and laptop 108a may be configured to exchange data over either or both wired and wireless data links.

The personal hub 102a and the earpiece 104a may exchange data via a wireless data link 130a and/or a wired data link 3904. As an example, the wireless data link 130a between the personal hub 102a and the earpiece 104a may be a Bluetooth® connection. Similarly, the personal hub 102a and the smart phone 106a may exchange data via a wireless data link 128a and/or a wired data link 3916, and the personal hub 102a and the laptop 108a may exchange data via a wireless data link 132a and/or a wired data link 3914. The smart phone 106a and the earpiece 104a may exchange data via a wireless data link 134a and/or wired data link 3908. The smart phone 106a and the laptop 108a may exchange data directly with each other via a wireless data link 126a and/or wired data link 3902. The earpiece 104a and the laptop 108a may exchange data directly with each other via a wireless data link 136a and/or wired data link 3906. In various embodiments, the wireless data links 126a, 128a, 130a, 132a, 134a and 136a may be Bluetooth® data links. In the various embodiments, the wired data links 3902, 3904, 3908, 3906, 3914 and 3916 may be cable connections, such as a USB cable, a FireWire® cable, or standard audio analog or digital cables with suitable connectors at each end.

Additionally, the smart phone 106a and the laptop 108a may be configured to connect to the Internet 116 via wireless connections 122a and 124a, respectively, which may be established with a wireless access point 112, such as a Wi-Fi access point. The wireless access point 112 may be connected to the Internet 116. In this manner data may be exchanged between the smart phone 106a, the laptop 108a, and other Internet 116 connected devices by methods well known in the art. Additionally, the smart phone 106a and a cellular tower or base station 110 may exchange data via a cellular connection 120a, including CDMA, TDMA, GSM, PCS, G-3, G-4, LTE, or any other type connection. The cellular tower or base station 110 may be in communication with a router 114 which may connect to the Internet 116. In this manner, data (e.g., voice calls, text messages, e-mails, etc.) may be exchanged between the smart phone 106a and other devices by methods well known in the art. In addition, the laptop 108a may use a wired data link (e.g., Ethernet or other wired data link) to connect to a router (e.g., wireless access point 112 or other type of router) that may be connected the Internet 116.

In the embodiment methods 200, 300, 400, 500, 600, 700, 800, 1000, 1100, 1200, 1300, 1400, 1500, 1600, 1700, 1800, 1900, 2100, 2200, 2300, 2400, 2600, 2700, 2800, 2900, 3000, 3100, 3200, 3300, and 3400 discussed above, a wired personal hub 102a may be substituted for the personal hub 102, a wired head set or earpiece 104a may be substituted for the wireless earpiece 104, the smart phone 106a may be substituted for the smart phone 106, and/or the laptop 108a may be substituted for the laptop 108. Additionally, with embodiments employing wired data links, wired data links 3902, 3916, 3904, 3914, 3908, and/or 3906 may be substituted for one or more of the wireless data links 126, 128, 130, 132, 134, and 136 discussed above in the descriptions of embodiment methods 200, 300, 400, 500, 600, 700, 800, 1000, 1100, 1200, 1300, 1400, 1500, 1600, 1700, 1800, 1900, 2100, 2200, 2300, 2400, 2600, 2700, 2800, 2900, 3000, 3100, 3200, 3300, and 3400. With such substitutions, the operations of methods 200, 300, 400, 500, 600, 700, 800, 1000, 1100, 1200, 1300, 1400, 1500, 1600, 1700, 1800, 1900, 2100, 2200, 2300, 2400, 2600, 2700, 2800, 2900, 3000, 3100, 3200, 3300, and 3400 discussed above may be performed in substantially similar manners over wired data links or combinations of wired and wireless data links.

In an embodiment, the earpiece 104a may be connected to the smart phone 106a via a wired data link 3908, and the smart phone 106a may be connected to the personal hub 102a via a wireless data link 128a. In this configuration, alert messages may be handled wirelessly between the smart phone 106a and the personal hub 102a, while audio signals may be handled via the wired connection between the smart phone 106a and the earpiece 104a. The wired data link 3908 between the smart phone 106a and the earpiece 104a may reduce the processing required to generate, send, and/or receive wireless signals which may conserve battery power on the smart phone 106a and earpiece 104a.

In another embodiment, the personal hub 102a may be connected to the smart phone 106a and/or laptop 108a via wireless data links 128a and/or 132a, respectively, and the personal hub 102a may be connected to the earpiece 104a by a wired data link 3904. In a further embodiment, the earpiece 104a may be connected to the smart phone 106a and/or laptop 108a via wireless data links 134a and/or 136a, respectively. In this configuration the personal hub 102a may send/receive information to/from the earpiece 104a via a wired connection while the earpiece 104a may send/receive information to/from the smart phone 106a and/or laptop 108a via a wireless connection.

In an additional embodiment, the smart phone 106a may be connected to the laptop 108a via a wired data link 3902, and the smart phone 106a may be connected to the personal hub 102a and earpiece 104a via wireless data links 128a and 134a, respectively. In this configuration, the laptop 108a may send/receive information to/from the smart phone 106a via a wired connection, and the smart phone 106a may send/receive information to/from the personal hub 102a and/or earpiece 104a via wireless connections. As an example, while the smart phone 106a is connected to the laptop 108a via a USB connection while the smart phone 106a is charging, the smart phone 106a may receive a reminder via the USB connection, and the smart phone 106a may wirelessly send an alert message associated with the reminder to the personal hub 102a.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A system for providing notifications to a user, the system comprising:
    a mobile device comprising:
        means for receiving an incoming call;
        means for generating an alert message in response to the incoming call; and
        means for sending the alert message; and
    a personal hub comprising:
        means for receiving the alert message from the mobile device via a wireless data link;
        means for generating a user-perceptible notification in response to the received alert message, wherein the user-perceptible notification is a vibration;
        means for determining whether a first user input is received; and
        means for, in response to determining that the first user input is received, generating a first audio signal to send to an earpiece based at least in part on the alert message and sending the first audio signal to the earpiece via a wireless data link;
            wherein the first audio signal sent from the personal hub to the earpiece comprises at least one of (i) a ringtone associated with a caller identification that was included in the alert message or (ii) a speech synthesis of a caller identification that was included in the alert message.

2. The system of claim 1, wherein:
    the personal hub further comprises:
        means for determining whether a second user input is received; and
        means for, in response to determining that the second user input is received, sending an answer signal to the mobile device; and
    the mobile device further comprises:
        means for receiving the answer signal via a wireless data link;
        means for establishing a wireless data link between the mobile device and the earpiece; and means for activating the incoming call by exchanging voice and data packets between the mobile device and the earpiece over the wireless data link between the mobile device and the earpiece.

3. The system of claim 1, wherein:
the personal hub further comprises:
means for determining whether the first user input is received in the personal hub within a delay time; and
the mobile device further comprises:
means for generating an audible ring or vibration when it is determined that the first user input is not received in the personal hub within the delay time.

4. A method for providing notifications to a user, the method comprising:
by a personal hub:
receiving an alert message from a mobile device via a first data link, wherein the first data link is wireless;
generating a user-perceptible notification in response to the received alert message;
determining whether a first user input is received; and
in response to determining that the first user input is received:
generating a first audio signal to send to an earpiece based at least in part on the alert message; and
sending the first audio signal to the earpiece via a second data link.

5. The method of claim 4, wherein the first audio signal sent from the personal hub to the earpiece comprises at least one of (i) a ringtone associated with a caller identification that was included in the alert message or (ii) a speech synthesis of a caller identification that was included in the alert message.

6. The method of claim 4, wherein the first audio signal sent from the personal hub to the earpiece comprises at least one of a general status-warning sound or a general reminder sound.

7. The method of claim 6, further comprising:
by the personal hub:
determining whether a second user input is received; and
in response to determining that the second user input is received:
generating a second audio signal based at least in part on a speech synthesis of a reminder or a warning; and
sending the second audio signal to the earpiece via the second data link.

8. The method of claim 7, wherein the speech synthesis of the reminder or the warning was included in the alert message received from the mobile device.

9. The method of claim 4, wherein the first audio signal sent from the personal hub to the earpiece comprises a sender-specific tone associated with a sender of a text based message.

10. The method of claim 9, further comprising:
by the personal hub:
determining whether a second user input is received; and
in response to determining that the second user input is received:
generating a second audio signal based at least in part on a speech synthesis of the text based message; and
sending the second audio signal to the earpiece via the second data link.

11. The method of claim 4, wherein the second data link is wireless.

12. The method of claim 11, further comprising:
by the personal hub:
determining whether a second user input is received; and
in response to determining that the second user input is received:
sending an answer signal to the mobile device via the first data link.

13. The method of claim 12, wherein the first user input is a first gesture; and wherein the second user input is a second gesture that is different from the first gesture.

14. The method of claim 12, wherein the first user input is one of a movement, a touchscreen input, and a button press; and wherein the second user input is different from the first user input.

15. The method of claim 4, wherein the user-perceptible notification is a vibration, a displayed message, a blinking light, or a flashing screen.

16. The method of claim 12, further comprising:
by the mobile device:
receiving the answer signal via the first data link;
establishing a third data link between the mobile device and the earpiece; and
activating a call with the mobile device by exchanging voice and data packets between the mobile device and the earpiece over the third data link.

17. The method of any of claims 4-16, further comprising, prior to the personal hub receiving the alert message:
by the mobile device:
receiving an incoming call;
generating the alert message in response to the incoming call; and
sending the alert message to the personal hub via the first data link.

18. A personal hub comprising:
a memory; and
a processor coupled to the memory, the processor configured with processor-executable instructions to perform the method of any of claims 4-15.

19. A non-transitory processor-readable medium configured with processor-executable instructions to cause a processor of a personal hub to perform the method of any of claims 4-15.

20. A system for providing notifications to a user, the system comprising:
a mobile device comprising:
means for receiving an incoming text based message, wherein the incoming text based message is one of an email, a text message, or a reminder;
means for generating a speech synthesis of the incoming text based message;
means for generating an alert message in response to the incoming text based message, the alert message including the speech synthesis of the incoming text based message; and
means for sending the alert message; and
a personal hub comprising:
means for receiving the alert message from the mobile device via a wireless data link;
means for generating a user-perceptible notification in response to the received alert message, wherein the user-perceptible notification is a vibration;
means for determining whether a first user input is received; and
means for, in response to determining that the first user input is received, displaying at least a portion of the incoming text based message on a display of the personal hub.

21. The system of claim 20, wherein the personal hub further comprises:
means for determining whether a second user input is received; and means for, in response to determining that the second user input is received:
means for generating a first audio signal based at least in part on the speech synthesis that was included in the alert message received from the mobile device; and
means for sending the first audio signal to an earpiece via a wireless data link.

22. The system of claim 20, wherein:
the personal hub further comprises:
means for determining whether the first user input is received in the personal hub within a delay time; and
the mobile device further comprises:
means for generating an audible sound or vibration when it is determined that the first user input is not received in the personal hub within the delay time.

23. A method for providing notifications to a user, the method comprising:
by a personal hub:
receiving an alert message from a mobile device via a first data link, wherein the first data link is wireless, the alert message including a speech synthesis of an incoming text based message that was received by the mobile device;
generating a user-perceptible notification in response to the received alert message;
determining whether a first user input is received; and
in response to determining that the first user input is received, displaying at least a portion of the incoming text based message on a display of the personal hub.

24. The method of claim 23, further comprising:
by the personal hub:
determining whether a second user input is received; and
in response to determining that the second user input is received:
generating a first audio signal based at least in part on the speech synthesis that was included in the alert message received from the mobile device; and
sending the first audio signal to an earpiece via a second data link.

25. The method of claim 24, wherein the second data link is wireless.

26. The method of claim 24, further comprising:
by the personal hub:
sending a receipt indication to the mobile device via the first data link in response to determining that the second user input is received and the incoming text based message is a reminder.

27. The method of claim 24, wherein the first user input is a gesture and the second user input is a different gesture.

28. The method of claim 24, wherein the first user input is one of a movement, a touchscreen input, and a button press; and wherein the second user input is different from the first user input.

29. The method of claim 23, wherein the user-perceptible notification is one or more of a vibration, a displayed message, a blinking light, and a flashing screen.

30. The method of claim 23, wherein the incoming text based message is one of an email, a text message, or a reminder.

31. The method of any of claims 23-30, further comprising, prior to the personal hub receiving the alert message:
by the mobile device:
receiving the incoming text based message;
generating the speech synthesis of the incoming text based message;
generating the alert message in response to the received incoming text based message; and
sending the alert message to the personal hub.

32. A personal hub comprising:
a memory; and
a processor coupled to the memory, the processor configured with processor-executable instructions to perform the method of any of claims 23-30.

33. A non-transitory processor-readable medium configured with processor-executable instructions to cause a processor of a personal hub to perform the method of any of claims 23-30.

34. A system for providing notifications to a user, the system comprising:
a mobile device comprising:
means for receiving an incoming call or incoming text based message;
means for determining caller identification or sender identification for the incoming call or incoming text based message;
means for generating an alert message in response to the incoming call or incoming text based message, the alert message including (a) the caller identification for the incoming call received by the mobile device or (b) the sender identification for the incoming text based message received by the mobile device; and
means for sending the alert message via a wireless data link; and
a personal hub comprising:
means for receiving the alert message from the mobile device via a wireless data link;
means for determining whether the incoming call or incoming text based message is from a repeat caller or repeat sender within a specified time period based on the caller identification or sender identification that was included in the alert message received from the mobile device; and
means for, in response to determining that the incoming call or incoming text based message is from the repeat caller or repeat sender, (i) sending an answer signal to the mobile device via a wireless data link, (ii) sending, to the mobile device via a wireless data link, a signal configured to cause the mobile device to play a ringtone one or more times, (iii) sending, to the mobile device via a wireless data link, a signal configured to cause the mobile device to play audio based at least in part on a speech synthesis of the incoming text based message, (iv) sending an audio signal including a ringtone to an earpiece via a wireless data link, (v) sending an audio signal based at least in part on a speech synthesis of the incoming text based message to an earpiece via a wireless data link, or (vi) any combination thereof.

35. The system of claim 34, wherein the mobile device further comprises:
means for receiving the answer signal;
means for establishing a wireless data link between the mobile device and a first earpiece; and
means for activating the incoming call by exchanging voice and data packets between the mobile device and the first earpiece over the wireless data link between the mobile device and the first earpiece.

36. A method for providing notifications to a user, the method comprising:
by a personal hub:
receiving an alert message from a mobile device via a wireless data link, the alert message including (a) a caller identification for an incoming call received by the mobile device or (b) a sender identification for an incoming text based message received by the mobile device;

determining whether the incoming call or incoming text based message is from a repeat caller or repeat sender based on the caller identification or sender identification that was included in the alert message received from the mobile device; and in response to determining that the incoming call or incoming text based message is from the repeat caller or repeat sender, (i) sending an answer signal to the mobile device via a wireless data link, (ii) sending, to the mobile device via a wireless data link, a signal configured to cause the mobile device to play a ringtone one or more times, (iii) sending, to the mobile device via a wireless data link, a signal configured to cause the mobile device to play audio based at least in part on a speech synthesis of the incoming text based message, (iv) sending an audio signal including a ringtone to an earpiece via a wireless data link, (v) sending an audio signal based at least in part on a speech synthesis of the incoming text based message to an earpiece via a wireless data link, or (vi) any combination thereof.

37. The method of claim 36, wherein determining whether the incoming call or incoming text based message is from the repeat caller or repeat sender based on the caller identification or sender identification further comprises determining whether the incoming call or incoming text based message is from the repeat caller or repeat sender within a specified time period.

38. The method of any of claims 36-37, further comprising, prior to the personal hub receiving the alert message:
   by the mobile device:
      receiving the incoming call;
      determining the caller identification for the incoming call;
      generating the alert message in response to the incoming call; and
      sending the alert message to the personal hub.

39. The method of any of claims 36-37, further comprising, prior to the personal hub receiving the alert message:
   by the mobile device:
      receiving the incoming text based message;
      determining the sender identification for the incoming text based message;
      generating the alert message in response to the incoming text based message; and
      sending the alert message to the personal hub.

40. A personal hub comprising:
   a memory; and
   a processor coupled to the memory, the processor configured with processor-executable instructions to perform the method of any of claims 36-37.

41. A non-transitory processor-readable medium configured with processor-executable instructions to cause a processor of a personal hub to perform the method of any of claims 36-37.

42. A system for providing notifications to a user, the system comprising:
   a mobile device comprising:
      means for receiving an incoming call or incoming text based message;
      means for determining caller identification or sender identification for the incoming call or incoming text based message;
      means for generating an alert message in response to the incoming call or incoming text based message, the alert message including (a) the caller identification for the incoming call received by the mobile device or (b) the sender identification for the incoming text based message received by the mobile device; and
      means for sending the alert message via a wireless data link; and
   a personal hub comprising:
      means for receiving the alert message from the mobile device via a wireless data link;
      means for determining whether the incoming call or incoming text based message is from a privileged caller or privileged sender based on the caller identification or sender identification that was included in the alert message received from the mobile device; and
      means for, in response to determining that the incoming call or incoming text based message is from the privileged caller or privileged sender, (i) sending an answer signal to the mobile device via a wireless data link, (ii) sending, to the mobile device via a wireless data link, a signal configured to cause the mobile device to play a ringtone one or more times, (iii) sending, to the mobile device via a wireless data link, a signal configured to cause the mobile device to play audio based at least in part on a speech synthesis of the incoming text based message, (iv) sending an audio signal including a ringtone to an earpiece via a wireless data link, (v) sending an audio signal based at least in part on a speech synthesis of the incoming text based message to an earpiece via a wireless data link, or (vi) any combination thereof.

43. The system of claim 42, wherein the mobile device further comprises:
   means for receiving the answer signal;
   means for establishing a wireless data link between the mobile device and a first earpiece; and
   means for activating the incoming call by exchanging voice and data packets between the mobile device and the first earpiece over the wireless data link between the mobile device and the first earpiece.

44. A method for providing notifications to a user, the method comprising:
   by a personal hub:
      receiving an alert message from a mobile device via a wireless data link, the alert message including (a) a caller identification for an incoming call received by the mobile device or (b) a sender identification for an incoming text based message received by the mobile device;
      determining whether the incoming call or incoming text based message is from a privileged caller or privileged sender based on the caller identification or sender identification that was included in the alert message received from the mobile device; and
      in response to determining that the incoming call or incoming text based message is from the privileged caller or privileged sender, (i) sending an answer signal to the mobile device via a wireless data link, (ii) sending, to the mobile device via a wireless data link, a signal configured to cause the mobile device to play a ringtone one or more times, (iii) sending, to the mobile device via a wireless data link, a signal configured to cause the mobile device to play audio based at least in part on a speech synthesis of the incoming text based message, (iv) sending an audio signal including a ringtone to an earpiece via a wireless data link, (v) sending an audio signal based at least in part on a speech synthesis of the incoming text based message to an earpiece via a wireless data link, or (vi) any combination thereof.

45. The method of claim 44, further comprising, prior to the personal hub receiving the alert message:
by the mobile device:
receiving the incoming call;
determining the caller identification for the incoming call;
generating the alert message in response to the incoming call; and
sending the alert message to the personal hub.

46. The method of any one of claim 44, further comprising, prior to the personal hub receiving the alert message:
by the mobile device:
receiving the incoming text based message;
determining the sender identification for the incoming text based message;
generating the alert message in response to the incoming text based message; and
sending the alert message to the personal hub.

47. A personal hub comprising:
a memory; and
a processor coupled to the memory, the processor configured with processor-executable instructions to perform the method of claim 44.

48. A non-transitory processor-readable medium configured with processor-executable instructions to cause a processor of a personal hub to perform the method of claim 44.

49. A system for providing notifications to a user, the system comprising:
a mobile device comprising:
means for receiving an incoming call or incoming text based message, the incoming call or incoming text based message including an indication that the incoming call or incoming text based message is urgent;
means for generating an alert message in response to the incoming call or incoming text based message, the alert message including an urgency flag; and
means for sending the alert message to the personal hub; and
a personal hub comprising:
means for receiving the alert message from the mobile device via a wireless data link;
means for determining whether the urgency flag was included in the alert message received from the mobile device; and
means for, in response to determining that the urgency flag was included in the alert message received from the mobile device, (i) sending an answer signal to the mobile device via a wireless data link, (ii) sending, to the mobile device via a wireless data link, a signal configured to cause the mobile device to play a ringtone one or more times, (iii) sending, to the mobile device via a wireless data link, a signal configured to cause the mobile device to play audio based at least in part on a speech synthesis of the incoming text based message, (iv) sending an audio signal including a ringtone to an earpiece via a wireless data link, (v) sending an audio signal based at least in part on a speech synthesis of the incoming text based message to an earpiece via a wireless data link, or (vi) any combination thereof.

50. The system of claim 49, wherein the mobile device further comprises:
means for receiving the answer signal;
means for establishing a wireless data link between the mobile device and a first earpiece; and
means for activating the incoming call by exchanging voice and data packets between the mobile device and the first earpiece over the wireless data link between the mobile device and the first earpiece.

51. A method for providing notifications to a user, the method comprising:
by a personal hub:
receiving an alert message from a mobile device via a wireless data link, the alert message including an urgency flag for an incoming call received by the mobile device or an incoming text based message received by the mobile device;
determining whether the urgency flag was included in the alert message received from the mobile device; and
in response to determining that the urgency flag was included in the alert message received from the mobile device, (i) sending an answer signal to the mobile device via a wireless data link, (ii) sending, to the mobile device via a wireless data link, a signal configured to cause the mobile device to play a ringtone one or more times, (iii) sending, to the mobile device via a wireless data link, a signal configured to cause the mobile device to play audio based at least in part on a speech synthesis of the incoming text based message, (iv) sending an audio signal including a ringtone to an earpiece via a wireless data link, (v) sending an audio signal based at least in part on a speech synthesis of the incoming text based message to an earpiece via a wireless data link, or (vi) any combination thereof.

52. The method of claim 51, further comprising, prior to the personal hub receiving the alert message:
by the mobile device:
receiving the incoming call, the incoming call including an indication the incoming call is urgent;
generating the alert message in response to the incoming call; and
sending the alert message to the personal hub.

53. The method of claim 51, further comprising, prior to the personal hub receiving the alert message:
by the mobile device:
receiving the incoming text based message, the incoming text based message including an indication that the incoming text based message is urgent;
generating the alert message in response to the incoming text based message; and
sending the alert message to the personal hub.

54. A personal hub comprising:
a memory; and
a processor coupled to the memory, the processor configured with processor-executable instructions to perform the method of claim 51.

55. A non-transitory processor-readable medium configured with processor-executable instructions to cause a processor of a personal hub to perform the method of claim 51.

56. A system for providing notifications to a user, the system comprising:
a mobile device comprising:
means for generating an alert message;
means for sending the alert message to a personal hub;

means for receiving, from the personal hub, a user input indication; and means for, in response to receiving the user input indication from the personal hub, sending, to an earpiece via a wireless data link, an audio signal including (i) a ringtone associated with caller identification for an incoming call that triggered the generation of the alert message, (ii) a speech synthesis of caller identification for an incoming call that triggered the generation of the alert message, (iii) a speech synthesis of a sender identification for an incoming text based message that triggered the generation of the alert message, (iv) a speech synthesis of at least a portion of an incoming text based message that triggered the generation of the alert message, (v) a sound associated with a sender identification for an incoming text based message that triggered the generation of the alert message, (vi) a general status-warning sound for a status warning that triggered the generation of the alert message, (vii) a general reminder sound for a reminder that triggered the generation of the alert message, or (viii) any combination thereof; and the personal hub, the personal hub comprising:
means for receiving the alert message via a wireless data link;
means for generating a user-perceptible notification in response to receiving the alert message, wherein the user-perceptible notification is a vibration;
means for determining whether user input is received; and
means for, in response to determining that the user input is received, sending the user input indication to the mobile device via a wireless data link.

57. The system of claim 56, wherein the mobile device further comprises:
means for, in response to receiving the user input indication from the personal hub, generating the audio signal.

58. A method for providing notifications to a user, the method comprising:
by a mobile device:
generating an alert message;
sending the alert message to a personal hub via a wireless data link, wherein the personal hub is configured to generate a user-perceptible notification in response to receiving the alert message;
receiving, from the personal hub via a wireless data link, a user input indication that responded to the user-perceptible notification; and
in response to receiving the user input indication from the personal hub, sending, or playing audio based on, an audio signal including (i) a ringtone associated with a caller identification for an incoming call that triggered the generation of the alert message, (ii) a speech synthesis of a caller identification for an incoming call that triggered the generation of the alert message, (iii) a speech synthesis of a sender identification for an incoming text based message that triggered the generation of the alert message, (iv) a speech synthesis of at least a portion of an incoming text based message that triggered the generation of the alert message, (v) a sound associated with a sender identification for an incoming text based message that triggered the generation of the alert message, (vi) a general status-warning sound for a status warning that triggered the generation of the alert message, (vii) a general reminder sound for a reminder that triggered the generation of the alert message, or (viii) any combination thereof.

59. The method of claim 58, wherein the sending, or playing the audio based on, the audio signal comprises:
by the mobile device:
sending the audio signal to an earpiece via a data link between the mobile device and the earpiece.

60. The method of claim 59, wherein the data link between the mobile device and the earpiece is wireless.

61. The method of claim 58, further comprising:
by the mobile device:
in response to receiving the user input indication from the personal hub, generating the audio signal.

62. The method of claim 58, wherein the sending, or playing audio based on, the audio signal comprises:
by the mobile device:
playing audio based on the audio signal.

63. A mobile device comprising:
a memory; and
a processor coupled to the memory, the processor configured with processor-executable instructions to perform the method of any of claims 58-62.

64. A non-transitory processor-readable medium configured with processor-executable instructions to cause a processor of a mobile device to perform the method of any of claims 58-62.

65. A system for providing notifications to a user, the system comprising:
a mobile device comprising:
means for generating an alert message;
means for sending the alert message to a personal hub; via a wireless data link;
means for, in response to failing to receive, from the personal hub via a wireless data link, a user input indication or a receipt within a specified time, vibrating and/or generating an audio signal including (i) a ringtone for an incoming call that triggered the generation of the alert message, (ii) a sound associated with sender identification for an incoming text based message that triggered the generation of the alert message, (iii) a general status-warning sound for a status warning that triggered the generation of the alert message, (iv) a general reminder sound for a reminder that triggered the generation of the alert message, or (viii) any combination thereof; and the personal hub, the personal hub comprising:
means for receiving the alert message via a wireless data link;
means for, in response to receiving the alert message, sending the receipt to the mobile device via a wireless data link;
means for generating a user-perceptible notification in response to receiving the alert message, wherein the user-perceptible notification is a vibration;
means for determining whether user input is received; and
means for, in response to determining that the user input is received, sending the user input indication to the mobile device via a wireless data link.

66. The system of claim 65, wherein the mobile device further comprises:
means for sending the audio signal to an earpiece via a wireless data link.

67. The system of claim 65, wherein the mobile device further comprises:
  means for playing audio based on the audio signal.

68. A method for providing notifications to a user, the method comprising:
  by a mobile device:
    generating an alert message;
    sending the alert message to a personal hub via a wireless data link, wherein the personal hub is configured to generate a user-perceptible notification in response to receiving the alert message, wherein the personal hub is configured to generate a receipt in response to receiving the alert message;
    in response to failing to receive, from the personal hub via a wireless data link, a user input indication or a receipt within a specified time, vibrating and/or generating an audio signal including (i) a ringtone for an incoming call that triggered the generation of the alert message, (ii) a sound associated with a sender identification for an incoming text based message that triggered the generation of the alert message, (iii) a general status-warning sound for a status warning that triggered the generation of the alert message, (iv) a general reminder sound for a reminder that triggered the generation of the alert message, or (viii) any combination thereof.

69. The method of claim 68, further comprising:
  by the mobile device:
    sending the audio signal to an earpiece via a data link between the mobile device and the earpiece.

70. The method of claim 69, wherein the data link between the mobile device and the earpiece is wireless.

71. The method of claim 68, further comprising:
  by the mobile device:
    playing audio based on the audio signal.

72. A mobile device comprising:
  a memory; and
  a processor coupled to the memory, the processor configured with processor-executable instructions to perform the method of any of claims 68-71.

73. A non-transitory processor-readable medium configured with processor-executable instructions to cause a processor of a mobile device to perform the method of any of claims 68-71.

\* \* \* \* \*